United States Patent
Corsello et al.

(10) Patent No.: US 12,435,377 B2
(45) Date of Patent: Oct. 7, 2025

(54) CANCERS WITH LOSS OF CHROMOSOME 16Q AND/OR LOW EXPRESSION OF METALLOTHIONEIN PROTEINS

(71) Applicants: THE BROAD INSTITUTE, INC., Cambridge, MA (US); DANA-FARBER CANCER INSTITUTE, INC.; INSTITUTO CARLOS SLIM DE LA SALUD, A.C., Mexico City (MX)

(72) Inventors: Steven Corsello, Boston, MA (US); Ryan Spangler, Cambridge, MA (US); Rohith Nagari, Cambridge, MA (US); Todd Golub, Cambridge, MA (US)

(73) Assignees: THE BROAD INSTITUTE, INC., Cambridge, MA (US); DANA-FARBER CANCER INSTITUTE, INC., Boston, MA (US); INSTITUTO CARLOS SLIM DE LA SALUD, A.C (MX)

( * ) Notice: Subject to any disclaimer, the term of this patent is extended or adjusted under 35 U.S.C. 154(b) by 259 days.

(21) Appl. No.: 17/293,381

(22) PCT Filed: Nov. 13, 2019

(86) PCT No.: PCT/US2019/061120
§ 371 (c)(1),
(2) Date: May 12, 2021

(87) PCT Pub. No.: WO2020/102303
PCT Pub. Date: May 22, 2020

(65) Prior Publication Data
US 2022/0010383 A1    Jan. 13, 2022

Related U.S. Application Data

(60) Provisional application No. 62/767,478, filed on Nov. 14, 2018.

(51) Int. Cl.
| | | |
|---|---|---|
| C12Q 1/6886 | (2018.01) | |
| A61K 31/145 | (2006.01) | |
| A61K 31/166 | (2006.01) | |
| A61P 35/00 | (2006.01) | |

(52) U.S. Cl.
CPC .......... *C12Q 1/6886* (2013.01); *A61K 31/145* (2013.01); *A61K 31/166* (2013.01); *A61P 35/00* (2018.01); *C12Q 2600/106* (2013.01); *C12Q 2600/154* (2013.01); *C12Q 2600/158* (2013.01)

(58) Field of Classification Search
CPC ...... C12Q 1/6886; A61P 35/00; A61K 31/145
See application file for complete search history.

(56) References Cited

U.S. PATENT DOCUMENTS

2017/0020828 A1    1/2017    Devi

FOREIGN PATENT DOCUMENTS

| WO | 2008/082579 A1 | 7/2008 | |
|---|---|---|---|
| WO | 2012/068491 A1 | 5/2012 | |
| WO | WO-2013173756 A1 * | 11/2013 | ............. G01N 33/58 |

OTHER PUBLICATIONS

Meyskens et al., "Cancer Prevention: Obstacles, Challenges, and the Road Ahead", 2016, J Natl Cancer Inst, 108, pp. 1-8 (Year: 2016).*
Neshushtan et al., "A Phase IIb Trial Assessing the Addition of Disulfiram to Chemotherapy for the Treatment of Metastatic Non-Small Cell Lung Cancer", 2015, The Oncologist, 20, pp. 366-367 (Year: 2015).*
Butcher et al., "Investigation of the key chemical structures involved in the anticancer activity of disulfiram in A549 non-small cell lung cancer cell line", 2018, BMC Cancer, 18, pp. 1-12 (Year: 2018).*
Iljin, K. et al. "High-Throughput Cell-Based Screening of 4910 Known Drugs and Drug-like Small Molecules Identifies Disulfiram as an Inhibitor of Prostate Cancer Cell Growth", 2009, Clinical Cancer Research, 15, pp. 6070-6078 (Year: 2009).*
Krizkova, S. et al. "An insight into the complex roles of metallothioneins in malignant diseases with emphasis on (sub)isoforms / isoforms and epigenetics phenomena", 2017, Pharmacology & Therapeutics, 183, pp. 90-117 (Year: 2017).*
Yurkow et al., "Flow cytometric determination of metallothionein levels in human peripheral blood lymphocytes: utility in environmental exposure assessment", 1998, J Toxicol Environ Health A, 54, Abstract only (Year: 1998).*

(Continued)

*Primary Examiner* — Jeffrey H Murray
*Assistant Examiner* — Madeline E Braun
(74) *Attorney, Agent, or Firm* — Day Pitney LLP; Christopher R. Cowles; Richard B. Emmons

(57) ABSTRACT

The present disclosure relates to compositions and methods for the diagnosis and treatment or prevention of cancers, particularly cancers that exhibit arm-level loss of chromosome 16q, focal copy loss of 16q13 and/or low expression of metallothionein proteins, such as certain uterine, ovarian, gastroesophageal and lung cancers. Three known drugs, disulfiram, elesclomol and thiram, as well as certain disulfiram metabolites, are specifically provided for killing cancer cells characterized by arm-level loss of chromosome 16q, focal copy loss of 16q13 and/or low expression of metallothioneins. The instant disclosure therefore provides for selecting and/or administering disulfiram, elesclomol and thiram and/or active metabolites or derivatives of disulfiram, elesclomol and thiram as a therapeutic agent(s) to target a cancer cell and/or subject having or at risk of developing a cancer. Methods and compositions for therapies that include such compounds are also provided.

16 Claims, 10 Drawing Sheets
Specification includes a Sequence Listing.

(56) References Cited

OTHER PUBLICATIONS

Iljin, K. et al. High-Throughput Cell-Based Screening of 4910 Known Drugs and Drug-like Small Molecules Identifies Disulfiram as an Inhibitor of Prostate Cancer Cell Growth. Sep. 30, 2009, No publisher listed.

Krizkova, S. et al. An insight into the complex roles of metallothioneins in malignant diseases with emphasis on (sub) soforms /isoforms and epigenetics phenomena. Oct. 5, 2017, No publisher listed.

Extended European Search Report in corresponding application No. 19885121.4 dated Jul. 1, 2022.

Exam Report in corresponding EP application No. 19885121.4 dated Apr. 2, 2024.

International Search Report dated Feb. 6, 2020 for related Application No. PCT/US2019/061120.

Werynska, B et al. Metallothionein 1F and 2A overexpression predicts poor outcome of non-small cell lung cancer patients. Experimental and Molecular Pathology. Feb. 2013, Epub Oct. 9, 2012, vol. 94, No. 1; pp. 301-308; abstract; DOI: 10.1016/j.yexmp.2012.10.006.

Corsello , SM et al. Non-oncology drugs are a source of previously unappreciated anti-cancer activity. bioRxiv. Aug. 9, 2019, pp. 1-41; DOI: 10.1101/730119.

Jiao et al., "Anti-Cancer Agents in Medicinal Chemistry" title:Disulfiram 's Anticancer Activity: Evidence and Mechanisms; vol. 16 Issue: 11, Date missing.

Jiao, Yang, Bethany N Hannafon, and Wei-Qun Ding. "Disulfiram's anticancer activity: evidence and mechanisms." Anti-Cancer Agents in Medicinal Chemistry (Formerly Current Medicinal Chemistry—Anti-Cancer Agents) 16.11 (2016): 1378-1384.

Iljin, Kristiina, et al. "High-throughput cell-based screening of 4910 known drugs and drug-like small molecules identifies disulfiram as an inhibitor of prostate cancer cell growth." Clinical Cancer Research 15.19 (2009): 6070-6078.

Krizkova, Sona, et al. "An Insight into the Complex Roles of Metallothioneins in Malignant Diseases with Emphasis on (Sub) Isoforms/Isoforms and Epigenetics Phenomena." (2017).

\* cited by examiner

Cu(DDC)₂

FIG. 6A

CANCERS WITH LOSS OF CHROMOSOME 16Q AND/OR LOW EXPRESSION OF METALLOTHIONEIN PROTEINS

CROSS REFERENCE TO RELATED APPLICATIONS

This application is a national stage application, filed under 35 U.S.C. § 371, of international application No. PCT/US2019/061120, filed Nov. 13, 2019, which claims the benefit of U.S. Provisional Application No. 62/767,478, filed Nov. 14, 2018, entitled "Use of Disulfiram and Other Compounds to Treat Cancers with Loss of Chromosome 16Q and/or Low Expression of Metallothionein Proteins," the entire contents of which are incorporated herein by reference.

FIELD OF THE INVENTION

The invention relates generally to methods, compositions and kits for the identification and treatment of cancer, particularly of cancers rendered highly susceptible to certain compounds and treatments of the instant disclosure by virtue of presenting arm-level loss of chromosome 16q, focal copy loss of 16q13 and/or low expression of metallothionein proteins.

SEQUENCE LISTING

The instant application contains a Sequence Listing which has been filed electronically in ASCII format and is hereby incorporated by reference in its entirety. Said ASCII copy, created on Jul. 3, 2024, is named BN00007_0822_SeqListing.txt and is 24,389 Bytes in size.

BACKGROUND OF THE INVENTION

Identifying therapeutic compounds capable of killing neoplastic cells in an optimally selective manner poses an ongoing challenge for the oncology field. A need exists for agents that are capable of precision killing of neoplastic cells that are characterized by specific molecular traits.

BRIEF SUMMARY OF THE INVENTION

The current disclosure relates, at least in part, to the identification of three compounds, disulfiram, elesclomol and thiram, as well as certain active metabolites and derivatives thereof, as drugs that exhibit enhanced killing of certain neoplastic cells—particularly neoplastic cells characterized by arm-level loss of chromosome 16q, focal copy loss of 16q13 and/or low expression of metallothionein proteins. Treatable cancers include a broad range of cancers, including those that exhibit arm-level loss of chromosome 16q, focal copy loss of 16q13 and/or low gene expression or methylation of metallothionein genes (e.g., MT1 and MT2 isoforms, such as MT1E and MT2A, respectively, among others). Such treatable cancers include uterine, ovarian, gastroesophageal, lung, and other cancers that are positive for the biomarker(s) identified herein. Compositions and methods for the diagnosis and treatment of subjects and/or cancers that are likely to be responsive to treatment with disulfiram, elesclomol and/or thiram, as well as certain active metabolites and derivatives thereof, are therefore provided.

In one aspect, the instant disclosure provides a method for selecting a treatment for a subject having or at risk of developing a cancer, the method involving: (a) obtaining a sample from a subject having or at risk of developing a cancer; (b) identifying the presence or absence in the sample of one or more of the following: arm-level loss of 16q, focal copy loss of 16q13, and low expression of a metallothionein gene and/or protein; and (c) selecting disulfiram, a metabolite or derivative of disulfiram, elesclomol, a derivative of elesclomol, thiram and/or a derivative of thiram as a treatment for the subject if arm-level loss of 16q, focal copy loss of 16q13 and/or low expression of a metallothionein gene and/or protein is identified in the sample, thereby selecting a treatment for the subject having or at risk of developing a cancer.

In one embodiment, the cancer is a uterine cancer, an ovarian cancer, a gastroesophageal cancer and/or a lung cancer. Optionally, the cancer is a non-small cell lung cancer (NSCLC).

In certain embodiments, the metallothionein gene and/or protein is a MT1 isoform. Optionally, the metallothionein gene and/or protein is MT1E.

In some embodiments, the metallothionein gene and/or protein is a MT2 isoform. Optionally, the metallothionein gene and/or protein is MT2A.

In one embodiment, low expression of MT1E or MT2A mRNA is identified.

In certain embodiments, methylation of the metallothionein gene is identified. Optionally, methylation of a MT1E gene and/or MT2A gene is identified.

In one embodiment, step (b) involves identifying the presence or absence in the sample of reduced MT1E or MT2A mRNA expression, as compared to an appropriate control.

In certain embodiments, the metabolite or derivative of disulfiram is DDC or Cu-DDC.

In another embodiment, the method further involves step (d) administering the selected disulfiram, metabolite or derivative of disulfiram, elesclomol, derivative of elesclomol, thiram and/or derivative of thiram to the subject.

In certain embodiments, the method further involves selection of vinorelbine, a platinum agent Letrozole, Anastrozole, Exemestane, Doxorubicin, Liposomal doxorubicin, Cyclophosphamide, Capecitabine, Docetaxel, Paclitaxel, Nab-paclitaxel, Trastuzumab, Ado-trastuzumab emtansine, Pertuzumab, Neratinib, Gemcitabine, Tamoxifen, Methotrexate, 5-Fluorouracil, Palbociclib, Abemaciclib, Fulvestrant, Olaparib, Eribulin, Pemetrexed, bevacizumab, nivolumab, pembrolizumab, ipilimumab, Oxaliplatin and/or ramucirumab as a combination therapy for the subject, together with the selected disulfiram, metabolite or derivative of disulfiram, elesclomol, derivative of elesclomol, thiram and/or derivative of thiram. Optionally, the platinum agent is cisplatin or carboplatin.

In some embodiments, identifying step (b) involves use of a kit of the disclosure.

In one embodiment, the subject is human.

Another aspect of the instant disclosure provides a method for treating or preventing a cancer in a subject, the method involving: (a) obtaining a sample from a subject having or at risk of developing a cancer; (b) identifying the presence or absence in the sample of one or more of the following: arm-level loss of 16q, focal copy loss of 16q13, and low expression of a metallothionein gene and/or protein; and (c) administering disulfiram, a metabolite or derivative of disulfiram, elesclomol, a derivative of elesclomol, thiram and/or a derivative of thiram to the subject if arm-level loss of 16q, focal copy loss of 16q13 and/or low expression of a metallothionein gene and/or protein is identified in the sample, thereby treating or preventing a cancer in the subject.

In one embodiment, the cancer possesses one or more of the following: low MT1E mRNA expression levels, low MT1E protein expression levels, low MT2A mRNA expression levels and/or low MT2A protein expression levels.

An additional aspect of the instant disclosure provides a kit for identifying low expression of a metallothionein mRNA or protein in a sample, where the kit provides an oligonucleotide for detection of a metallothionein mRNA or an anti-metallothionein antibody (optionally a labeled anti-metallothionein antibody or where the kit includes a labeled secondary antibody that binds the anti-metallothionein antibody), and instructions for its use.

In one embodiment, the sample is a cancer sample. Optionally, the cancer sample is a uterine cancer sample, an ovarian cancer sample, a gastroesophageal cancer sample or a lung cancer sample. Optionally, the cancer sample is a NSCLC sample.

In another embodiment, the sample is a tissue sample of a subject having uterine cancer, an ovarian cancer, a gastroesophageal cancer or a lung cancer. Optionally, the lung cancer is a NSCLC.

In another embodiment, the metallothionein mRNA or protein is a MT1E mRNA or protein or a MT2A mRNA or protein.

Another aspect of the instant disclosure provides a pharmaceutical composition for treating a subject having a cancer having arm-level loss of 16q, focal copy loss of 16q13 and/or low expression of a metallothionein gene and/or protein, where the cancer is a uterine cancer, an ovarian cancer, a gastroesophageal cancer or a lung cancer, the pharmaceutical composition including a therapeutically effective amount of disulfiram, a metabolite or derivative of disulfiram, elesclomol, a derivative of elesclomol, thiram and/or a derivative of thiram, and a pharmaceutically acceptable carrier.

In one embodiment, the cancer is a NSCLC.

In another embodiment, the metabolite or derivative of disulfiram is DDC or Cu-DDC.

Definitions

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value.

In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Unless otherwise clear from context, all numerical values provided herein are modified by the term "about."

The term "administration" refers to introducing a substance into a subject. In general, any route of administration may be utilized including, for example, parenteral (e.g., intravenous), oral, topical, subcutaneous, peritoneal, intraarterial, inhalation, vaginal, rectal, nasal, introduction into the cerebrospinal fluid, or instillation into body compartments. In some embodiments, administration is oral. Additionally or alternatively, in some embodiments, administration is parenteral. In some embodiments, administration is intravenous.

By "agent" is meant any small compound (e.g., small molecule), antibody, nucleic acid molecule, or polypeptide, or fragments thereof or cellular therapeutics such as allogeneic transplantation and/or CART-cell therapy.

The term "cancer" refers to a malignant neoplasm (Stedman's Medical Dictionary, 25th ed.; Hensyl ed.; Williams & Wilkins: Philadelphia, 1990). Exemplary cancers include, but are not limited to, uterine cancer, ovarian cancer (e.g., cystadenocarcinoma, ovarian embryonal carcinoma, ovarian adenocarcinoma), gastroesophageal cancer (including esophageal cancer (e.g., adenocarcinoma of the esophagus, Barrett's adenocarcinoma), and gastric cancer (e.g., stomach adenocarcinoma (STAD)), and lung cancer (e.g., bronchogenic carcinoma, small cell lung cancer (SCLC), non-small cell lung cancer (NSCLC), adenocarcinoma of the lung). Additional exemplary cancers include, but are not limited to, melanoma, colorectal cancer (e.g., colon cancer, rectal cancer, colorectal adenocarcinoma) and endometrial cancer (e.g., uterine cancer, uterine sarcoma). Other exemplary forms of cancer include, but are not limited to, colon adenocarcinoma (COAD), oesophageal carcinoma (ESCA), rectal adenocarcinoma (READ), uterine corpus endometrial carcinoma (UCEC), diffuse large B-cell lymphoma (DLBCL), as well as the broader class of lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma (DLBCL)), follicular lymphoma, chronic lymphocytic leukemia/small lymphocytic lymphoma (CLL/SLL), mantle cell lymphoma (MCL), marginal zone B-cell lymphomas (e.g., mucosa-associated lymphoid tissue (MALT) lymphomas, nodal marginal zone B-cell lymphoma, splenic marginal zone B-cell lymphoma), primary mediastinal B-cell lymphoma, Burkitt lymphoma, lymphoplasmacytic lymphoma (i.e., Waldenström's macroglobulinemia), hairy cell leukemia (HCL), immunoblastic large cell lymphoma, precursor B-lymphoblastic lymphoma and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungoides, Sezary syndrome), angioimmunoblastic T-cell lymphoma, extranodal natural killer T-cell lymphoma, enteropathy type T-cell lymphoma, subcutaneous panniculitis-like T-cell lymphoma, and anaplastic large cell lymphoma); a mixture of one or more leukemia/lymphoma as described above; hematopoietic cancers (e.g., myeloid malignancies (e.g., acute myeloid leukemia (AML) (e.g., B-cell AML, T-cell AML), myelodysplastic syndrome, myeloproliferative neoplasm, chronic myelomonocytic leukemia (CMML) and chronic myelogenous leukemia (CIVIL) (e.g., B-cell CIVIL, T-cell CML)) and lymphocytic leukemia such as acute lymphocytic leukemia (ALL) (e.g., B-cell ALL, T-cell ALL) and chronic lymphocytic leukemia (CLL) (e.g., B-cell CLL, T-cell CLL)); brain cancer (e.g., meningioma, glioblastomas, glioma (e.g., astrocytoma, oligodendroglioma), medulloblastoma); acoustic neuroma; adenocarcinoma; adrenal gland cancer; anal cancer; angiosarcoma (e.g., lymphangiosarcoma, lymphangioendotheliosarcoma, hemangiosarcoma); appendix cancer; benign monoclonal gammopathy; biliary cancer (e.g., cholangiocarcinoma); bladder cancer; breast cancer (e.g., adenocarcinoma of the breast, papillary carcinoma of the breast, mammary cancer, medullary carcinoma of the breast, etc.); bronchus cancer; carcinoid tumor; cervical cancer (e.g., cervical adenocarcinoma); choriocarcinoma; chordoma; craniopharyngioma; connective tissue cancer; epithelial carcinoma; ependymoma; endotheliosarcoma (e.g., Kaposi's sarcoma, multiple idiopathic hemorrhagic sarcoma); Ewing's sarcoma; ocular cancer (e.g., intraocular melanoma, retinoblastoma); familiar hypereosinophilia; gall bladder cancer; gastrointestinal stromal tumor (GIST); germ cell cancer; head and neck cancer (e.g., head and neck squamous cell carcinoma, oral cancer (e.g., oral squamous cell carcinoma), throat cancer (e.g., laryngeal cancer, pharyngeal cancer, nasopharyngeal cancer, oropharyngeal cancer)); and multiple myeloma (MM)), heavy chain disease (e.g., alpha chain disease, gamma chain disease, mu chain disease); hemangioblastoma; hypopharynx cancer; inflammatory myofibroblastic tumors; immunocytic amyloidosis; kidney cancer (e.g., nephroblastoma a.k.a. Wilms' tumor, renal cell carcinoma); liver cancer (e.g., hepatocellular cancer (HCC), malignant hepatoma); leiomyosarcoma (LMS); mastocytosis (e.g., systemic mastocytosis); muscle cancer; myelodysplastic syndrome (MDS); mesothelioma; myeloproliferative disorder (MPD) (e.g., polycythemia vera (PV), essential thrombocytosis (ET), agnogenic myeloid metaplasia (AMM) a.k.a. myelofibrosis (MF), chronic idiopathic myelofibrosis, chronic myelocytic leukemia (CIVIL), chronic neutrophilic leukemia (CNL), hypereosinophilic syndrome (HES)); neuroblastoma; neurofibroma (e.g., neurofibromatosis (NF) type 1 or type 2, schwannomatosis); neuroendocrine cancer (e.g., gastroenteropancreatic neuroendocrine tumor (GEP-NET), carcinoid tumor); osteosarcoma (e.g., bone cancer); papillary adenocarcinoma; pancreatic cancer (e.g., pancreatic andenocarcinoma, intraductal papillary mucinous neoplasm (IPMN), Islet cell tumors); penile cancer (e.g., Paget's disease of the penis and scrotum); pinealoma; primitive neuroectodermal tumor (PNT); plasma cell neoplasia; paraneoplastic syndromes; intraepithelial neoplasms; prostate cancer (e.g., prostate adenocarcinoma); rectal cancer; rhabdomyosarcoma; salivary gland cancer; skin cancer (e.g., squamous cell carcinoma (SCC), keratoacanthoma (KA), melanoma, basal cell carcinoma (BCC)); small bowel cancer (e.g., appendix cancer); soft tissue sarcoma (e.g., malignant fibrous histiocytoma (MFH), liposarcoma, malignant peripheral nerve sheath tumor (MPNST), chondrosarcoma, fibrosarcoma, myxosarcoma); sebaceous gland carcinoma; small intestine cancer; sweat gland carcinoma; synovioma; testicular cancer (e.g., seminoma, testicular embryonal carcinoma); thyroid cancer (e.g., papillary carcinoma of the thyroid, papillary thyroid carcinoma (PTC), medullary thyroid cancer); urethral cancer; vaginal cancer; and vulvar cancer (e.g., Paget's disease of the vulva).

By "control" or "reference" is meant a standard of comparison. In one aspect, as used herein, "changed as compared to a control" sample or subject is understood as having a level that is statistically different than a sample from a normal, untreated, or control sample. Control samples include, for example, cells in culture, one or more laboratory test animals, or one or more human subjects. Methods to select and test control samples are within the ability of those in the art. Determination of statistical significance is within the ability of those skilled in the art, e.g., the number of standard deviations from the mean that constitute a positive result.

The terms "isolated," "purified," or "biologically pure" refer to material that is free to varying degrees from components which normally accompany it as found in its native state. "Isolate" denotes a degree of separation from original source or surroundings. "Purify" denotes a degree of separation that is higher than isolation.

As used herein, the term "next-generation sequencing" or "NGS" can refer to sequencing technologies that have the capacity to sequence polynucleotides at speeds that were unprecedented using conventional sequencing methods (e.g., standard Sanger or Maxam-Gilbert sequencing methods). These unprecedented speeds are achieved by performing and reading out thousands to millions of sequencing reactions in parallel. NGS sequencing platforms include, but are not limited to, the following: Massively Parallel Signature Sequencing (Lynx Therapeutics); 454 pyro-sequencing (454 Life Sciences/Roche Diagnostics); solid-phase, reversible dye-terminator sequencing (Solexa/Illumina); SOLiD technology (Applied Biosystems); Ion semiconductor sequencing (ion Torrent); and DNA nanoball sequencing (Complete Genomics). Descriptions of certain NGS platforms can be found in the following: Shendure, et al., "Next-generation DNA sequencing," Nature, 2008, vol. 26, No. 10, 135-1 145; Mardis, "The impact of next-generation sequencing technology on genetics," Trends in Genetics, 2007, vol. 24, No. 3, pp. 133-141; Su, et al., "Next-generation sequencing and its applications in molecular diagnostics" Expert Rev Mol Diagn, 2011, 11 (3):333-43; and Zhang et al., "The impact of next-generation sequencing on genomics", J Genet Genomics, 201, 38(3): 95-109.

As used herein, the term "subject" includes humans and mammals (e.g., mice, rats, pigs, cats, dogs, and horses). In many embodiments, subjects are mammals, particularly primates, especially humans. In some embodiments, subjects are livestock such as cattle, sheep, goats, cows, swine, and the like; poultry such as chickens, ducks, geese, turkeys, and the like; and domesticated animals particularly pets such as dogs and cats. In some embodiments (e.g., particularly in research contexts) subject mammals will be, for example, rodents (e.g., mice, rats, hamsters), rabbits, primates, or swine such as inbred pigs and the like.

As used herein, the terms "treatment," "treating," "treat" and the like, refer to obtaining a desired pharmacologic and/or physiologic effect. The effect can be prophylactic in terms of completely or partially preventing a disease or symptom thereof and/or can be therapeutic in terms of a partial or complete cure for a disease and/or adverse effect attributable to the disease. "Treatment," as used herein, covers any treatment of a disease or condition in a mammal, particularly in a human, and includes: (a) preventing the disease from occurring in a subject which can be predisposed to the disease but has not yet been diagnosed as having it; (b) inhibiting the disease, i.e., arresting its development; and (c) relieving the disease, i.e., causing regression of the disease.

Unless specifically stated or obvious from context, as used herein, the term "or" is understood to be inclusive. Unless specifically stated or obvious from context, as used herein, the terms "a", "an", and "the" are understood to be singular or plural.

The phrase "pharmaceutically acceptable carrier" is art recognized and includes a pharmaceutically acceptable material, composition or vehicle, suitable for administering compounds of the present disclosure to mammals. The carriers include liquid or solid filler, diluent, excipient, solvent or encapsulating material, involved in carrying or transporting the subject agent from one organ, or portion of the body, to another organ, or portion of the body. Each carrier must be "acceptable" in the sense of being compatible with the other ingredients of the formulation and not injurious to the patient. Some examples of materials which can serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it is understood that the particular value forms another aspect. It is further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. It is also understood that throughout the application, data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The term "pharmaceutically acceptable salts, esters, amides, and prodrugs" as used herein refers to those carboxylate salts, amino acid addition salts, esters, amides, and prodrugs of the compounds of the present disclosure which are, within the scope of sound medical judgment, suitable for use in contact with the tissues of patients without undue toxicity, irritation, allergic response, and the like, commensurate with a reasonable benefit/risk ratio, and effective for their intended use, as well as the zwitterionic forms, where possible, of the compounds of the disclosure.

The term "salts" refers to the relatively non-toxic, inorganic and organic acid addition salts of compounds of the present disclosure. These salts can be prepared in situ during the final isolation and purification of the compounds or by separately reacting the purified compound in its free base form with a suitable organic or inorganic acid and isolating the salt thus formed. Representative salts include the hydrobromide, hydrochloride, sulfate, bisulfate, nitrate, acetate, oxalate, valerate, oleate, palmitate, stearate, laurate, borate, benzoate, lactate, phosphate, tosylate, citrate, maleate, fumarate, succinate, tartrate, naphthylate mesylate, glucoheptonate, lactobionate and laurylsulphonate salts, and the like. These may include cations based on the alkali and alkaline earth metals, such as sodium, lithium, potassium, calcium, magnesium, and the like, as well as non-toxic ammonium, tetramethylammonium, tetramethylammonium, methylamine, dimethylamine, trimethylamine, triethlyamine, ethylamine, and the like. (See, for example, S. M. Barge et al., "Pharmaceutical Salts," J. Pharm. Sci., 1977, 66:1-19 which is incorporated herein by reference.)

A "therapeutically effective amount" of an agent described herein is an amount sufficient to provide a therapeutic benefit in the treatment of a condition or to delay or minimize one or more symptoms associated with the condition. A therapeutically effective amount of an agent means an amount of therapeutic agent, alone or in combination with other therapies, which provides a therapeutic benefit in the treatment of the condition. The term "therapeutically effective amount" can encompass an amount that improves overall therapy, reduces or avoids symptoms, signs, or causes of the condition, and/or enhances the therapeutic efficacy of another therapeutic agent.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Other features and advantages of the disclosure will be apparent from the following description of the preferred embodiments thereof, and from the claims. Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All published foreign patents and patent applications cited herein are incorporated herein by reference. All other published references, documents, manuscripts and scientific literature cited herein are incorporated herein by reference. In the case of conflict, the present specification, including definitions, will control. In addition, the materials, methods, and examples are illustrative only and not intended to be limiting.

BRIEF DESCRIPTION OF THE DRAWINGS

The following detailed description, given by way of example, but not intended to limit the disclosure solely to the specific embodiments described, may best be understood in conjunction with the accompanying drawings, in which:

FIG. 1A shows the structure of disulfiram. FIG. 1B shows the structure of elesclomol. FIG. 1C shows the structure of thiram.

FIG. 2A shows a Mann-Whitney U test where PRISM assay cell lines were stratified into bins based upon observed chromosome 16q status (16q loss, 16q normal and 16q gain, respectively), with disulfiram cytotoxicity assessed as linear area-under-the-curve (AUC). FIG. 2B demonstrates the extent of correlation observed for disulfiram sensitivity as compared to band-level copy number, across varying indicated disulfiram doses (Primary 10 µM, 10 µM, 2.5 µM, 625 nM, 156 nM, linAUC and robust AUC), which exhibited extremely high levels of correlation (as measured by Pearson correlation coefficient Z scores) between disulfiram sensitivity and band-level (focal copy) loss of 16q13 in assayed treated cell lines.

FIG. 3A shows the modeled role of metallothionein proteins in trapping heavy metals (e.g., Zn, Cd, Pb, Cu, etc.). FIG. 3B shows the mode by which two molecules of the disulfiram metabolite, diethyldithiocarbamate (DDC), could trap a Cu' atom thereby forming $Cu(DDC)_2$.

FIG. 5A depicts DSF metabolism to DDC and ultimately to Methyl-DDC or to DEA and carbon disulfide. FIG. 5B shows cytotoxicity IC50 curves assessed for various indicated treatments of SH10TC or G401 cells. The depicted dose-response curves were observed to progress from paclitaxel with the lowest IC50 value, through elesclomol, disulfiram/thiram and DDC (DDC exhibited the highest IC50 value among those compounds that exhibited activity), respectively, among active agents, while methyl DDC was observed as inactive in both conditions tested (SH10TC and G401 cells).

FIGS. 6A and 6B show that CRISPR-Cas9-mediated knockdown of the metallothionein regulatory gene MTF1 (metal regulatory transcription factor 1) in the SF295 cell line (which was characterized as disulfiram resistant and exhibited gain of chromosome 16q) markedly downregulated both MT2A and MT1E levels. FIG. 6A shows exemplary genomic insertions/deletions (in/dels) observed in CRISPR-Cas9 MTF1 knockout-treated cells. For the MTF1 guide "MTF1 sg1", genomic in/del frequency was observed to be approximately 65%, while for the MTF1 guide "MTF1 sg2", genomic in/del frequency was observed to be approximately 77%. FIG. 6B shows a scatter plot that demonstrates that MTF1 gene knockout robustly downregulated MT1E and MT2A.

DETAILED DESCRIPTION OF THE INVENTION

Figure 1A:
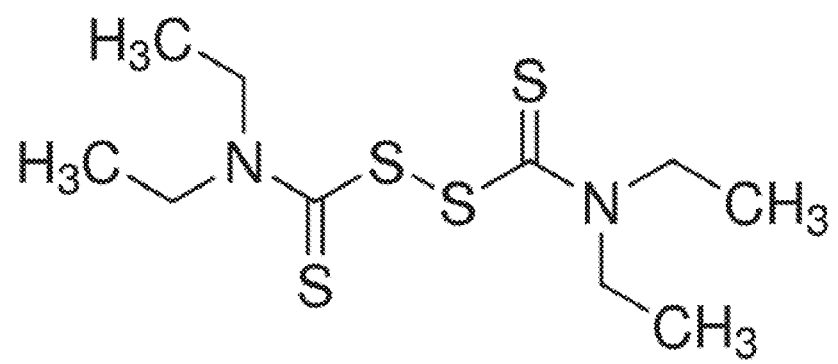
FIGS. 1A to 1C show the chemical structures of disulfiram, elesclomol and thiram, respectively.

The present disclosure is directed, at least in part, to the discovery that certain types of cancer, particularly those characterized by arm-level loss of chromosome 16q, focal copy loss of 16q13, low gene expression or methylation of MT1 isoforms (including MT1E) and/or low gene expression or methylation of MT2 isoforms (including MT2A) are particularly susceptible to treatment with disulfiram, elesclomol and thiram, as well as certain active metabolites and derivatives thereof. Indeed, disulfiram, elesclomol and thiram were identified via genomic screening methods as the three agents among drugs present in a drug repurposing library that exhibited enhanced killing of neoplasia cell lines that harbored chromosome 16q disruptions/loss, including focal copy loss of 16q13. Cancers particularly including uterine, ovarian cancer, gastroesophageal and lung cancer (e.g., non-small cell lung cancer (NSCLC)), among others, have therefore herein been identified as susceptible to treatment with disulfiram, elesclomol and thiram and/or metabolites and/or derivatives thereof. The instant disclosure therefore provides compositions and methods for the diagnosis and treatment of cancer that employ disulfiram, elesclomol and thiram and/or metabolites and/or derivatives thereof, either alone (i.e., as a monotherapy, optionally in certain classes of cancer, such as uterine cancer, ovarian cancer, NSCLC, etc.) or in combination with other chemotherapeutic drugs.

The instant discovery was made using large-scale multiplex profiling of existing drugs against 578 cancer cell lines, employing a PRISM multiplexed cellular viability assay. Across more than 4,000 compounds, three compounds, disulfiram, elesclomol and thiram, were identified for which arm-level loss of chromosome 16q and/or focal copy loss of 16q13 similarly predicted cell line sensitivity. In confirmatory studies, noting that chromosome 16q harbors a metallothionein gene cluster (Karin et al. Proc. Natl. Acad. Sci USA 81: 5494-5498), it was identified that: 1) heterozygous metallothionein copy number loss was a frequent event in human cancer and 2) disruption of the metallothionein regulatory gene, MTF1 in an exemplary disulfiram-resistant cell line, SF295 (an astrocytoma/glioma cell line), dramatically downregulated downstream metallothionein genes MT2A and MT1E, and produced a dramatic sensitization of MTF1 knockout SF295 cells to both disulfiram and elesclomol. These results were consistent with disulfiram, elesclomol and thiram killing cancer cells in a manner dependent on loss and/or downregulation of the metallothionein genes of chromosome 16q.

Disulfiram, elesclomol and thiram (and improved and/or novel derivatives of such compounds) have therefore been identified as agents for use in treating or preventing cancers (uterine, ovarian, gastroesophageal, lung, and other biomarker-positive cancers) that exhibit arm-level loss of chromosome 16q, focal copy loss of 16q13 and/or low expression of metallothionein proteins and/or low gene expression or methylation of metallothionein genes (e.g., MTF1; MT1 and MT2 isoforms, such as MT1E and MT2A). Arm-level loss of chromosome 16q, focal copy loss of 16q13 and/or low expression of metallothionein proteins and/or low gene expression or methylation of metallothionein genes can be used as predictive biomarker(s) for such cancers and therefore a cancer's susceptibility to the agents of the instant disclosure.

Disulfiram has the chemical structure shown in FIG. 1A. Disulfiram has been previously characterized as a drug which can be used to treat chronic alcoholism by producing an acute sensitivity to ethanol (drinking alcohol). Without wishing to be bound by theory, disulfiram appears to work by inhibiting the enzyme acetaldehyde dehydrogenase, which means that many of the effects of a "hangover" are felt immediately after alcohol is consumed. "Disulfiram plus alcohol, even small amounts, produce flushing, throbbing in head and neck, throbbing headache, respiratory difficulty, nausea, copious vomiting, sweating, thirst, chest pain, palpitation, dyspnea, hyperventilation, tachycardia, hypotension, syncope, marked uneasiness, weakness, vertigo, blurred vision, and confusion. In severe reactions there may be respiratory depression, cardiovascular collapse, arrhythmias, myocardial infarction, acute congestive heart failure, unconsciousness, convulsions, and death" ("Antabuse-disulifram tablet". DailyMed. National Institutes of Health. May 23, 2016).

Disulfiram is known to chelate metals, including copper and zinc. The drug has been previously described to have certain anti-cancer properties, as promoting a complex that inhibits the VCP/p97 protein degradation pathway in MDA-MB-231 tumors in mice (Skrott et al. Nature 552: 194-199). Administration of disulfiram and Cu2+ resulted in formation of CuET, which tended to accumulate in MDA-MB-231 tumors, exerting in the CuET-accumulating tumor the cellular impact of impaired protein impaired protein degradation, poly-Ub (ubiquitin) protein accumulation, ER stress (UPR activation), p97 pathway interference, p97/NPL4 immobilization and a heat-shock response (Skrott et al.). Disulfiram was also previously shown to be active in a small, randomized phase III clinical trial in treatment of metastatic non-small cell lung cancer (NSCLC)—in a phase IIb trial, forty patients with NSCLC were randomized to cisplatin/navelbine, with or without administration of low-dose disulfiram, showing a survival benefit in newly diagnosed NSCLC patients (Nechusthtan et al. The Oncologist. 20: 366-7).

While disulfiram has therefore been previously studied as a possible treatment for cancer (Jiao et al. Anti-cancer Agents in Medicinal Chemistry. 16: 1378-1384), as well as for latent HIV infection (Rasmussen and Levin. Current Opinion in HIV and AIDS. 11: 394-401), the instant disclosure has now identified the sensitivity to disulfiram imparted to cells that harbor one or more of the following: arm-level loss of chromosome 16q, focal copy loss of 16q13 and/or low expression of metallothionein proteins and/or low gene expression or methylation of metallothionein genes. When disulfiram creates complexes with metals (dithiocarbamate complexes), it has been shown to act as a proteasome inhibitor and it has been studied in in vitro experiments, model animals, and small clinical trials as a possible treatment for liver metastasis, metastatic melanoma, glioblastoma, non-small cell lung cancer, and prostate cancer (Jiao et al.; Cvek and Dvorak. Drug Discovery Today. 13 (15-16): 716-22). Disulfiram is available as 250 mg and 500 mg caplets, and can be dosed orally. Exemplary dosages of disulfiram include, e.g., 500 mg PO qDay initially for 1-2 weeks; not to exceed 500 mg/day, optionally followed by a maintenance dose of 250 mg PO qDay (125-500 mg range). A patient may continue to take such drug therapy for months or even years.

Figure 3A:
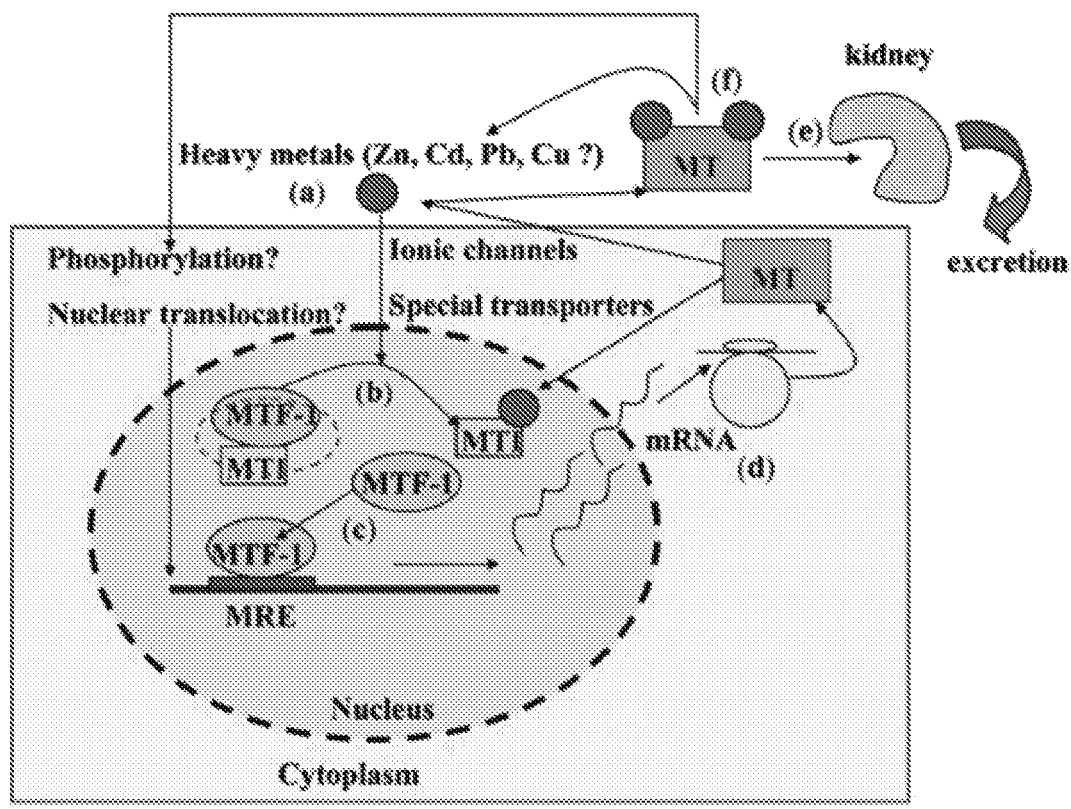
FIGS. 3A and 3B show the mode of action modeled for the metallothionein proteins harbored within chromosome 16q.
Figure 3B:
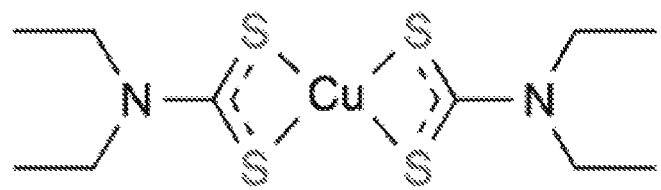

Diethyldithiocarbamic acid (DDC) is a known metabolite of disulfiram, which was demonstrated herein to retain the cytotoxicity (see FIG. 5A below) initially identified herein for disulfiram. The active Cu-DDC form (Cu(DDC)$_2$) is also show at FIGS. 3B and 5A below. While Me-DDC is a disulfiram metabolite described herein as not possessing the cytotoxicity effects observed herein for disulfiram and DDC, it is contemplated that other disulfiram metabolites and derivatives/analogs can be identified as possessing the cytotoxic activities described herein.

Figure 1B:
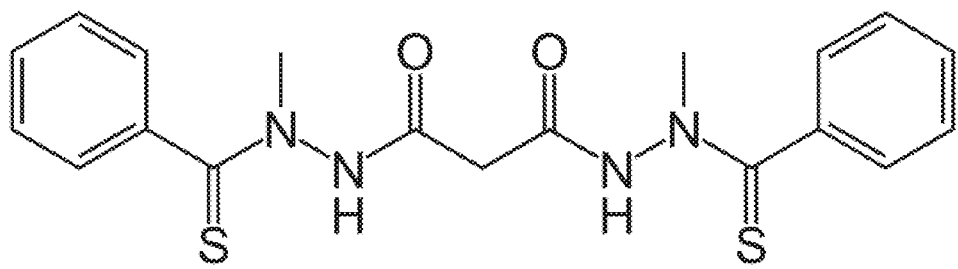

Elesclomol has the chemical structure shown in FIG. 1B. Elesclomol has been previously characterized as a drug that triggers apoptosis (programmed cell death) in cancer cells. It has entered development as a chemotherapy adjuvant, and has received both fast track and orphan drug status from the U.S. Food and Drug Administration for the treatment of metastatic melanoma ("Synta And GlaxoSmithKline Announce Elesclomol Granted Orphan Drug Designation By The FDA" (Press release). Medical News Today. Jan. 30, 2008); however, on Feb. 26, 2009 all clinical trials involving elesclomol were suspended due to safety concerns ("Synta Pharmaceuticals press release". Feb. 26, 2009). In March 2010, the FDA approved resuming clinical development of elesclomol ("Synta Announces Elesclomol Clinical Development to Resume". Mar. 2, 2010). In a small, randomized phase II study, elesclomol was shown to significantly increase progression-free survival in people with metastatic melanoma when given in addition to paclitaxel (Taxol) ("Prous Science Molecule of the Month: Elesclomol". Thomson Reuters. December 2007; Qu et al. Breast Cancer Research and Treatment. 121: 311-21). However, a phase III study of combined elesclomol and paclitaxel therapy was halted in 2013, when it was determined that addition of elesclomol to paclitaxol did not significantly increase progression-free survival (O'Day et al. Journal of Clinical Oncology. 31: 1211-8). Exemplary dosage of elesclomol includes approximately 25-100 mg/kg as a single dose injection.

Without wishing to be bound by theory, elesclomol induces oxidative stress by provoking a buildup of reactive oxygen species within cancer cells (Kirshner et al. Molecular Cancer Therapeutics. 7: 2319-27). Elesclomol requires a redox active metal ion to function. The Cu(II) complex has been described as 34 times more potent than the Ni(II) complex and 1040-fold more potent than the Pt(II) complex (Yadav et al. Journal of Inorganic Biochemistry. 126: 1-6).

Elesclomol and various analogs was previously presented, e.g., in U.S. Pat. No. 6,762,204, which identified, e.g., a genus of compounds having the following structure:

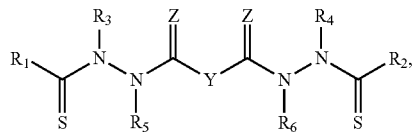

wherein:
Y is a covalent bond of a substituted or unsubstituted straight chained hydrocarbyl group. In addition, Y, taken together with both >C=Z groups to which it is bonded, is a substituted or unsubstituted aromatic group. Preferably, Y is a covalent bond or —C(R$_7$R$_8$)—.

R$_1$ is an aliphatic group, a substituted aliphatic group, a non-aromatic heterocyclic group, or a substituted non-aromatic heterocyclic group, R$_2$-R$_4$ are independently —H, an aliphatic group, a substituted aliphatic group, a non-aromatic heterocyclic group, a substituted non-aromatic heterocyclic group, an aryl group or a substituted aryl group, or R$_1$ and R$_3$ taken together with the carbon and nitrogen atoms to which they are bonded, and/or R$_2$ and R$_4$ taken together with the carbon and nitrogen atoms to which they are bonded, form a non-aromatic heterocyclic ring optionally fused to an aromatic ring.

R$_5$-R$_6$ are independently —H, an aliphatic group, a substituted aliphatic group, an aryl group or a substituted aryl group.

R$_7$ and R$_8$ are each independently —H, an aliphatic or substituted aliphatic; group, or R$_7$ is —H and R$_8$ is a substituted or unsubstituted aryl group, or, R$_7$ and R$_8$, taken together, are a C2-C6 substituted or unsubstituted alkylene group.

Z is =O or =S.

The contents of U.S. Pat. No. 6,762,204 is incorporated herein by reference, in its entirety.

In addition, transition metal-bound forms of elesclomol—particularly copper- and nickel-bound forms of elesclomol—were previously disclosed, e.g., in U.S. Pat. No. 8,815,945. The contents of U.S. Pat. No. 8,815,945 is also incorporated herein by reference, in its entirety.

Figure 1C:
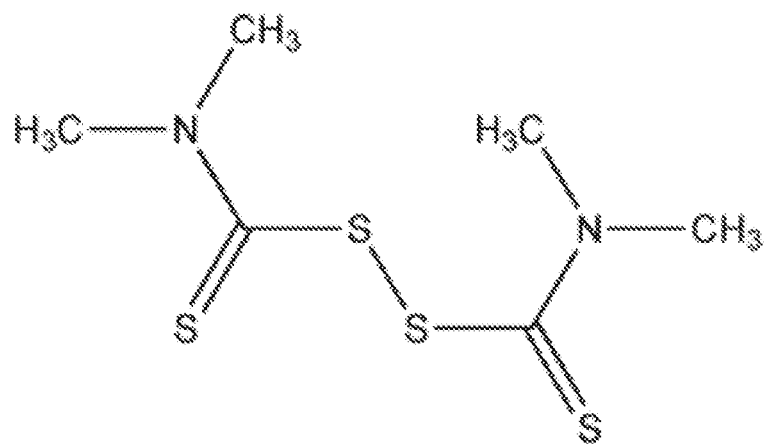

Thiram has the chemical structure shown in FIG. 1C. Thiram is the simplest thiuram disulfide and the oxidized dimer of dimethyldithiocarbamate. Thiram has been used in the treatment of human scabies, as a sun screen and as a bactericide applied directly to the skin or incorporated into soap ("Thiram". Extension Toxicology Network). It has also been used as a fungicide, an ectoparasiticide to prevent fungal diseases in seed and crops, and similarly as an animal repellent to protect fruit trees and ornamentals from damage by rabbits, rodents and deer. It has been shown to be effective against stem gall of coriander, damping off, smut of millet, neck rot of onion, among others. Thiram was traditionally used in apple and wine farming. Since 2010 most Thiram has been applied to soybeans.

Thiram is a type of sulphur fungicide. It has been found to dissolve completely in chloroform, acetone and ether. It is available as dust, flowable, wettable powder, water dispersible granules, and water suspension formulations and in mixtures with other fungicides (Ibid.).

Thiram has been described as moderately toxic by ingestion, but it is highly toxic if inhaled. Acute exposure in humans has been described to cause headaches, dizziness, fatigue, nausea, diarrhea and other gastrointestinal complaints (Hayes and Laws. Handbook of Pesticide Toxicology. Vol. 3, Classes of Pesticides. NY: Academic Press, Inc.). Chronic or repeated exposure has been described to cause sensitive skin in certain individuals, as well as effects on the thyroid or liver (NIOSH—Thiram International Chemical Safety Card (ICSC)).

Chromosome 16q, Arm-Level Loss & Focal Copy Loss

Human chromosome 16 spans 90 million base pairs and represents just under 3% of total DNA in cells. Loss of the material in the long arm of chromosome 16 is referred to as a 16q loss. 16q loss has been identified as associated with many (somatic) cancers such as acute myeloid leukemia (AML), leukemia, lung cancer, prostate cancer, uterine sarcoma, breast cancer, and esophageal cancer, among others (listed cancers are associated with deletion at 16q13 and 16q22). Tests such as microsatellite analysis (LOH), Southern blotting, and comparative genomic hybridization (CGH) are commonly used to identify arm level and focal copy losses in chromosome 16q. A common symptom of loss of 16q is the presence of solid tumors (Albertson et al. 2003).

Metallothionein Genes

Metallothionein (MT) is a family of cysteine-rich, low molecular weight (MW ranging from 500 to 14000 Da) proteins. MT proteins are localized to the membrane of the Golgi apparatus, where they tend to bind both physiological (such as zinc, copper, selenium) and xenobiotic (such as cadmium, mercury, silver, arsenic) heavy metals through their cysteine residues (thiol group). Human MTs are encoded by a multigene family. The MT-II variant is encoded by a single functional gene, MT-IIA. The MT-IIB gene is a processed pseudogene derived from a reverse transcript of MT-II mRNA. MT-I class variants are encoded by a large number of genes, arranged in tandem. The MT-IIA and MT-IA genes show a differential response to glucocorticoid hormones and heavy metals, yet they both show expression in primary human fibroblasts and in HeLa cells. Expression of both of those genes at high levels after transfer on bovine papilloma virus vectors has been described as leading to increased resistance of host cells to cadmium-induced toxicity. Reduced expression of MT has been observed in liver, colon, and prostate cancer. Aberrant overexpression of MT has also been observed in a number of cancers, such as breast cancer, gallbladder cancer, melanoma, and lymphoma.

Metallothionein Gene Cluster of Chromosome 16q13

The functional human MT genes are located in a gene cluster at chromosome 16q13. Research using human-mouse cell hybrids and hybridization probes derived from cloned and functional human MT1 and MT2 genes has previously shown that the functional human genes are clustered on human chromosome 16q13. Analysis of RNA from somatic cell hybrids indicated that hybrids that contained human chromosome 16q13 expressed both human MT1 and MT2 mRNA, with expression highly regulated by both heavy metal ions and glucocorticoid hormones.

MT1 and MT2 are isoforms that are coded for by the gene cluster of chromosome 16q13, when present. Protein isoforms are a set of highly similar proteins that originate from a single gene or gene family and are a result of genetic differences. MT1 and MT2 are generally considered equivalent proteins. Transcription of MT1 and MT2 has been shown to accompany cell cycle progression from G1 to S phase in cancer studies (ERK pathway Carcinoma Studies), and both MT1 and MT2 have previously been examined as prospective biomarkers (Liu et al. 2007).

MT1E, MT2A and MTF1 Genes

MT1E—Metallothionein-1E (MT1E) is a protein that in humans is encoded by the MT1E gene. MT1E has been found to be highly expressed in motile cell lines. Studies have shown that MT1E can enhance the migration and invasion of human glioma cell (Ryu et al. 2012), and decreased expression of MT1E has also been assessed as a potential biomarker for prostate cancer progression (Demindenko et al. 2017). Exemplary transcript and protein sequences for MT1E include:

```
Homo sapiens metallothionein 1E (MT1E), transcript
variant 1, mRNA, cDNA (Ref No. NM_001363555.1)
                                      (SEQ ID NO: 1)
CATCGGAGAAGTGCAGCTGCTGTGCCTGATGTGGGAACAGCTCTTCTCCCA

GATGTAAATAGAACAACCTGCACAACCTGGATTTTTTAAAAATACAACAC

TGAGCCATTTGCTGCATTTCTTTTTATACTAAATATGTGACTGACAATAAA

AACAATTTTGACTTTAATCTTA

Homo sapiens metallothionein 1E (MT1E), transcript
variant 2, mRNA, cDNA (Ref No. NM_175617.3)
                                      (SEQ ID NO: 2)
AGGAACGCGGGCGGTGCGGACTCAGCGGGCCGGGTGCAGGCGCGGAGCTGG

GCCTCTGCGCCCGGCCCGACCTCCGTCTATAAATAGAGCAGCCAGTTGCAG

GGCTCCATTCTGCTTTCCAACTGCCTGACTGCTTGTTCGTCTCACTGGTGT

GAGCTCCAGCATCCCCTTTGCTCGAAATGGACCCCAACTGCTCTTGCGCCA
```

```
CTGGTGGCTCCTGCACGTGCGCCGGCTCCTGCAAGTGCAAAGAGTGCAAAT

GCACCTCCTGCAAGAAGAGCTGCTGTTCCTGCTGCCCCGTGGGCTGTGCCA

AGTGTGCCCAGGGCTGCGTCTGCAAAGGGGCATCGGAGAAGTGCAGCTGCT

GTGCCTGATGTGGGAACAGCTCTTCTCCCAGATGTAAATAGAACAACCTGC

ACAACCTGGATTTTTTTAAAAATACAACACTGAGCCATTTGCTGCATTTCT

TTTTATACTAAATATGTGACTGACAATAAAAACAATTTTGACTTTAAAAAA

AAAAAAAAA

Metallothionein-1E protein, isoform 1 [Homo
sapiens] (Ref No. NP_001350484.1)
                                          (SEQ ID NO: 3)
MDPNCSCATGGSCTCAGSCKCKECKCTSCKKSECGAISRNLGLWLRLGGNS

RLALSASFWGTGLSLPSLPVSFPLQAFCPKFRWGRTAFFSWDTNPNCTPYG

FRTELCQTKKSILWVWVLSSSQACY

Metallothionein-1E protein, isoform 2 [Homo
sapiens] (Ref No. NP_783316.2)
                                          (SEQ ID NO: 4)
MDPNCSCATGGSCTCAGSCKCKECKCTSCKKSCCSCCPVGCAKCAQGCVCK

GASEKCSCCA
```

MT2A—Metallothionein-2 (MT2A) is a protein that in humans is encoded by the MT2A gene. MT2A has been used as a biomarker in cancer research with particular interest in polymorphisms in the MT2A gene being linked to prostate cancer, breast cancer, nasopharyngeal cancer, stomach cancer, and colorectal cancer. Exemplary MTA2 transcript and protein sequences include:

```
Homo sapiens metallothionein 2A (MT2A), mRNA, cDNA
(Ref. No. NM_005953.4)
                                          (SEQ ID NO: 5)
ACTCGTCCCGGCTCTTTCTAGCTATAAACACTGCTTGCCGCGCTGCACTCC

ACCACGCCTCCTCCAAGTCCCAGCGAACCCGCGTGCAACCTGTCCCGACTC

TAGCCGCCTCTTCAGCTCGCCATGGATCCCAACTGCTCCTGCGCCGCCGGT

GACTCCTGCACCTGCGCCGGCTCCTGCAAATGCAAAGAGTGCAAATGCACC

TCCTGCAAGAAAGCTGCTGCTCCTGCTGCCCTGTGGGCTGTGCCAAGTGT

GCCCAGGGCTGCATCTGCAAAGGGGCGTCGGACAAGTGCAGCTGCTGCGCC

TGATGCTGGGACAGCCCCGCTCCCAGATGTAAAGAACGCGACTTCCACAAA

CCTGGATTTTTTATGTACAACCCTGACCGTGACCGTTTGCTATATTCCTTT

TTCTATGAAATAATGTGAATGATAATAAAACAGCTTTGACTTGAAAAAAAA

AAAAAAAAAAAAAAAAAAAAAAAAAAAAAAAAAAAAA

Metallothionein-2 protein [Homo sapiens] (Ref No.
NP_005944.1)
                                          (SEQ ID NO: 6)
MDPNCSCAAGDSCTCAGSCKCKECKCTSCKKSCCSCCPVGCAKCAQGCICK

GASDKCSCCA
```

Metal regulatory transcription factor 1 is a protein that in humans is encoded by the MTF1 gene (Brugnera et al. *Nucleic Acids Research.* 22: 3167-73; Entrez Gene: MTF1 metal-regulatory transcription factor 1). The MTF1 gene encodes a transcription factor that induces expression of metallothioneins and other genes involved in metal homeostasis in response to heavy metals such as cadmium, zinc, copper, and silver. The protein is a nucleocytoplasmic shuttling protein that accumulates in the nucleus upon heavy metal exposure and binds to promoters containing a metal-responsive element (MRE; Entrez Gene: MTF1 metal-regulatory transcription factor 1). Exemplary MTF1 transcript and protein sequences include:

```
Homo sapiens metal regulatory transcription factor
1 (MTF1), mRNA, cDNA (Ref No. NM_005955.2)
                                          (SEQ ID NO: 7)
GGAAGTGACGTTAGGGGAAGGTGGGGGCAATCATGGTGCCGCTGGGGAGGG

GAGAAGCTGCTGCTGCCGCCGTTGCCGGGAGCCGCGGAGACAAGTCATTAC

GTTTTCATTTCTCACAACTGGGCTGAGCACAACTGAACCATGGGGGAACAC

AGTCCAGACAACAACATCATCTACTTTGAGGCAGAGGAAGATGAGCTGACC

CCCGATGATAAAATGCTCAGGTTTGTGGATAAAAACGGACTGGTGCCTTCC

TCATCTGGAACTGTTTATGATAGGACCACTGTTCTTATTGAGCAGGACCCT

GGCACTTTGGAGGATGAAGATGACGACGGACAGTGCGGAGAACACTTGCCT

TTTCTAGTAGGGGGTGAAGAGGGCTTTCACCTGATAGATCATGAAGCAATG

TCCCAGGGTTATGTGCAGCACATTATCTCACCAGATCAGATTCATTTGACA

ATAAACCCTGGTTCCACACCCATGCCAAGAAATATTGAAGGTGCAACCCTC

ACTCTGCAGTCGGAATGTCCGGAAACAAAACGTAAAGAAGTAAAGCGGTAC

CAATGTACCTTTGAGGGCTGTCCCCGCACCTACAGCACAGCAGGCAACCTG

CGAACCCACCAGAAGACTCACCGAGGAGAGTACACCTTTGTCTGTAATCAG

GAGGGCTGTGGCAAAGCCTTCCTTACCTCTTACAGCCTCAGGATCCACGTG

CGAGTGCACACGAAGGAGAAGCCATTTGAGTGTGACGTGCAGGGCTGTGAG

AAGGCATTCAACACACTGTACAGGCTGAAAGCACATCAGAGGCTTCACACA

GGGAAAACGTTTAACTGTGAATCTGAAGGCTGCAGCAAATACTTCACCACA

CTCAGTGATCTGAGGAAGCACATTCGAACTCATACAGGGGAAAAGCCATTT

CGGTGCGATCACGATGGCTGTGGAAAAGCATTTGCAGCAAGCCACCACCTT

AAAAACTCACGTTCGTACACATACTGGTGAAAGACCCTTCTTCTGCCCCAGT

AATGGCTGTGAGAAAACATTCAGCACTCAATACAGTCTCAAAAGTCACATG

AAAGGTCATGATAACAAAGGACACTCATACAATGCACTTCCACAACACAAT

GGATCAGAGGATACAAATCACTCACTTTGTCTAAGTGACTTGAGCCTTCTG

TCCACAGATTCTGAATTGCGAGAAAATTCCAGTACGACCCAGGGCCAGGAC

CTCAGCACAATTTCACCAGCAATCATCTTTGAATCAATGTTCCAGAATTCA

GATGATACGGCAATTCAGGAAGATCCTCAACAGACAGCTTCCTTGACTGAA

AGTTTTAATGGTGATGCAGAGTCAGTCAGTGATGTTCCGCCATCCACAGGA

AATTCAGCATCTTTATCTCTTCCACTTGTACTGCAACCTGGCCTCTCCGAG

CCACCCCAGCCTCTACTACCTGCCTCAGCTCCGTCTGCTCCTCCGCCTGCT

CCCTCCCTAGGACCTGGCTCCCAGCAAGCTGCATTTGGCAACCCCCCTGCT

CTCTTACAACCTCCAGAAGTGCCTGTTCCCCACAGCACACAGTTTGCTGCT

AATCATCAAGAGTTTCTTCCGCACCCCCAGGCACCGCAGCCCATTGTACCA

GGACTTTCTGTTGTTGCTGGGGCTTCTGCATCAGCAGCGGCAGTGGCATCA

GCTGTGGCAGCACCAGCCCCACCACAAAGTACTACTGAGCCCCTGCCAGCC

ATGGTCCAGACTCTGCCCCTGGGTGCCAACTCTGTCCTAACTAATAATCCC

ACAATAACCATCACCCCAACTCCCAACACAGCTATCCTGCAGTCCAGCCTA
```

-continued

GTCATGGGAGAACAGAACTTACAATGGATATTAAATGGTGCCACCAGTTCT

CCACAAAACCAAGAACAAATTCAGCAAGCATCTAAAGTTGAGAAGGTGTTT

TTTACCACTGCAGTACCAGTAGCCAGTAGCCCAGGGAGCTCTGTCCAGCAG

ATTGGCCTCAGTGTTCCTGTGATCATCATCAAACAAGAAGAGGCATGTCAG

TGTCAGTGTGCATGCCGGGACTCTGCAAAGGAGCGGGCATCCAGCAGGAGA

AAGGGCTGCTCCTCCCCACCCCCTCCAGAGCCGAGCCCCCAGGCTCCTGAT

GGGCCCAGCCTGCAGCTCCCAGCGCAGACTTTCTCTTCAGCCCCTGTTCCC

GGGTCATCATCCTCTACCTTGCCCTCCTCCTGTGAGCAAAGCCGACAAGCA

GAGACTCCTTCAGACCCTCAGACAGAAACATTAAGTGCCATGGATGTGTCA

GAGTTTCTATCCCTCCAGAGCCTGGACACCCCGTCCAATCTGATTCCCATT

GAAGCACTACTGCAGGGGGAGGAGGAGATGGGCCTCACCAGCAGCTTCTCC

AAGTGAAGGGCCCATGTGTGCTCACCTCTGGGAAAAGCGGGTGAGCAGGAG

GCATGAGGTACAATGCCTGCCATCATGGGTCAGAAATTTGAAGGATGAAGA

AATCTACTGTTTGAAATCCTCACCTTTCAGACGTATTTTCTTTATTCACAT

CCCAGGAGCATCCATTTTAAGGAACTATTCTTTGGAAAAAAACAAAAAACA

AAAAAAACAACAAAAAAAGCTAAGTTATAAGTGAACTGTTTGGCTGCACTG

TATGTCACTTTTGCTTGTTGTCATGTGAACTTGGAAACTAAGGTTACTCGT

GTGCATAAAAATTCTAAATGAAAGGGTGTGGTTTCCATCAATCTGATGCTG

CCCATCGCTTGCACTGGGGTCTTTGTGGATCGGGCAGGAGTTTTCAGTGTG

TTGGGTGTTGCTCCTTCCTATGTGTCTTTTGAATCTGAGGCTGACATTTGC

TTGGAAGGCCAGACCCTTGCTCCATCAGAGAGGGCAGTGGCAAAGGCCAGT

GAGGCAGCTGTGAGTTGGACAGGGTTCAGGTGAGATGGTGTTGTCATTTGT

GCTTAGTGTTGGTGGTGCTCAGGGTGGATAACACGGGTCGTTCTGCAGCCC

GCTTCAGCACAAATAGGCAGCTTAAGGCCTGGCTCACAGGCTGTGGGGTTG

ATCTGGCTCTGCAGAGGCCCTAGGCAGCTTGTTGACTGCTGTCTGTTGATG

ACGTGTGTGCAAAGCAGGCTCTAGCAACATGATCACTGTCCTTGCCTTCCT

GGTTCTTTCTCTCGGTTGGTTGCCAGGGCTTGCAGATCGCAGTGAATTTTC

CTTGGGGAACATCGCTGTTTTGTCCTAGAGTGAACTTGTGGCTTATGGCCA

GTGCTGTTTGGTGGTCTGCCTTCTTTTTAATGGTATTTTCTTCCTCAGAGC

AGAAGGGCTGCATTTTGCTTATCAGAAGAAGGTGCAGATTTAAGGGAATTC

ATATGAGGTGGCATGTAATTGGCAGGCCAGGTGTCCTGGTTCCAGGTTCCA

GCCAGGCTTTGGGTTGCCCCCTCCATCTCTGCCCCCCTCTGGATTTTGCAT

ACAGCCTCATACAGTGCAAACAAGGATGTGACTTGCTCAGCTTAGTCATGT

GATTTATTTAAAAAAAAAAAAAAAAGAAACACAAAACGATGATCTTCTACT

CAGGGTATAGCAAAACAAAAAAATTCCCTTTCCACCAAAAAGCCTGAAATG

TTGCAATAAGTTATCTCATTTGGAATGTTTCATTAAGTTGTGTTATAGGAA

AAAATTGTGTGTGTGTGTTATAGAATTATATCCATATGTCTGCCTTTGGCT

CCAAGTCATTGCCTCTTAAAATAAAAGATACAATCCATACTAGCATGAAAA

GTTTCCCTCAACAGGCTATATTAACATAGTCATGAGTGCTGACCAAACTCA

CCGAGCTCAGAGGCCAGGCATGGCCTGAGGTGCAGAATAGGCCTCTGCCTC

CCAAGAGCCCTTTCCTTGCCCTGAGCAAGGAGTGGTGTTCCACAAACAAGG

CTGCTCTTCTAAGCCAACAGTGTCAGGCAGGAAGCAGCCATAATTTTGCCT

TGCATTTTCATTCCCTAATGTAAAGGGATCTGCATTGGTCACTCTCCTGTT

CTCTGAGCCATTGCTCAGGGCCAGCCAAGATATTATTGAGAACAGATAATT

TACCTTGGAGCCAGAGGCCCTCCCTGCCTTTAGCAAGGATGTTCAGGGACA

GACAAAGAGGGCAGTGGTGGTGAATGTTGTTACTGCCATGAGGAGAAATGG

CAGTAAGAAATCTTAACTACAAGCAGCCAATTTCTCATTCCAGGACCCTAG

CCAGAATAATTGACTTCTTTTTTTTTTTGAGACAGAGTTTTGCTTTTGTTG

CCCTGGCTGGAGTGCAGTGGCGCAATCTTGGCTCACCGCAACCTCCACTTC

CCAGGTTCAAGCAATTCTGCCTCAGCCTCCCGAGTAGCTGGGATTACAGGC

ATGCGCCACCACGCCTGGCTAATTTTGTATTTTTAGTAGAGACGGGGTTTC

TCCATGTTGGTCAGGCTGGTCTCGAACTCCCAACGTCAGGTGATCCTCCCG

CCTCAGTCTCCCAAAGTGCTGGGATTACAGGTGTGAGCCACCATGCCTGGT

CTAGGGAATTGACTTCTTTTTGACCTTCTGCACTCCCTTCCCCAAAAGGAT

TGTGGCTTCTGTTGACCATTGACCTCAGCAGAAGTTGATAAGGCAGGAGGT

TTCCAGTCCTCCTGGAAAACCAACTGCTGAGCATGAGTTGTCCTTGGCTGT

CTCTGGGCCTCGCACCCATGGGAAGTTTTGAGGTAGGGCCCTTGCTGTTTA

CAACTTCTGAGAGAGTAGTGATGGGACCCCAAAGTAAGCTTGTATCAGAGG

GCAGTAATGACCTTCCCATATCCCCATCCTGTGGTCACCTGGGATTTGGGT

TCCCTGGGGCGGAAGTGGGAAATAGGAGCCCAGGGAAGGACATCTGAAGCA

CCCACAGTTTAAATAGCGACTCTTCTTGGTTAGCCAGGGCTGTGCTCATGT

TGGGCCCTACCCAGGTCAGTGGCCTTTTCACTCTCAAAGATCGGGGGTGAC

GAAGCAGCATCTTAAACAGTGTTTAGGCTGACAGATTTTTCCAGTTGAAGA

AGCTGAAGTATCTGCCTTTTGAGGGTGACTCTAGATTACAAGAGAGACTAT

CAGATCCAATCAGCTTTTGAAAAATCAGGAATGTGCTTAAAATGCCAGTGA

GTGGTTGTGAAGATCAGGTTTATTTCCCAGGATAGGCAGTCTTTCTTTCCC

TCCTTTTCCAGTTCTCTTTTCCTACCTGTCCTTCCATAAGCCTGGTCTCTA

GTGCCGAGGACCTTGGAGAAGAGAGGGCCCCTAGCTAAGCTGGAGCCAGAA

AGAACCTTCATGGTGAGTGTGGTTTCCCAAACTTGGGAAATGAACCTAGGG

TGAGGTTAGGGAGGATTTGTAGAATTCTAGCAGGTAAAAATCAAGCCTTTT

TCCCCTCCCATAGTAAACTTAACCATTTTCACCCTGTACGTTATCTTCTAG

CTCCTACTAACATCTCCAATTAGACAACCGCTTCAAAGGGTGCTTAGCACC

AGGGATTGGGGTTCATGGACTTAGGAGGTGGTAAGGAAACTGGCTGGCACC

ACCAAACTGCCTTAGTGAACTTGGCCCTTCCCAGGCAGGTAGGTTGGGCAT

TGAGGGAAGGTGGCCCAGTCTTTGCTGGCAGGGTCTGGCCAGTCTCATGGG

GGCACCACCAGTTTGGTGACAGAAGTGGTGTCATTTATTGAATTCCACCTC

CGTTTAGAAGGAGATCATGGTACAAAGCCCAGGAGGGGCCTTAAGATGTGA

AGATCTCTCTGAGTAAAAGGCAAGGGGCTTCTCTTCTTCACCTCTGGGATA

GTTGGTAGATCGGAGAGTTTTATTTTCAGGGTCAAGGCTGTGGACTGATGG

GGATATTGGAGGGTGGGTGGGTTTTCCTGAGAGACTTTGTATAATGCTGAA

TGTGTCCAGAGGGACAAGTTTGCAGAACCTCATATTGGTATATTAAAGAAA

```
TAATAAAATAAAAAAGCACTTTAGGTTATTTTATCTTTAACCCGATTGCTG

CAATTTCTTTTGTGTGTATATATACATATATATACTTTCCACAAAGTTTTA

TTTTTTGCTCAGAATAAAAAGTTAAATTGAGGTGTGAAAAGAAAAGCACTT

ACCTTGGTGCAATATGTGTAGCTTGATGGTCGTTGTCCCATGTGGCCCTGG

CCTGGCAGCGTTTTTCCGCTCAATCAGCCCTGTGCTGTGAGACTGTCCATA

GGGAAACACTATTATGCATTCTCAGCAACCGCTCAATCTATGCAAGCCTTC

CCTGTGTGCCCCAGGGCGCCCCCTCAGGCTCTCTGAAGAACTGCTGTGGGT

CCTGTTTTCTGCTGACTGTTGAGGCCCTTTTTCATCACTTCTTGGTCTCTC

GCCATCTTTTCCCTCTTCACCATTACAAAATGATGCCTGAAAGGAAGGAAC

AGATTGTTCCTAGGTAGAAACCTGGCACCTTCTAGACTTTTATATTTGTAA

TCACATCCATTGTCCTTAAAGACTTTTCCAGAGTGATTGAAACCATTGATT

TGTGGAACTGCAACAATATTTCTCAAGAGTTTACAATTGTCTTACACCACC

AATCAGAAATATGTTTGGGGAGGCATGGGTGGCAGGGGGCAACATGAGCCA

TTTCCATACTGCTCCCCATACTACCTGTGTTGGTTCCTTAAGCAAAAAGGC

CTCCAGCCTTCATTAAATCCTATAAACAAACATTACATCCCATGAATCATT

ATCAACTTTCTTCCTTTACTCCACCTCCCCCATTTTATCTTCAATTCTCAG

GCTATAGAATAGACAAGTTTTAGAATATACTTCAGCCAAAGCAGAAGGATT

TTCATAGATCCAATATGCAAATAGTTCTGCTGTGACATAGATCAGAAATTG

TCTGTTCCTTAATATTTGGGGGTGGAGGCAACAAAACTGAAGCATATTTCT

GATTGGTTAGCCATTTTGGCCTGTTTCCTCTTGCATGTTTTTTAGGGAGAG

AGGGAAACAGTCCTGTATTTCTTCTGATGCCCTTTGGGGAAGCCGACGACC

ACTGGGCATTTCTCACTGTTACTCCTGTTCAAGAGAGGGCTTCTCAGTCTG

CACTGAAAAATGCAAATTAAACTGGATCTTTATGTCAATGTGTACATAGTA

CAAGCTTTTTTACTGGAATTGAGGTTTAAAACCACACACTGCCCTTTTGGT

GGTGTGCCTGTTGGGCCAAAAATTGGGTGATAATGTAGTGTCACTTTCTCA

GCTCAATGCAGTTTCTACTTTTTCTTATGGGAAAATTTTTCATAAAACCTT

TTTGCACCAAAACCCAGGGGTGTTTTTTGCAATATCCTTGTTATCCTCGTA

GTGTGCCAAGTCAGAGGCTTTCTCTTGCCCTTTTCCTGCTGTGTTCTCAGG

CCTCCCAAGGGCTATTTGACTCAACAGTCTACATCCTTCGTTGTGTTTTGG

AGAATGTGGGGTGGGGTCAGAGTTCAAGGTGTCTGTTCCCTTTTCCTGT

GAACTCTTTCTAGTCCCTATTTGGGAGGGTGGCTGGAAACAGATTTTTGC

TGAATTTCTGGCTCAGATCTTCTAGCCAGGAAAGGCAAGAGCCCCCAAGAG

CCCTTTTTTTGACATACACTAATCATTGGCCGGGTCTTGGTGACAACTT

TTAAAATCCCAAATAGTTTTATTTGGATTATGTAAAAGTAAGTGTGAAACA

TGGGAACAACGGACTTCCACTGAGCGATGTGAAAACGTTACAGGTTCAGTA

CTTCCAAAGGAAGAAACCTCCAAACCCAAAAAAGAATAAATATGAATTTGT

ATTTTTGAAGAATGTGAAATAATGGTGTTTGCTTAATTGCTCATTTTGTAT

AAACTTAATATTGTACTTTAAAATATCTGCTAAAAAGTGAAAATTTAACTT

TTTGGAATTGAAAAAGCAATATTAAATACTAATGAAATCCTAATTAAATGC

TTATTTAAATCTGGTAAAAAAAAAAAAAAA
```

Homo sapiens metal regulatory transcription factor 1 (MTF1), protein (Ref. No. NP_005946.2)

(SEQ ID NO: 8)

```
MGEHSPDNNIIYFEAEEDELTPDDKMLRFVDKNGLVPSSSGTVYDRTTVLI

EQDPGTLEDEDDDGQCGEHLPFLVGGEEGFHLIDHEAMSQGYVQHIISPDQ

IHLTINPGSTPMPRNIEGATLTLQSECPETKRKEVKRYQCTFEGCPRTYST

AGNLRTHQKTHRGEYTFVCNQEGCGKAFLTSYSLRIHVRVHTKEKPFECDV

QGCEKAFNTLYRLKAHQRLHTGKTFNCESEGCSKYFTTLSDLRKHIRTHTG

EKPFRCDHDGCGKAFAASHHLKTHVRTHTGERPFFCPSNGCEKTFSTQYSL

KSHMKGHDNKGHSYNALPQHNGSEDTNHSLCLSDLSLLSTDSELRENSSTT

QGQDLSTISPAIIFESMFQNSDDTAIQEDPQQTASLTESFNGDAESVSDVP

PSTGNSASLSLPLVLQPGLSEPPQPLLPASAPSAPPPAPSLGPGSQQAAFG

NPPALLQPPEVPVPHSTQFAANHQEFLPHPQAPQPIVPGLSVVAGASASAA

AVASAVAAPAPPQSTTEPLPAMVQTLPLGANSVLTNNPTITITPTPNTAIL

QSSLVMGEQNLQWILNGATSSPQNQEQIQQASKVEKVFFTTAVPVASSPGS

SVQQIGLSVPVIIIKQEEACQCQCACRDSAKERASSRRKGCSSPPPPEPSP

QAPDGPSLQLPAQTFSSAPVPGSSSSTLPSSCEQSRQAETPSDPQTETLSA

MDVSEFLSLQSLDTPSNLIPIEALLQGEEEMGLTSSFSK
```

Identification of Arm-Level Loss of Chromosome 16q, Focal Copy Loss of 16q13, Low Expression of Metallothionein Proteins and/or Low Gene Expression or Methylation of Metallothionein Genes in Cells, Tissues and/or Cancers Identification of a tissue, tumor and/or cancer of a subject as exhibiting arm-level loss of chromosome 16q, focal copy loss of 16q13, low expression of metallothionein proteins and/or low gene expression or methylation of metallothionein genes (e.g., MTF1; MT1 and MT2 isoforms, such as MT1E and MT2A) can be performed by any method available in the art. Certain methods and compositions described herein relate to identification of a cell, cell line, sample, tissue and/or subject having or at risk of developing a cancer that exhibits arm-level loss of chromosome 16q and/or focal copy loss of 16q13. Among other contemplated means of detection, microsatellite analysis (LOH), Southern blotting, and comparative genomic hybridization (CGH) are commonly used to identify arm level and/or focal copy losses in chromosome 16q.

Related methods and compositions described herein concern identification of a cell, cell line, sample, tissue and/or subject having or at risk of developing a cancer that exhibits low expression of metallothionein proteins and/or low gene expression or methylation of metallothionein genes (e.g., MTF1; MT1 and MT2 isoforms, such as MT1E and MT2A), resulting in low MT mRNA levels, with such identification based upon gene-specific assessment of MT mRNA or protein (e.g., MTF1; MT1 and MT2 isoforms, such as MT1E and MT2A) performed upon the cell, cell line, sample, tissue and/or subject having or at risk of developing a cancer that exhibits low expression of metallothionein proteins and/or low gene expression or methylation of metallothionein genes (e.g., MTF1; MT1 and MT2 isoforms, such as MT1E and MT2A). In certain embodiments, detection of low MT (e.g., MT1 and/or MT2, including MT1E and MT2A genes, etc.) levels can readily be performed, e.g., via assessment of mRNA expression levels (e.g., via real-time PCR or other such quantitative method). In related embodiments, assessment of MT mRNA expression can be performed via art-recognized, oligonucleotide-mediated approaches, including, e.g., northern blotting, expression profiling using RT-PCR and/or next-generation sequencing performed upon cellular transcriptomes.

In some embodiments, detection of low MT expression levels can readily be performed, e.g., via immunoassay for detection of MT protein levels.

Protein levels of MT genes can be quantitated in a variety of ways well known in the art, such as immunoprecipitation, western blot analysis (immunoblotting), ELISA or fluorescence-activated cell sorting (FACS). Antibodies directed to one or more MT proteins can be identified and obtained from a variety of sources, such as the MSRS catalog of antibodies (Aerie Corporation, Birmingham, Mich.), or can be prepared via conventional antibody generation methods. Methods for preparation of polyclonal antisera are taught in, for example, Ausubel, F. M. et al., Current Protocols in Molecular Biology, Volume 2, pp. 11.12.1-11.12.9, John Wiley & Sons, Inc., 1997. Preparation of monoclonal antibodies is taught in, for example, Ausubel, F. M. et al., Current Protocols in Molecular Biology, Volume 2, pp. 11.4.1-11.11.5, John Wiley & Sons, Inc., 1997.

Immunoprecipitation methods are standard in the art and can be found at, for example, Ausubel, F. M. et al., Current Protocols in Molecular Biology, Volume 2, pp. 10.16.1-10.16.11, John Wiley & Sons, Inc., 1998. Western blot (immunoblot) analysis is standard in the art and can be found at, for example, Ausubel, F. M. et al., Current Protocols in Molecular Biology, Volume 2, pp. 10.8.1-10.8.21, John Wiley & Sons, Inc., 1997. Enzyme-linked immunosorbent assays (ELISA) are standard in the art and can be found at, for example, Ausubel, F. M. et al., Current Protocols in Molecular Biology, Volume 2, pp. 11.2.1-11.2.22, John Wiley & Sons, Inc., 1991.

Treatable Cancers

A number of cancers have been described in the art as exhibiting arm-level loss of chromosome 16q, focal copy loss of 16q13 and/or low expression of metallothionein proteins and/or low gene expression or methylation of metallothionein genes. As noted herein, exemplary types of cancer that have been identified as exhibiting arm-level loss of chromosome 16q, focal copy loss of 16q13 and/or low expression of metallothionein proteins and/or low gene expression or methylation of metallothionein genes include uterine, ovarian, gastroesophageal, lung, and other biomarker-positive cancers. The range of cancers presently contemplated as treatable using disulfiram, elesclomol and thiram, as well as metabolites and/or derivatives/analogs of such compounds, as described herein is not in any way limited to these aforementioned types of cancer.

As used in this context, to "treat" means to ameliorate at least one symptom of the cancer. For example, a treatment can result in a reduction in tumor size, tumor growth, cancer cell number, cancer cell growth, or metastasis or risk of metastasis.

For example, the methods can include selecting and/or administering a treatment that includes a therapeutically effective amount of disulfiram, elesclomol and/or thiram, or metabolites and/or derivatives/analogs of such compounds, optionally including other agents capable of selectively killing cells that exhibit arm-level loss of chromosome 16q, focal copy loss of 16q13 and/or low expression of metallothionein proteins and/or low gene expression or methylation of metallothionein genes. In certain embodiments, disulfiram, elesclomol and/or thiram, or metabolites and/or derivatives/analogs of such compounds, and/or other agents capable of selectively killing cells that exhibit arm-level loss of chromosome 16q, focal copy loss of 16q13 and/or low expression of metallothionein proteins and/or low gene expression or methylation of metallothionein genes may be administered in combination with an additional therapeutic agent, optionally a chemotherapeutic agent including vinorelbine and platinum agents such as cisplatin or carboplatin, and/or Letrozole, Anastrozole, Exemestane, Doxorubicin, Liposomal doxorubicin, Cyclophosphamide, Capecitabine, Docetaxel, Paclitaxel, Nab-paclitaxel, Trastuzumab, Ado-trastuzumab emtansine, Pertuzumab, Neratinib, Gemcitabine, Tamoxifen, Methotrexate, 5-Fluorouracil, Palbociclib, Abemaciclib, Fulvestrant, Olaparib, Eribulin, Pemetrexed, bevacizumab, nivolumab, pembrolizumab, ipilimumab, Oxaliplatin and/or ramucirumab can be administered in combination with the agent(s) of the instant disclosure. Optionally, other art-recognized drugs for treatment of breast, lung, gastroesophageal cancer can be administered in combination with the agents of the instant disclosure.

An "effective amount" is an amount sufficient to effect beneficial or desired results. For example, a therapeutic amount is one that achieves the desired therapeutic effect. This amount can be the same or different from a prophylactically effective amount, which is an amount necessary to prevent onset of disease or disease symptoms. An effective amount can be administered in one or more administrations, applications or dosages. A therapeutically effective amount of a therapeutic compound (i.e., an effective dosage) depends on the therapeutic compounds selected. The compositions can be administered from one or more times per day to one or more times per week; including once every other day. The skilled artisan will appreciate that certain factors may influence the dosage and timing required to effectively treat a subject, including but not limited to the severity of the disease or disorder, previous treatments, the general health and/or age of the subject, and other diseases present. Moreover, treatment of a subject with a therapeutically effective amount of the therapeutic compounds described herein can include a single treatment or a series of treatments.

Dosage, toxicity and therapeutic efficacy of the therapeutic compounds can be determined by standard pharmaceutical procedures in cell cultures or experimental animals, e.g., for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. Compounds which exhibit high therapeutic indices are preferred. While compounds that exhibit toxic side effects may be used, care should be taken to design a delivery system that targets such compounds to the site of affected tissue in order to minimize potential damage to uninfected cells and, thereby, reduce side effects.

The data obtained from cell culture assays and animal studies can be used in formulating a range of dosage for use in humans. The dosage of such compounds lies preferably within a range of circulating concentrations that include the ED50 with little or no toxicity. The dosage may vary within this range depending upon the dosage form employed and the route of administration utilized. For any compound used in the method of the invention, the therapeutically effective dose can be estimated initially from cell culture assays. A dose may be formulated in animal models to achieve a circulating plasma concentration range that includes the IC50 (i.e., the concentration of disulfiram, elesclomol and/or thiram, or metabolites and/or derivatives/analogs of such compounds, which achieves a half-maximal inhibition of symptoms and/or a half-maximal extent of killing of targeted cancer cells) as determined in cell culture. Such information can be used to more accurately determine useful doses in humans. Levels in plasma may be measured, for example, by high performance liquid chromatography.

Combination Treatments

The compositions and methods of the present disclosure may be used in the context of a number of therapeutic or prophylactic applications. In order to increase the effectiveness of a treatment with the compositions of the present disclosure, e.g., disulfiram, elesclomol and/or thiram, or metabolites and/or derivatives/analogs of such compounds can be selected and/or administered as a single agent, or to augment the efficacy of another therapy (second therapy), and it may be desirable to combine these compositions and methods with one another, or with other agents and methods effective in the treatment, amelioration, or prevention of diseases and pathologic conditions, for example, cancers characterized by arm-level loss of chromosome 16q, focal copy loss of 16q13 and/or low expression of metallothionein proteins and/or low gene expression or methylation of metallothionein genes (e.g., uterine, ovarian, gastroesophageal, lung, and other biomarker-positive cancers).

In certain embodiments of the instant disclosure, one or more chemotherapeutic drugs that are unrelated to disulfiram, elesclomol and/or thiram can be co-administered with disulfiram, elesclomol and/or thiram or related compound, or can be administered in advance of disulfiram, elesclomol and/or thiram or related compound administration. Examples of such non-disulfiram, elesclomol and/or thiram or related compound chemotherapeutics include vinorelbine and platinum agents such as cisplatin or carboplatin, as well as Letrozole, Anastrozole, Exemestane, Doxorubicin, Liposomal doxorubicin, Cyclophosphamide, Capecitabine, Docetaxel, Paclitaxel, Nab-paclitaxel, Trastuzumab, Ado-trastuzumab emtansine, Pertuzumab, Neratinib, Gemcitabine, Tamoxifen, Methotrexate, 5-Fluorouracil, Palbociclib, Abemaciclib, Fulvestrant, Olaparib, Eribulin, Pemetrexed, bevacizumab, nivolumab, pembrolizumab, ipilimumab, Oxaliplatin and/or ramucirumab.

Administration of a composition of the present disclosure to a subject will follow general protocols for the administration described herein, and the general protocols for the administration of a particular secondary therapy will also be followed, taking into account the toxicity, if any, of the treatment. It is expected that the treatment cycles would be repeated as necessary. It also is contemplated that various standard therapies may be applied in combination with the described therapies.

Pharmaceutical Compositions

Agents of the present disclosure can be incorporated into a variety of formulations for therapeutic use (e.g., by administration) or in the manufacture of a medicament (e.g., for treating or preventing cancer, e.g., a cancer that exhibits arm-level loss of chromosome 16q, focal copy loss of 16q13 and/or low expression of a metallothionein gene and/or protein) by combining the agents with appropriate pharmaceutically acceptable carriers or diluents, and may be formulated into preparations in solid, semi-solid, liquid or gaseous forms. Examples of such formulations include, without limitation, tablets, capsules, powders, granules, ointments, solutions, suppositories, injections, inhalants, gels, microspheres, and aerosols.

Pharmaceutical compositions can include, depending on the formulation desired, pharmaceutically-acceptable, non-toxic carriers of diluents, which are vehicles commonly used to formulate pharmaceutical compositions for animal or human administration. The diluent is selected so as not to affect the biological activity of the combination. Examples of such diluents include, without limitation, distilled water, buffered water, physiological saline, PBS, Ringer's solution, dextrose solution, and Hank's solution. A pharmaceutical composition or formulation of the present disclosure can further include other carriers, adjuvants, or non-toxic, non-therapeutic, nonimmunogenic stabilizers, excipients and the like. The compositions can also include additional substances to approximate physiological conditions, such as pH adjusting and buffering agents, toxicity adjusting agents, wetting agents and detergents.

Further examples of formulations that are suitable for various types of administration can be found in Remington's Pharmaceutical Sciences, Mace Publishing Company, Philadelphia, PA, 17th ed. (1985). For a brief review of methods for drug delivery, see, Langer, Science 249: 1527-1533 (1990).

For oral administration, the active ingredient can be administered in solid dosage forms, such as capsules, tablets, and powders, or in liquid dosage forms, such as elixirs, syrups, and suspensions. The active component(s) can be encapsulated in gelatin capsules together with inactive ingredients and powdered carriers, such as glucose, lactose, sucrose, mannitol, starch, cellulose or cellulose derivatives, magnesium stearate, stearic acid, sodium saccharin, talcum, magnesium carbonate. Examples of additional inactive ingredients that may be added to provide desirable color, taste, stability, buffering capacity, dispersion or other known desirable features are red iron oxide, silica gel, sodium lauryl sulfate, titanium dioxide, and edible white ink.

Similar diluents can be used to make compressed tablets. Both tablets and capsules can be manufactured as sustained release products to provide for continuous release of medication over a period of hours. Compressed tablets can be sugar coated or film coated to mask any unpleasant taste and protect the tablet from the atmosphere, or enteric-coated for selective disintegration in the gastrointestinal tract. Liquid dosage forms for oral administration can contain coloring and flavoring to increase patient acceptance.

Formulations suitable for parenteral administration include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives.

As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutically acceptable salts of amines, carboxylic acids, and other types of compounds, are well known in the art. For example, S. M. Berge, et al. describe pharmaceutically acceptable salts in detail in J Pharmaceutical Sciences 66 (1977):1-19, incorporated herein by reference. The salts can be prepared in situ during the final isolation and purification of the compounds of the application, or separately by reacting a free base or free acid function with a suitable reagent, as described generally below. For example, a free base function can be reacted with a suitable acid. Furthermore, where the compounds to be administered of the application carry an acidic moiety, suitable pharmaceutically acceptable salts thereof may, include metal salts such as alkali metal salts, e.g.

sodium or potassium salts; and alkaline earth metal salts, e.g. calcium or magnesium salts. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, loweralkyl sulfonate and aryl sulfonate.

Additionally, as used herein, the term "pharmaceutically acceptable ester" refers to esters that hydrolyze in vivo and include those that break down readily in the human body to leave the parent compound (e.g., an FDA-approved compound where administered to a human subject) or a salt thereof. Suitable ester groups include, for example, those derived from pharmaceutically acceptable aliphatic carboxylic acids, particularly alkanoic, alkenoic, cycloalkanoic and alkanedioic acids, in which each alkyl or alkenyl moeity advantageously has not more than 6 carbon atoms. Examples of particular esters include formates, acetates, propionates, butyrates, acrylates and ethyl succinates.

Furthermore, the term "pharmaceutically acceptable prodrugs" as used herein refers to those prodrugs of certain compounds of the present application which are, within the scope of sound medical judgment, suitable for use in contact with the issues of humans and lower animals with undue toxicity, irritation, allergic response, and the like, commensurate with a reasonable benefit/risk ratio, and effective for their intended use, as well as the zwitterionic forms, where possible, of the compounds of the application. The term "prodrug" refers to compounds that are rapidly transformed in vivo to yield the parent compound of an agent of the instant disclosure, for example by hydrolysis in blood. A thorough discussion is provided in T. Higuchi and V. Stella, Prodrugs as Novel Delivery Systems, Vol. 14 of the A.C.S. Symposium Series, and in Edward B. Roche, ed., Bioreversible Carriers in Drug Design, American Pharmaceutical Association and Pergamon Press, (1987), both of which are incorporated herein by reference.

The components used to formulate the pharmaceutical compositions are preferably of high purity and are substantially free of potentially harmful contaminants (e.g., at least National Food (NF) grade, generally at least analytical grade, and more typically at least pharmaceutical grade). Moreover, compositions intended for in vivo use are usually sterile. To the extent that a given compound must be synthesized prior to use, the resulting product is typically substantially free of any potentially toxic agents, particularly any endotoxins, which may be present during the synthesis or purification process. Compositions for parental administration are also sterile, substantially isotonic and made under GMP conditions.

Formulations may be optimized for retention and stabilization in a subject and/or tissue of a subject, e.g., to prevent rapid clearance of a formulation by the subject. Stabilization techniques include cross-linking, multimerizing, or linking to groups such as polyethylene glycol, polyacrylamide, neutral protein carriers, etc. in order to achieve an increase in molecular weight.

Other strategies for increasing retention include the entrapment of the agent, such as disulfiram, elesclomol and/or thiram, and/or an active metabolite and/or derivative/analog thereof, in a biodegradable or bioerodible implant. The rate of release of the therapeutically active agent is controlled by the rate of transport through the polymeric matrix, and the biodegradation of the implant. The transport of drug through the polymer barrier will also be affected by compound solubility, polymer hydrophilicity, extent of polymer cross-linking, expansion of the polymer upon water absorption so as to make the polymer barrier more permeable to the drug, geometry of the implant, and the like. The implants are of dimensions commensurate with the size and shape of the region selected as the site of implantation. Implants may be particles, sheets, patches, plaques, fibers, microcapsules and the like and may be of any size or shape compatible with the selected site of insertion.

The implants may be monolithic, i.e. having the active agent homogenously distributed through the polymeric matrix, or encapsulated, where a reservoir of active agent is encapsulated by the polymeric matrix. The selection of the polymeric composition to be employed will vary with the site of administration, the desired period of treatment, patient tolerance, the nature of the disease to be treated and the like. Characteristics of the polymers will include biodegradability at the site of implantation, compatibility with the agent of interest, ease of encapsulation, a half-life in the physiological environment.

Biodegradable polymeric compositions which may be employed may be organic esters or ethers, which when degraded result in physiologically acceptable degradation products, including the monomers. Anhydrides, amides, orthoesters or the like, by themselves or in combination with other monomers, may find use. The polymers will be condensation polymers. The polymers may be cross-linked or non-cross-linked. Of particular interest are polymers of hydroxyaliphatic carboxylic acids, either homo- or copolymers, and polysaccharides. Included among the polyesters of interest are polymers of D-lactic acid, L-lactic acid, racemic lactic acid, glycolic acid, polycaprolactone, and combinations thereof. By employing the L-lactate or D-lactate, a slowly biodegrading polymer is achieved, while degradation is substantially enhanced with the racemate. Copolymers of glycolic and lactic acid are of particular interest, where the rate of biodegradation is controlled by the ratio of glycolic to lactic acid. The most rapidly degraded copolymer has roughly equal amounts of glycolic and lactic acid, where either homopolymer is more resistant to degradation. The ratio of glycolic acid to lactic acid will also affect the brittleness of in the implant, where a more flexible implant is desirable for larger geometries. Among the polysaccharides of interest are calcium alginate, and functionalized celluloses, particularly carboxymethylcellulose esters characterized by being water insoluble, a molecular weight of about 5 kD to 500 kD, etc. Biodegradable hydrogels may also be employed in the implants of the individual instant disclosure. Hydrogels are typically a copolymer material, characterized by the ability to imbibe a liquid. Exemplary biodegradable hydrogels which may be employed are described in Heller in: Hydrogels in Medicine and Pharmacy, N. A. Peppes ed., Vol. III, CRC Press, Boca Raton, Fla., 1987, pp 137-149.

Pharmaceutical Dosages

Pharmaceutical compositions of the present disclosure containing an agent described herein may be used (e.g., administered to an individual, such as a human individual, in need of treatment with disulfiram, elesclomol and/or thiram, and/or an active metabolite and/or derivative/analog thereof) in accord with known methods, such as oral administration, intravenous administration as a bolus or by continuous infusion over a period of time, by intramuscular, intraperitoneal, intracerobrospinal, intracranial, intraspinal, subcutaneous, intraarticular, intrasynovial, intrathecal, topical, or inhalation routes.

Dosages and desired drug concentration of pharmaceutical compositions of the present disclosure may vary depending on the particular use envisioned. The determination of the appropriate dosage or route of administration is well within the skill of an ordinary artisan. Animal experiments provide reliable guidance for the determination of effective doses for human therapy. Interspecies scaling of effective doses can be performed following the principles described in Mordenti, J. and Chappell, W. "The Use of Interspecies Scaling in Toxicokinetics," In Toxicokinetics and New Drug Development, Yacobi et al., Eds, Pergamon Press, New York 1989, pp. 42-46.

For in vivo administration of any of the agents of the present disclosure, normal dosage amounts may vary from about 10 ng/kg up to about 100 mg/kg of an individual's and/or subject's body weight or more per day, depending upon the route of administration. In some embodiments, the dose amount is about 1 mg/kg/day to 20 mg/kg/day. For repeated administrations over several days or longer, depending on the severity of the disease, disorder, or condition to be treated, the treatment is sustained until a desired suppression of symptoms is achieved.

An effective amount of an agent of the instant disclosure may vary, e.g., from about 0.001 mg/kg to about 1000 mg/kg or more in one or more dose administrations for one or several days (depending on the mode of administration). In certain embodiments, the effective amount per dose varies from about 0.001 mg/kg to about 1000 mg/kg, from about 0.01 mg/kg to about 750 mg/kg, from about 0.1 mg/kg to about 500 mg/kg, from about 1.0 mg/kg to about 250 mg/kg, and from about 10.0 mg/kg to about 150 mg/kg.

An exemplary dosing regimen may include administering an initial dose of an agent of the disclosure of about 200 µg/kg, followed by a weekly maintenance dose of about 100 µg/kg every other week. Other dosage regimens may be useful, depending on the pattern of pharmacokinetic decay that the physician wishes to achieve. For example, dosing an individual from one to twenty-one times a week is contemplated herein. In certain embodiments, dosing ranging from about 3 µg/kg to about 2 mg/kg (such as about 3 µg/kg, about 10 µg/kg, about 30 µg/kg, about 100 µg/kg, about 300 µg/kg, about 1 mg/kg, or about 2 mg/kg) may be used. In certain embodiments, dosing frequency is three times per day, twice per day, once per day, once every other day, once weekly, once every two weeks, once every four weeks, once every five weeks, once every six weeks, once every seven weeks, once every eight weeks, once every nine weeks, once every ten weeks, or once monthly, once every two months, once every three months, or longer. Progress of the therapy is easily monitored by conventional techniques and assays. The dosing regimen, including the agent(s) administered, can vary over time independently of the dose used.

Pharmaceutical compositions described herein can be prepared by any method known in the art of pharmacology. In general, such preparatory methods include the steps of bringing the agent or compound described herein (i.e., the "active ingredient") into association with a carrier or excipient, and/or one or more other accessory ingredients, and then, if necessary and/or desirable, shaping, and/or packaging the product into a desired single- or multi-dose unit.

Pharmaceutical compositions can be prepared, packaged, and/or sold in bulk, as a single unit dose, and/or as a plurality of single unit doses. A "unit dose" is a discrete amount of the pharmaceutical composition comprising a predetermined amount of the active ingredient. The amount of the active ingredient is generally equal to the dosage of the active ingredient which would be administered to a subject and/or a convenient fraction of such a dosage such as, for example, one-half or one-third of such a dosage.

Relative amounts of the active ingredient, the pharmaceutically acceptable excipient, and/or any additional ingredients in a pharmaceutical composition described herein will vary, depending upon the identity, size, and/or condition of the subject treated and further depending upon the route by which the composition is to be administered. The composition may comprise between 0.1% and 100% (w/w) active ingredient.

Pharmaceutically acceptable excipients used in the manufacture of provided pharmaceutical compositions include inert diluents, dispersing and/or granulating agents, surface active agents and/or emulsifiers, disintegrating agents, binding agents, preservatives, buffering agents, lubricating agents, and/or oils. Excipients such as cocoa butter and suppository waxes, coloring agents, coating agents, sweetening, flavoring, and perfuming agents may also be present in the composition.

Exemplary diluents include calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures thereof.

Exemplary granulating and/or dispersing agents include potato starch, corn starch, tapioca starch, sodium starch glycolate, clays, alginic acid, guar gum, citrus pulp, agar, bentonite, cellulose, and wood products, natural sponge, cation-exchange resins, calcium carbonate, silicates, sodium carbonate, cross-linked poly(vinyl-pyrrolidone) (crospovidone), sodium carboxymethyl starch (sodium starch glycolate), carboxymethyl cellulose, cross-linked sodium carboxymethyl cellulose (croscarmellose), methylcellulose, pregelatinized starch (starch 1500), microcrystalline starch, water insoluble starch, calcium carboxymethyl cellulose, magnesium aluminum silicate (Veegum), sodium lauryl sulfate, quaternary ammonium compounds, and mixtures thereof.

Exemplary surface active agents and/or emulsifiers include natural emulsifiers (e.g., acacia, agar, alginic acid, sodium alginate, tragacanth, chondrux, cholesterol, xanthan, pectin, gelatin, egg yolk, casein, wool fat, cholesterol, wax, and lecithin), colloidal clays (e.g., bentonite (aluminum silicate) and Veegum (magnesium aluminum silicate)), long chain amino acid derivatives, high molecular weight alcohols (e.g., stearyl alcohol, cetyl alcohol, oleyl alcohol, triacetin monostearate, ethylene glycol distearate, glyceryl monostearate, and propylene glycol monostearate, polyvinyl alcohol), carbomers (e.g., carboxy polymethylene, polyacrylic acid, acrylic acid polymer, and carboxyvinyl polymer), carrageenan, cellulosic derivatives (e.g., carboxymethylcellulose sodium, powdered cellulose, hydroxymethyl cellulose, hydroxypropyl cellulose, hydroxypropyl methylcellulose, methylcellulose), sorbitan fatty acid esters (e.g., polyoxyethylene sorbitan monolaurate (Tween® 20), polyoxyethylene sorbitan (Tween® 60), polyoxyethylene sorbitan monooleate (Tween® 80), sorbitan monopalmitate (Span® 40), sorbitan monostearate (Span® 60), sorbitan tristearate (Span® 65), glyceryl monooleate, sorbitan monooleate (Span® 80), polyoxyethylene esters (e.g., polyoxyethylene monostearate (Myrj® 45), polyoxyethylene hydrogenated castor oil, polyethoxylated castor oil, polyoxymethylene stearate, and Solutol®), sucrose fatty acid esters, polyethylene glycol fatty acid esters (e.g., Cremophor®), polyoxyethylene ethers, (e.g., polyoxyethylene lauryl ether (Brij® 30)), poly(vinyl-pyrrolidone), diethylene glycol monolaurate, triethanolamine oleate, sodium oleate, potassium oleate, ethyl oleate, oleic acid, ethyl laurate, sodium lauryl sulfate, Pluronic® F-68, Poloxamer P-188, cetrimonium bromide, cetylpyridinium chloride, benzalkonium chloride, docusate sodium, and/or mixtures thereof.

Exemplary binding agents include starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinyl-pyrrolidone), magnesium aluminum silicate (Veegum®), and larch arabogalactan), alginates, polyethylene oxide, polyethylene glycol, inorganic calcium salts, silicic acid, polymethacrylates, waxes, water, alcohol, and/or mixtures thereof.

Exemplary preservatives include antioxidants, chelating agents, antimicrobial preservatives, antifungal preservatives, antiprotozoan preservatives, alcohol preservatives, acidic preservatives, and other preservatives. In certain embodiments, the preservative is an antioxidant. In other embodiments, the preservative is a chelating agent.

Exemplary antioxidants include alpha tocopherol, ascorbic acid, acorbyl palmitate, butylated hydroxyanisole, butylated hydroxytoluene, monothioglycerol, potassium metabisulfite, propionic acid, propyl gallate, sodium ascorbate, sodium bisulfite, sodium metabisulfite, and sodium sulfite.

Exemplary chelating agents include ethylenediaminetetraacetic acid (EDTA) and salts and hydrates thereof (e.g., sodium edetate, disodium edetate, trisodium edetate, calcium disodium edetate, dipotassium edetate, and the like), citric acid and salts and hydrates thereof (e.g., citric acid monohydrate), fumaric acid and salts and hydrates thereof, malic acid and salts and hydrates thereof, phosphoric acid and salts and hydrates thereof, and tartaric acid and salts and hydrates thereof. Exemplary antimicrobial preservatives include benzalkonium chloride, benzethonium chloride, benzyl alcohol, bronopol, cetrimide, cetylpyridinium chloride, chlorhexidine, chlorobutanol, chlorocresol, chloroxylenol, cresol, ethyl alcohol, glycerin, hexetidine, imidurea, phenol, phenoxyethanol, phenylethyl alcohol, phenylmercuric nitrate, propylene glycol, and thimerosal.

Exemplary antifungal preservatives include butyl paraben, methyl paraben, ethyl paraben, propyl paraben, benzoic acid, hydroxybenzoic acid, potassium benzoate, potassium sorbate, sodium benzoate, sodium propionate, and sorbic acid.

Exemplary alcohol preservatives include ethanol, polyethylene glycol, phenol, phenolic compounds, bisphenol, chlorobutanol, hydroxybenzoate, and phenylethyl alcohol.

Exemplary acidic preservatives include vitamin A, vitamin C, vitamin E, beta-carotene, citric acid, acetic acid, dehydroacetic acid, ascorbic acid, sorbic acid, and phytic acid.

Other preservatives include tocopherol, tocopherol acetate, deteroxime mesylate, cetrimide, butylated hydroxyanisol (BHA), butylated hydroxytoluened (BHT), ethylenediamine, sodium lauryl sulfate (SLS), sodium lauryl ether sulfate (SLES), sodium bisulfite, sodium metabisulfite, potassium sulfite, potassium metabisulfite, Glydant® Plus, Phenonip®, methylparaben, German® 115, Germaben® II, Neolone®, Kathon®, and Euxyl®.

Exemplary buffering agents include citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, and mixtures thereof.

Exemplary lubricating agents include magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures thereof.

Exemplary natural oils include almond, apricot kernel, avocado, babassu, bergamot, black current seed, borage, cade, camomile, canola, caraway, carnauba, castor, cinnamon, cocoa butter, coconut, cod liver, coffee, corn, cotton seed, emu, eucalyptus, evening primrose, fish, flaxseed, geraniol, gourd, grape seed, hazel nut, hyssop, isopropyl myristate, jojoba, kukui nut, lavandin, lavender, lemon, litsea cubeba, macademia nut, mallow, mango seed, meadowfoam seed, mink, nutmeg, olive, orange, orange roughy, palm, palm kernel, peach kernel, peanut, poppy seed, pumpkin seed, rapeseed, rice bran, rosemary, safflower, sandalwood, sasquana, savoury, sea buckthorn, sesame, shea butter, silicone, soybean, sunflower, tea tree, thistle, tsubaki, vetiver, walnut, and wheat germ oils. Exemplary synthetic oils include, but are not limited to, butyl stearate, caprylic triglyceride, capric triglyceride, cyclomethicone, diethyl sebacate, dimethicone 360, isopropyl myristate, mineral oil, octyldodecanol, oleyl alcohol, silicone oil, and mixtures thereof.

Liquid dosage forms for oral and parenteral administration include pharmaceutically acceptable emulsions, microemulsions, solutions, suspensions, syrups and elixirs. In addition to the active ingredients, the liquid dosage forms may comprise inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (e.g., cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions can include adjuvants such as wetting agents, emulsifying and suspending agents, sweetening, flavoring, and perfuming agents. In certain embodiments for parenteral administration, the conjugates described herein are mixed with solubilizing agents such as Cremophor®, alcohols, oils, modified oils, glycols, polysorbates, cyclodextrins, polymers, and mixtures thereof.

Injectable preparations, for example, sterile injectable aqueous or oleaginous suspensions can be formulated according to the known art using suitable dispersing or wetting agents and suspending agents. The sterile injectable preparation can be a sterile injectable solution, suspension, or emulsion in a nontoxic parenterally acceptable diluent or solvent, for example, as a solution in 1,3-butanediol. Among the acceptable vehicles and solvents that can be employed are water, Ringer's solution, U.S.P., and isotonic sodium chloride solution. In addition, sterile, fixed oils are conventionally employed as a solvent or suspending medium. For this purpose any bland fixed oil can be employed including synthetic mono- or di-glycerides. In addition, fatty acids such as oleic acid are used in the preparation of injectables.

The injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

In order to prolong the effect of a drug, it is often desirable to slow the absorption of the drug from subcutaneous or intramuscular injection. This can be accomplished by the use of a liquid suspension of crystalline or amorphous material with poor water solubility. The rate of absorption of the drug then depends upon its rate of dissolution, which, in turn, may depend upon crystal size and crystalline form. Alternatively, delayed absorption of a parenterally administered drug form may be accomplished by dissolving or suspending the drug in an oil vehicle.

Compositions for rectal or vaginal administration are typically suppositories which can be prepared by mixing the conjugates described herein with suitable non-irritating excipients or carriers such as cocoa butter, polyethylene glycol, or a suppository wax which are solid at ambient temperature but liquid at body temperature and therefore melt in the rectum or vaginal cavity and release the active ingredient.

Solid dosage forms for oral administration include capsules, tablets, pills, powders, and granules. In such solid dosage forms, the active ingredient is mixed with at least one inert, pharmaceutically acceptable excipient or carrier such as sodium citrate or dicalcium phosphate and/or (a) fillers or extenders such as starches, lactose, sucrose, glucose, mannitol, and silicic acid, (b) binders such as, for example, carboxymethylcellulose, alginates, gelatin, polyvinylpyrrolidinone, sucrose, and acacia, (c) humectants such as glycerol, (d) disintegrating agents such as agar, calcium carbonate, potato or tapioca starch, alginic acid, certain silicates, and sodium carbonate, (e) solution retarding agents such as paraffin, (f) absorption accelerators such as quaternary ammonium compounds, (g) wetting agents such as, for example, cetyl alcohol and glycerol monostearate, (h) absorbents such as kaolin and bentonite clay, and (i) lubricants such as talc, calcium stearate, magnesium stearate, solid polyethylene glycols, sodium lauryl sulfate, and mixtures thereof. In the case of capsules, tablets, and pills, the dosage form may include a buffering agent.

Solid compositions of a similar type can be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the art of pharmacology. They may optionally comprise opacifying agents and can be of a composition that they release the active ingredient(s) only, or preferentially, in a certain part of the intestinal tract, optionally, in a delayed manner. Examples of encapsulating compositions which can be used include polymeric substances and waxes. Solid compositions of a similar type can be employed as fillers in soft and hard-filled gelatin capsules using such excipients as lactose or milk sugar as well as high molecular weight polethylene glycols and the like.

The active ingredient can be in a micro-encapsulated form with one or more excipients as noted above. The solid dosage forms of tablets, dragees, capsules, pills, and granules can be prepared with coatings and shells such as enteric coatings, release controlling coatings, and other coatings well known in the pharmaceutical formulating art. In such solid dosage forms the active ingredient can be admixed with at least one inert diluent such as sucrose, lactose, or starch. Such dosage forms may comprise, as is normal practice, additional substances other than inert diluents, e.g., tableting lubricants and other tableting aids such as magnesium stearate and microcrystalline cellulose. In the case of capsules, tablets and pills, the dosage forms may comprise buffering agents. They may optionally comprise opacifying agents and can be of a composition that they release the active ingredient(s) only, or preferentially, in a certain part of the intestinal tract, optionally, in a delayed manner. Examples of encapsulating agents which can be used include polymeric substances and waxes.

Dosage forms for topical and/or transdermal administration of an agent (e.g., disulfiram, elesclomol and/or thiram, and/or an active metabolite and/or derivative/analog thereof) described herein may include ointments, pastes, creams, lotions, gels, powders, solutions, sprays, inhalants, and/or patches. Generally, the active ingredient is admixed under sterile conditions with a pharmaceutically acceptable carrier or excipient and/or any needed preservatives and/or buffers as can be required. Additionally, the present disclosure contemplates the use of transdermal patches, which often have the added advantage of providing controlled delivery of an active ingredient to the body. Such dosage forms can be prepared, for example, by dissolving and/or dispensing the active ingredient in the proper medium. Alternatively or additionally, the rate can be controlled by either providing a rate controlling membrane and/or by dispersing the active ingredient in a polymer matrix and/or gel.

Suitable devices for use in delivering intradermal pharmaceutical compositions described herein include short needle devices. Intradermal compositions can be administered by devices which limit the effective penetration length of a needle into the skin. Alternatively or additionally, conventional syringes can be used in the classical mantoux method of intradermal administration. Jet injection devices which deliver liquid formulations to the dermis via a liquid jet injector and/or via a needle which pierces the stratum corneum and produces a jet which reaches the dermis are suitable. Ballistic powder/particle delivery devices which use compressed gas to accelerate the compound in powder form through the outer layers of the skin to the dermis are suitable.

Formulations suitable for topical administration include, but are not limited to, liquid and/or semi-liquid preparations such as liniments, lotions, oil-in-water and/or water-in-oil emulsions such as creams, ointments, and/or pastes, and/or solutions and/or suspensions. Topically administrable formulations may, for example, comprise from about 1% to about 10% (w/w) active ingredient, although the concentration of the active ingredient can be as high as the solubility limit of the active ingredient in the solvent. Formulations for topical administration may further comprise one or more of the additional ingredients described herein.

A pharmaceutical composition described herein can be prepared, packaged, and/or sold in a formulation suitable for pulmonary administration via the buccal cavity. Such a formulation may comprise dry particles which comprise the active ingredient and which have a diameter in the range from about 0.5 to about 7 nanometers, or from about 1 to about 6 nanometers. Such compositions are conveniently in the form of dry powders for administration using a device comprising a dry powder reservoir to which a stream of propellant can be directed to disperse the powder and/or using a self-propelling solvent/powder dispensing container such as a device comprising the active ingredient dissolved and/or suspended in a low-boiling propellant in a sealed container. Such powders comprise particles wherein at least 98% of the particles by weight have a diameter greater than 0.5 nanometers and at least 95% of the particles by number have a diameter less than 7 nanometers. Alternatively, at least 95% of the particles by weight have a diameter greater than 1 nanometer and at least 90% of the particles by number have a diameter less than 6 nanometers. Dry powder compositions may include a solid fine powder diluent such as sugar and are conveniently provided in a unit dose form.

Low boiling propellants generally include liquid propellants having a boiling point of below 65° F. at atmospheric pressure. Generally the propellant may constitute 50 to 99.9% (w/w) of the composition, and the active ingredient may constitute 0.1 to 20% (w/w) of the composition. The propellant may further comprise additional ingredients such as a liquid non-ionic and/or solid anionic surfactant and/or a solid diluent (which may have a particle size of the same order as particles comprising the active ingredient).

Pharmaceutical compositions described herein formulated for pulmonary delivery may provide the active ingredient in the form of droplets of a solution and/or suspension. Such formulations can be prepared, packaged, and/or sold as aqueous and/or dilute alcoholic solutions and/or suspensions, optionally sterile, comprising the active ingredient, and may conveniently be administered using any nebulization and/or atomization device. Such formulations may further comprise one or more additional ingredients including, but not limited to, a flavoring agent such as saccharin sodium, a volatile oil, a buffering agent, a surface active agent, and/or a preservative such as methylhydroxybenzoate. The droplets provided by this route of administration may have an average diameter in the range from about 0.1 to about 200 nanometers.

Formulations described herein as being useful for pulmonary delivery are useful for intranasal delivery of a pharmaceutical composition described herein. Another formulation suitable for intranasal administration is a coarse powder comprising the active ingredient and having an average particle from about 0.2 to 500 micrometers. Such a formulation is administered by rapid inhalation through the nasal passage from a container of the powder held close to the nares.

Formulations for nasal administration may, for example, comprise from about as little as 0.1% (w/w) to as much as 100% (w/w) of the active ingredient, and may comprise one or more of the additional ingredients described herein. A pharmaceutical composition described herein can be prepared, packaged, and/or sold in a formulation for buccal administration. Such formulations may, for example, be in the form of tablets and/or lozenges made using conventional methods, and may contain, for example, 0.1 to 20% (w/w) active ingredient, the balance comprising an orally dissolvable and/or degradable composition and, optionally, one or more of the additional ingredients described herein. Alternately, formulations for buccal administration may comprise a powder and/or an aerosolized and/or atomized solution and/or suspension comprising the active ingredient. Such powdered, aerosolized, and/or aerosolized formulations, when dispersed, may have an average particle and/or droplet size in the range from about 0.1 to about 200 nanometers, and may further comprise one or more of the additional ingredients described herein.

A pharmaceutical composition described herein can be prepared, packaged, and/or sold in a formulation for ophthalmic administration. Such formulations may, for example, be in the form of eye drops including, for example, a 0.1-1.0% (w/w) solution and/or suspension of the active ingredient in an aqueous or oily liquid carrier or excipient. Such drops may further comprise buffering agents, salts, and/or one or more other of the additional ingredients described herein. Other opthalmically-administrable formulations which are useful include those which comprise the active ingredient in microcrystalline form and/or in a liposomal preparation. Ear drops and/or eye drops are also contemplated as being within the scope of this disclosure.

Although the descriptions of pharmaceutical compositions provided herein are principally directed to pharmaceutical compositions which are suitable for administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and/or perform such modification with ordinary experimentation.

Drugs provided herein can be formulated in dosage unit form for ease of administration and uniformity of dosage. It will be understood, however, that the total daily usage of the agents described herein will be decided by a physician within the scope of sound medical judgment. The specific therapeutically effective dose level for any particular subject or organism will depend upon a variety of factors including the disease being treated and the severity of the disorder; the activity of the specific active ingredient employed; the specific composition employed; the age, body weight, general health, sex, and diet of the subject; the time of administration, route of administration, and rate of excretion of the specific active ingredient employed; the duration of the treatment; drugs used in combination or coincidental with the specific active ingredient employed; and like factors well known in the medical arts.

The agents and compositions provided herein can be administered by any route, including enteral (e.g., oral), parenteral, intravenous, intramuscular, intra-arterial, intramedullary, intrathecal, subcutaneous, intraventricular, transdermal, interdermal, rectal, intravaginal, intraperitoneal, topical (as by powders, ointments, creams, and/or drops), mucosal, nasal, bucal, sublingual; by intratracheal instillation, bronchial instillation, and/or inhalation; and/or as an oral spray, nasal spray, and/or aerosol. Specifically contemplated routes are oral administration, intravenous administration (e.g., systemic intravenous injection), regional administration via blood and/or lymph supply, and/or direct administration to an affected site. In general, the most appropriate route of administration will depend upon a variety of factors including the nature of the agent (e.g., its stability in the environment of the gastrointestinal tract), and/or the condition of the subject (e.g., whether the subject is able to tolerate oral administration). In certain embodiments, the agent or pharmaceutical composition described herein is suitable for oral delivery or intravenous injection to a subject.

The exact amount of an agent required to achieve an effective amount will vary from subject to subject, depending, for example, on species, age, and general condition of a subject, severity of the side effects or disorder, identity of the particular agent, mode of administration, and the like. An effective amount may be included in a single dose (e.g., single oral dose) or multiple doses (e.g., multiple oral doses). In certain embodiments, when multiple doses are administered to a subject or applied to a tissue or cell, any two doses of the multiple doses include different or substantially the same amounts of an agent (e.g., disulfiram, elesclomol and/or thiram, and/or an active metabolite and/or derivative/analog thereof) described herein.

As noted elsewhere herein, a drug of the instant disclosure may be administered via a number of routes of administration, including but not limited to: subcutaneous, intravenous, intrathecal, intramuscular, intranasal, oral, transepidermal, parenteral, by inhalation, or intracerebroventricular.

The term "injection" or "injectable" as used herein refers to a bolus injection (administration of a discrete amount of an agent for raising its concentration in a bodily fluid), slow bolus injection over several minutes, or prolonged infusion, or several consecutive injections/infusions that are given at spaced apart intervals.

In some embodiments of the present disclosure, a formulation as herein defined is administered to the subject by bolus administration.

A drug or other therapy of the instant disclosure is administered to the subject in an amount sufficient to achieve a desired effect at a desired site (e.g., reduction of cancer size, cancer cell abundance, symptoms, etc.) determined by a skilled clinician to be effective. In some embodiments of the disclosure, the agent is administered at least once a year. In other embodiments of the disclosure, the agent is administered at least once a day. In other embodiments of the disclosure, the agent is administered at least once a week. In some embodiments of the disclosure, the agent is administered at least once a month.

Additional exemplary doses for administration of an agent of the disclosure to a subject include, but are not limited to, the following: 1-20 mg/kg/day, 2-15 mg/kg/day, 5-12 mg/kg/day, 10 mg/kg/day, 1-500 mg/kg/day, 2-250 mg/kg/day, 5-150 mg/kg/day, 20-125 mg/kg/day, 50-120 mg/kg/day, 100 mg/kg/day, at least 10 µg/kg/day, at least 100 µg/kg/day, at least 250 µg/kg/day, at least 500 µg/kg/day, at least 1 mg/kg/day, at least 2 mg/kg/day, at least 5 mg/kg/day, at least 10 mg/kg/day, at least 20 mg/kg/day, at least 50 mg/kg/day, at least 75 mg/kg/day, at least 100 mg/kg/day, at least 200 mg/kg/day, at least 500 mg/kg/day, at least 1 g/kg/day, and a therapeutically effective dose that is less than 500 mg/kg/day, less than 200 mg/kg/day, less than 100 mg/kg/day, less than 50 mg/kg/day, less than 20 mg/kg/day, less than 10 mg/kg/day, less than 5 mg/kg/day, less than 2 mg/kg/day, less than 1 mg/kg/day, less than 500 µg/kg/day, and less than 500 µg/kg/day.

In certain embodiments, when multiple doses are administered to a subject or applied to a tissue or cell, the frequency of administering the multiple doses to the subject or applying the multiple doses to the tissue or cell is three doses a day, two doses a day, one dose a day, one dose every other day, one dose every third day, one dose every week, one dose every two weeks, one dose every three weeks, or one dose every four weeks. In certain embodiments, the frequency of administering the multiple doses to the subject or applying the multiple doses to the tissue or cell is one dose per day. In certain embodiments, the frequency of administering the multiple doses to the subject or applying the multiple doses to the tissue or cell is two doses per day. In certain embodiments, the frequency of administering the multiple doses to the subject or applying the multiple doses to the tissue or cell is three doses per day. In certain embodiments, when multiple doses are administered to a subject or applied to a tissue or cell, the duration between the first dose and last dose of the multiple doses is one day, two days, four days, one week, two weeks, three weeks, one month, two months, three months, four months, six months, nine months, one year, two years, three years, four years, five years, seven years, ten years, fifteen years, twenty years, or the lifetime of the subject, tissue, or cell. In certain embodiments, the duration between the first dose and last dose of the multiple doses is three months, six months, or one year. In certain embodiments, the duration between the first dose and last dose of the multiple doses is the lifetime of the subject, tissue, or cell. In certain embodiments, a dose (e.g., a single dose, or any dose of multiple doses) described herein includes independently between 0.1 µg and 1 µg, between 0.001 mg and 0.01 mg, between 0.01 mg and 0.1 mg, between 0.1 mg and 1 mg, between 1 mg and 3 mg, between 3 mg and 10 mg, between 10 mg and 30 mg, between 30 mg and 100 mg, between 100 mg and 300 mg, between 300 mg and 1,000 mg, or between 1 g and 10 g, inclusive, of an agent (e.g., disulfiram, elesclomol and/or thiram, and/or an active metabolite and/or derivative/analog thereof) described herein. In certain embodiments, a dose described herein includes independently between 1 mg and 3 mg, inclusive, of an agent (e.g., disulfiram, elesclomol and/or thiram, and/or an active metabolite and/or derivative/analog thereof) described herein. In certain embodiments, a dose described herein includes independently between 3 mg and 10 mg, inclusive, of an agent (e.g., disulfiram, elesclomol and/or thiram, and/or an active metabolite and/or derivative/analog thereof) described herein. In certain embodiments, a dose described herein includes independently between 10 mg and 30 mg, inclusive, of an agent (e.g., disulfiram, elesclomol and/or thiram, and/or an active metabolite and/or derivative/analog thereof) described herein. In certain embodiments, a dose described herein includes independently between 30 mg and 100 mg, inclusive, of an agent (e.g., disulfiram, elesclomol and/or thiram, and/or an active metabolite and/or derivative/analog thereof) described herein.

It will be appreciated that dose ranges as described herein provide guidance for the administration of provided pharmaceutical compositions to an adult. The amount to be administered to, for example, a child or an adolescent can be determined by a medical practitioner or person skilled in the art and can be lower or the same as that administered to an adult. In certain embodiments, a dose described herein is a dose to an adult human whose body weight is 70 kg.

It will be also appreciated that an agent (e.g., disulfiram, elesclomol and/or thiram, and/or an active metabolite and/or derivative/analog thereof) or composition, as described herein, can be administered in combination with one or more additional pharmaceutical agents (e.g., therapeutically and/or prophylactically active agents), which are different from the agent or composition and may be useful as, e.g., combination therapies.

The agents or compositions can be administered in combination with additional pharmaceutical agents that improve their activity (e.g., activity (e.g., potency and/or efficacy) in treating a disease (e.g., cancer) in a subject in need thereof, in preventing a disease in a subject in need thereof, in reducing the risk of developing a disease in a subject in need thereof, etc. in a subject or cell. In certain embodiments, a pharmaceutical composition described herein including an agent (e.g., disulfiram, elesclomol and/or thiram, and/or an active metabolite and/or derivative/analog thereof) described herein and an additional pharmaceutical agent shows a synergistic effect that is absent in a pharmaceutical composition including one of the agent and the additional pharmaceutical agent, but not both.

In some embodiments of the disclosure, a therapeutic agent distinct from a first therapeutic agent of the disclosure is administered prior to, in combination with, at the same time, or after administration of the agent of the disclosure. In some embodiments, the second therapeutic agent is selected from the group consisting of a chemotherapeutic, an immunotherapy, an antioxidant, an antiinflammatory agent, an antimicrobial, a steroid, etc.

The agent or composition can be administered concurrently with, prior to, or subsequent to one or more additional pharmaceutical agents, which may be useful as, e.g., combination therapies. Pharmaceutical agents include therapeutically active agents. Pharmaceutical agents also include prophylactically active agents. Pharmaceutical agents include small organic molecules such as drug compounds (e.g., compounds approved for human or veterinary use by the U.S. Food and Drug Administration as provided in the Code of Federal Regulations (CFR)), peptides, proteins, carbohydrates, monosaccharides, oligosaccharides, polysaccharides, nucleoproteins, mucoproteins, lipoproteins, synthetic polypeptides or proteins, small molecules linked to proteins, glycoproteins, steroids, nucleic acids, DNAs, RNAs, nucleotides, nucleosides, oligonucleotides, antisense oligonucleotides, lipids, hormones, vitamins, and cells. In certain embodiments, the additional pharmaceutical agent is a pharmaceutical agent useful for treating and/or preventing a disease described herein. Each additional pharmaceutical agent may be administered at a dose and/or on a time schedule determined for that pharmaceutical agent. The additional pharmaceutical agents may also be administered together with each other and/or with the agent or composition described herein in a single dose or administered separately in different doses. The particular combination to employ in a regimen will take into account compatibility of the agent described herein with the additional pharmaceutical agent(s) and/or the desired therapeutic and/or prophylactic effect to be achieved. In general, it is expected that the additional pharmaceutical agent(s) in combination be utilized at levels that do not exceed the levels at which they are utilized individually. In some embodiments, the levels utilized in combination will be lower than those utilized individually.

The additional pharmaceutical agents include, but are not limited to, additional disulfiram metabolites or derivatives, elesclomol metabolites or derivatives, thiram metabolites or derivatives, other anti-cancer agents, immunotherapy and/or immunomodulatory agents, anti-proliferative agents, cytotoxic agents, anti-angiogenesis agents, anti-inflammatory agents, immunosuppressants, anti-bacterial agents, anti-viral agents, cardiovascular agents, cholesterol-lowering agents, anti-diabetic agents, anti-allergic agents, contraceptive agents, and pain-relieving agents. In certain embodiments, the additional pharmaceutical agent is an anti-proliferative agent. In certain embodiments, the additional pharmaceutical agent is an anti-cancer agent. In certain embodiments, the additional pharmaceutical agent is an anti-viral agent. In certain embodiments, the additional pharmaceutical agent is selected from the group consisting of epigenetic or transcriptional modulators (e.g., DNA methyltransferase inhibitors, histone deacetylase inhibitors (HDAC inhibitors), lysine methyltransferase inhibitors), antimitotic drugs (e.g., taxanes and *vinca* alkaloids), hormone receptor modulators (e.g., estrogen receptor modulators and androgen receptor modulators), cell signaling pathway inhibitors (e.g., tyrosine kinase inhibitors), modulators of protein stability (e.g., proteasome inhibitors), Hsp90 inhibitors, glucocorticoids, all-trans retinoic acids, and other agents that promote differentiation. In certain embodiments, the agents described herein or pharmaceutical compositions can be administered in combination with an anti-cancer therapy including, but not limited to, surgery, radiation therapy, transplantation (e.g., stem cell transplantation, bone marrow transplantation), immunotherapy, and chemotherapy.

Dosages for a particular agent of the instant disclosure may be determined empirically in individuals who have been given one or more administrations of the agent.

Administration of an agent of the present disclosure can be continuous or intermittent, depending, for example, on the recipient's physiological condition, whether the purpose of the administration is therapeutic or prophylactic, and other factors known to skilled practitioners. The administration of an agent may be essentially continuous over a preselected period of time or may be in a series of spaced doses.

Guidance regarding particular dosages and methods of delivery is provided in the literature; see, for example, U.S. Pat. Nos. 4,657,760; 5,206,344; or 5,225,212. It is within the scope of the instant disclosure that different formulations will be effective for different treatments and different disorders, and that administration intended to treat a specific organ or tissue may necessitate delivery in a manner different from that to another organ or tissue. Moreover, dosages may be administered by one or more separate administrations, or by continuous infusion. For repeated administrations over several days or longer, depending on the condition, the treatment is sustained until a desired suppression of disease symptoms occurs. However, other dosage regimens may be useful. The progress of this therapy is easily monitored by conventional techniques and assays.

Kits

The instant disclosure also provides kits containing agents of this disclosure for use in the methods of the present disclosure. Kits of the instant disclosure may include one or more containers comprising an agent (e.g., disulfiram, elesclomol and/or thiram, and/or an active metabolite and/or derivative/analog thereof) of this disclosure and/or may contain agents (e.g., oligonucleotide primers, probes, etc.) for identifying a cancer or subject as having neoplastic cells characterized by arm-level loss of chromosome 16q, focal copy loss of 16q13 and/or low expression of metallothionein proteins. In some embodiments, the kits further include instructions for use in accordance with the methods of this disclosure. In some embodiments, these instructions comprise a description of administration of the agent to treat or diagnose, e.g., a cancer that exhibits arm-level loss of chromosome 16q, focal copy loss of 16q13, low gene expression or methylation of MT1 isoforms (including MT1E) and/or low gene expression or methylation of MT2 isoforms (including MT2A), according to any of the methods of this disclosure. In some embodiments, the instructions comprise a description of how to detect a cancer or subject as exhibiting arm-level loss of chromosome 16q, focal copy loss of 16q13 and/or low expression of metallothionein genes and/or proteins, for example in an individual, in a tissue sample, or in a cell. The kit may further comprise a description of selecting an individual suitable for treatment based on identifying whether that subject has arm-level loss of chromosome 16q, focal copy loss of 16q13 and/or low expression of metallothionein genes and/or proteins.

The instructions generally include information as to dosage, dosing schedule, and route of administration for the intended treatment. The containers may be unit doses, bulk packages (e.g., multi-dose packages) or sub-unit doses. Instructions supplied in the kits of the instant disclosure are typically written instructions on a label or package insert (e.g., a paper sheet included in the kit), but machine-readable instructions (e.g., instructions carried on a magnetic or optical storage disk) are also acceptable.

The label or package insert indicates that the composition is used for treating, e.g., a cancer or subject having neoplastic cells characterized by arm-level loss of chromosome 16q, focal copy loss of 16q13 and/or low expression of metallothionein genes and/or proteins, in a subject. Instructions may be provided for practicing any of the methods described herein.

The kits of this disclosure are in suitable packaging. Suitable packaging includes, but is not limited to, vials, bottles, jars, flexible packaging (e.g., sealed Mylar or plastic bags), and the like. Also contemplated are packages for use in combination with a specific device, such as an inhaler, nasal administration device (e.g., an atomizer) or an infusion device such as a minipump. A kit may have a sterile access port (for example the container may be an intravenous solution bag or a vial having a stopper pierceable by a hypodermic injection needle). The container may also have a sterile access port (e.g., the container may be an intravenous solution bag or a vial having a stopper pierceable by a hypodermic injection needle). In certain embodiments, at least one active agent in the composition is disulfiram, elesclomol and/or thiram, and/or an active metabolite and/or derivative/analog thereof. The container may further comprise a second pharmaceutically active agent.

Kits may optionally provide additional components such as buffers and interpretive information. Normally, the kit comprises a container and a label or package insert(s) on or associated with the container.

The practice of the present disclosure employs, unless otherwise indicated, conventional techniques of chemistry, molecular biology, microbiology, recombinant DNA, genetics, immunology, cell biology, cell culture and transgenic biology, which are within the skill of the art. See, e.g., Maniatis et al., 1982, Molecular Cloning (Cold Spring Harbor Laboratory Press, Cold Spring Harbor, N.Y.); Sambrook et al., 1989, Molecular Cloning, 2nd Ed. (Cold Spring Harbor Laboratory Press, Cold Spring Harbor, N.Y.); Sambrook and Russell, 2001, Molecular Cloning, 3rd Ed. (Cold Spring Harbor Laboratory Press, Cold Spring Harbor, N.Y.); Ausubel et al., 1992), Current Protocols in Molecular Biology (John Wiley & Sons, including periodic updates); Glover, 1985, DNA Cloning (IRL Press, Oxford); Anand, 1992; Guthrie and Fink, 1991; Harlow and Lane, 1988, Antibodies, (Cold Spring Harbor Laboratory Press, Cold Spring Harbor, N.Y.); Jakoby and Pastan, 1979; Nucleic Acid Hybridization (B. D. Hames & S. J. Higgins eds. 1984); Transcription And Translation (B. D. Hames & S. J. Higgins eds. 1984); Culture Of Animal Cells (R. I. Freshney, Alan R. Liss, Inc., 1987); Immobilized Cells And Enzymes (IRL Press, 1986); B. Perbal, A Practical Guide To Molecular Cloning (1984); the treatise, Methods In Enzymology (Academic Press, Inc., N.Y.); Gene Transfer Vectors For Mammalian Cells (J. H. Miller and M. P. Calos eds., 1987, Cold Spring Harbor Laboratory); Methods In Enzymology, Vols. 154 and 155 (Wu et al. eds.), Immunochemical Methods In Cell And Molecular Biology (Mayer and Walker, eds., Academic Press, London, 1987); Handbook Of Experimental Immunology, Volumes I-IV (D. M. Weir and C. C. Blackwell, eds., 1986); Riott, Essential Immunology, 6th Edition, Blackwell Scientific Publications, Oxford, 1988; Hogan et al., Manipulating the Mouse Embryo, (Cold Spring Harbor Laboratory Press, Cold Spring Harbor, N.Y., 1986); Westerfield, M., The zebrafish book. A guide for the laboratory use of zebrafish (*Danio rerio*), (4th Ed., Univ. of Oregon Press, Eugene, 2000).

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Reference will now be made in detail to exemplary embodiments of the disclosure. While the disclosure will be described in conjunction with the exemplary embodiments, it will be understood that it is not intended to limit the disclosure to those embodiments. To the contrary, it is intended to cover alternatives, modifications, and equivalents as may be included within the spirit and scope of the disclosure as defined by the appended claims. Standard techniques well known in the art or the techniques specifically described below were utilized.

EXAMPLES

Example 1: Materials and Methods

PRISM Screening

Parental cell lines were obtained from the Cancer Cell Line Encyclopedia (CCLE) project (1). PRISM cell line barcoding, pooling, and screening was performed as previously described with several improvements to the original method (2). First, the lentiviral vector was modified to encode the unique barcode identifier at the end of the puromycin resistance gene. This enables barcodes to be detected using a variant of the mRNA capture and Luminex detection method developed for the L1000 gene expression assay (3). Second, a set of ten inert barcodes were spiked-in to each well of each plate after cell lysis to control for variation in PCR amplification as detailed below.

Data Processing

Luminex technology produced .lxb files containing data for each Luminex bead observed during detection. These .lxb files were processed to compute Median Fluorescence Intensity (MFI) values, calculated as the median of the values obtained for all beads corresponding to a single PRISM barcode.

MFI values were log-transformed (log MFI) and used to perform basic quality control. To detect probable screening artifacts, log MFI values were centered to the median log MFI for each cell line on each plate in order to put the measurements from each cell line on the same scale. For each well on each plate, the median of these centered values was then standardized according to the global median and global MAD across all plate wells in the same position. Data from wells with a standardized score of greater than 5 or less than −5 were excluded from all further processing steps.

For each cell line on each plate, the distribution of MFI values observed for the DMSO-treated negative controls was compared to that of the positive controls using a robust form of the Strictly Standardized Mean Difference (SSMD*)'. Specifically, SSMD* was calculated as:

$$\frac{(\mu_- - \mu_+)}{\sqrt{\sigma_-^2 + \sigma_+^2}}$$

Data corresponding to SSMD values less than 2 were removed before calculating cell viability.

The data in the instant disclosure were produced according to two different screening protocols. In the PR500 protocol, ten inert barcodes were spiked-in to each well of each plate after cell lysis. For data produced using the PR500 protocol, normalized MFI (nMFI) values were computed by taking the ratio of each MFI value against the median of the inert barcodes within each well. For data produced before the PR500 protocol was introduced, nMFI values were set equal to MFI values.

Cell viability was calculated as the ratio of nMFI to the median of the nMFI from the DMSO-treated negative controls for each cell line on each plate. Batch effects produced from variable detection and assay conditions were then removed using ComBat (4). The final viability values were calculated as the median of the batch-corrected cell viabilities from biological replicates for each cell line, compound and dose.

Dose Response

Measures of dose response were obtained by fitting 3-parameter logistic curves to viability values for each compound and cell line using the R package 'dre'. Following the practice of Smirnov and Safikhani (5), viability was truncated at 1.0 and fit as a function of drug concentration according to:

$$V(c) = E_\infty + \frac{1 - E_\infty}{1 + e^{HS(c - EC50)}}$$

where all concentrations are in the natural logarithm scale. IC50 values were defined as the concentration c at which V(c)=0.5, given by the formula:

$$IC50 = \frac{\log(1 - 2E_\infty)}{HS} + EC50$$

The Area Under the dose response Curve (AUC) was calculated using the normalized integral:

$$\frac{\int_{c_{min}}^{c_{max}} V(c) dc}{c_{max} - c_{min}}$$

where $$\int V(c) dc = \frac{(E_\infty - 1)\log(1 + e^{-HS(c - EC50)})}{HS} + E_\infty c + const$$

The formulation above puts AUC values on a scale between 0 and 1, where lower AUC values indicate increased sensitivity to the treatment.

Nomination for Secondary Screen

Compounds from the primary screen were labeled as candidates for secondary screening using a combination of cell killing metrics and goodness-of-fit measures obtained from the ATLANTIS method (6). Metrics considered were profile mean, variance, skewness, number of sensitive cell lines as well as the 75th, 25th, 10th and 5th quantiles of each profile's distribution. Cell lines were defined as sensitive to a compound if their median log fold change after batch correction was below 2 standard deviations of the distribution of DMSO controls. ATLANTIS model R2 values of above 0.1 were considered strong models. Subject to compound availability and manual curation, candidates were progressed to secondary profiling at 8 point dose.

Compounds

Sources for compounds of the instant disclosure include the following:

| Drug Name | Vendor | Part # |
|---|---|---|
| Disulfiram | Selleck | S1680 |
| Thiram | Sigma | 45689-250 mg |
| sodium diethyldithiocarbamate trihydrate | Sigma | 228680-5 G |
| Methyl diethyldithiocarbamate | Toronto Research Chemicals | M301700 |
| Elesclomol | Selleck | S1052 |
| copper(II) diethyldithiocarbamate | TCI | D0487 |
| paclitaxel | Selleck | S1150 |

Cell Lines

Parental cell lines were obtained from the Broad Cancer Cell Line Encyclopedia (CCLE). Cas9-expressing lines were obtained from Project Achilles.

RNA Sequencing

Cell line RNA was isolated using the RNeasy kit (Qiagen) per manufacturer's protocol. RNA integrity was confirmed using the Bioanalyzer (Agilent). Library preparation was performed using KAPA mRNA HyperPrep Kits. Next-generation sequencing (single-end 75 bp reads) was performed using the Illumina NextSeq500 instrument. Data were processed using the VIPER pipeline (PMID 29649993).

Cloning

XP003, XP023, psPAX, and pMD2.G vectors were acquired from the Broad Genetic Perturbation Platform (GPP). Oligos for sgRNAs designs were generated using Broad GPP sgRNA guide generator resource (broad institute.org/gpp/db/analysis-tools/sgrna-design) and the respective oligos were synthesized by Integrated DNA Technologies. In order to clone the sgRNAs into either the XPR003 guide only or XPRO23 all-in-one crispr lentiviral expression systems the protocol available on the Broad GPP website (broadinstitute.org/gpp/db/resources/protocols) was followed.

Viral Vector Generation

In order to generate viral vectors, HEK293T cells were seeded in 6 well plates at a density of 1.5E6 cells per well. Cells were then transfected with a mixture of TransIT®-LT1 Transfection Reagent (MirusBio #M1R2304), psPAX2, pMD2.G, lentiviral plasmid diluted in Opti-MEM™ (Thermo #31985062). The following day media was changed DMEM (Thermo #10566016) with 30% FBS (Sigma 18A079). 72 hrs after transfection, virus containing media was collected and run through a 0.2 uM filter to remove cellular debris. Virus was aliquoted and stored short term at −20 C until infection day.

Lentiviral Infection

A mixture of 3E6 cells, virus, and media with 4 μg/mL polybrene (Millipore) at a total volume of 2 mL was plated per well of a 12 well plate. Cells were centrifuged at 2000 RPM for 2 hours at 30° C. After removal from incubator, 2 mL of fresh media was added to each well and cells were allowed to incubate at 37° C. overnight. The following day cells were selected for with puromycin for 3-10 days, or until the non-infected control cell were completely non-viable.

CellTiter-Glo® Cellular Viability Assay

Cell viability was assayed using a modified manufacturer's protocol for CellTiter-Glo® (Promega #G7573). Cells were seeded at a density of 2000 cells per well in a 96 well black, clear bottom plate (Corning #89091-012) in 100 uL total media per well. The following day different concentrations of compounds at various doses were printed in triplicate in a random well format using the Tecan D300e Digital Dispenser. After 120H, 60 μL of a 1:3 solution of CellTiterGlo reagent in 1×PBS (Corning #01018002) was added per well and allowed to incubate at RT for 10 mins. Luminescence was measured with an integration time of 0.1 s using Envision Microplates Reader (PERKIN ELMER #2105-0010). Biological replicates were averaged and normalized to vehicle control. Dose curves were generated using Graphpad Prism.

Figure 2A:
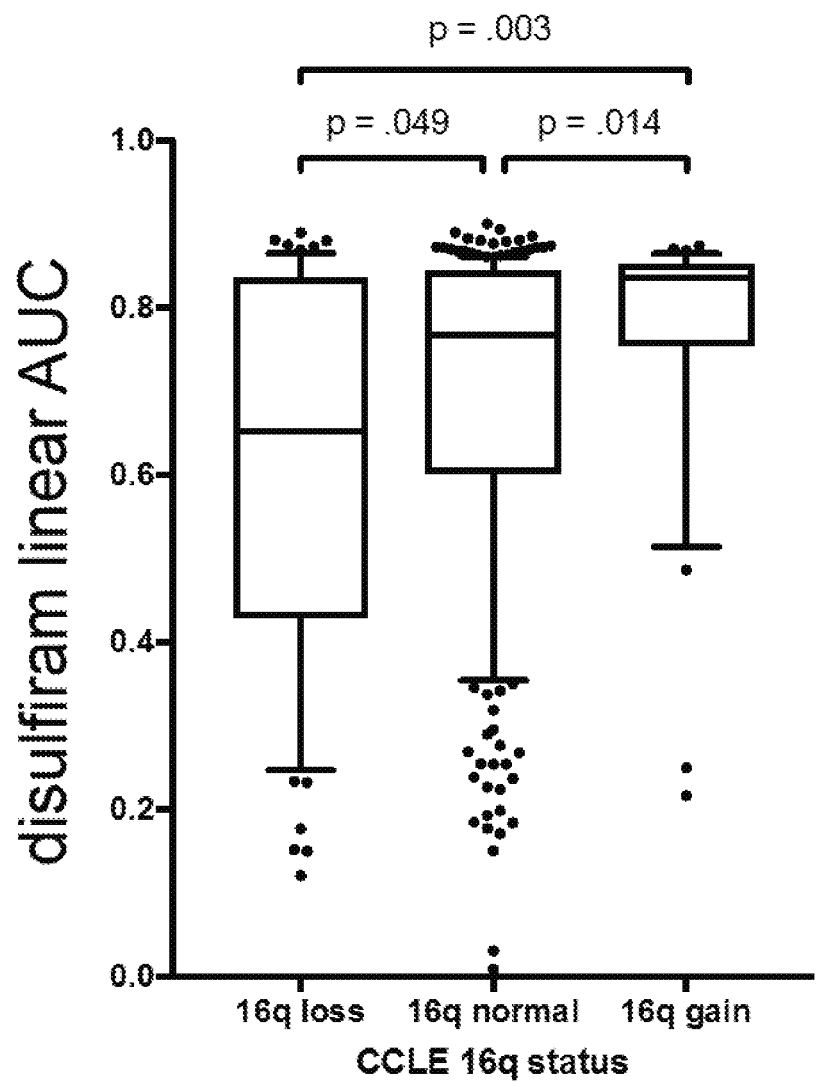
FIGS. 2A and 2B show that disulfiram cytotoxicity in PRISM cell line compound screening assays was predicted by chromosome 16q copy number loss across 480 cell lines.
Figure 2B:
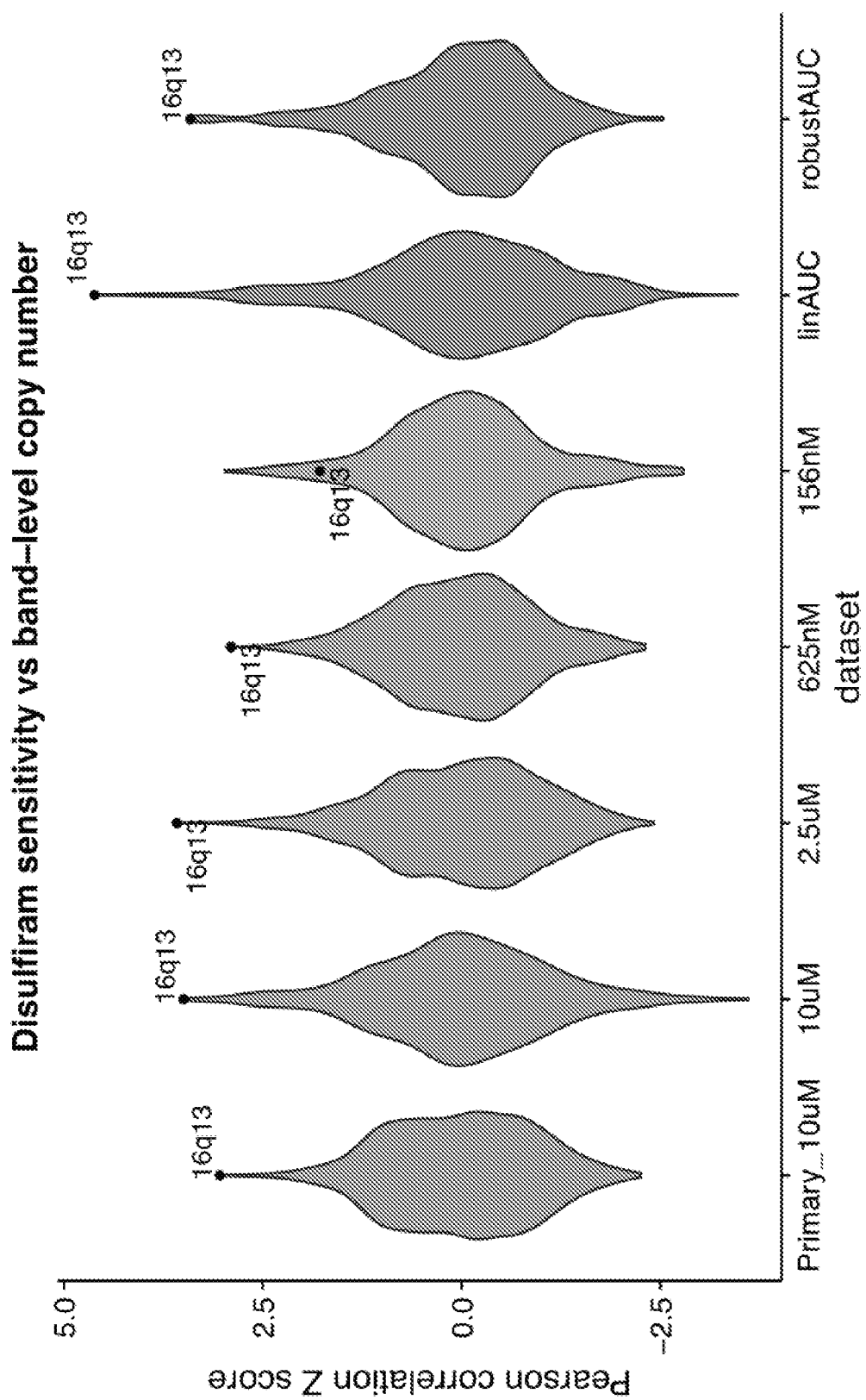

Example 2: PRISM Screening Identified Disulfiram, Elesclomol and Thiram as Cytotoxic to Select, Biomarker-Presenting PRISM Screen Cancer Cell Lines PRISM screening was applied to a drug repurposing library (described in Corsello et al. *Nat. Medicine* 23: 405-408), to identify compounds that were selectively capable of killing certain classes of cancer cell lines. When disulfiram (FIG. 1A) sensitivity was profiled in the PRISM screen cell lines, disulfiram cytotoxicity in PRISM cell line compound screening assays was robustly predicted by chromosome 16q copy number loss across 480 cell lines. In a Mann-Whitney U test, where PRISM assay cell lines were stratified into bins based upon observed chromosome 16q status (16q loss, 16q normal and 16q gain, respectively), with disulfiram cytotoxicity assessed as linear area-under-the-curve (AUC), disulfiram cytotoxicity strongly correlated with 16q loss (FIG. 2A). Extensive correlation between disulfiram sensitivity and 16q loss was observed for disulfiram sensitivity as compared to band-level copy number, across varying indicated disulfiram doses (Primary 10 μM, 10 μM, 2.5 μM, 625 nM, 156 nM, linAUC and robust AUC) (FIG. 2A). Extremely high levels of correlation (as measured by Pearson correlation coefficient Z scores) were observed between disulfiram sensitivity and band-level (focal copy) loss of 16q13 in assayed treated cell lines (FIG. 2A). This observed effect for disulfiram cytotoxicity in the presence of 16q loss was also observed for elesclomol (FIG. 1B) and thiram (FIG. 1C)—indeed, disulfiram, elesclomol and thiram were observed to exhibit a shared cell killing profile specific for cancer cell lines having 16q loss, a profile distinct from those observed for other compounds of the input drug repurposing library.

Prior studies have identified a metallothionein (MT) gene cluster located on human chromosome 16q (Karin et al. *Proc. Natl. Acad. Sci. USA* 81: 5494-98). Metallothionein proteins are cysteine-rich, are approximately 60 amino acids in length, and tend to bind heavy metals, such as zinc (Zn), cadmium (Cd), lead (Pb) and copper (Cu)(FIG. 3A), via formation (without wishing to be bound by theory) of an intracellular zinc reservoir. A disulfiram metabolite, DDC, has been modeled to bind copper as a $Cu(DDC)_2$, in the manner shown in FIG. 3B.

Figure 4:
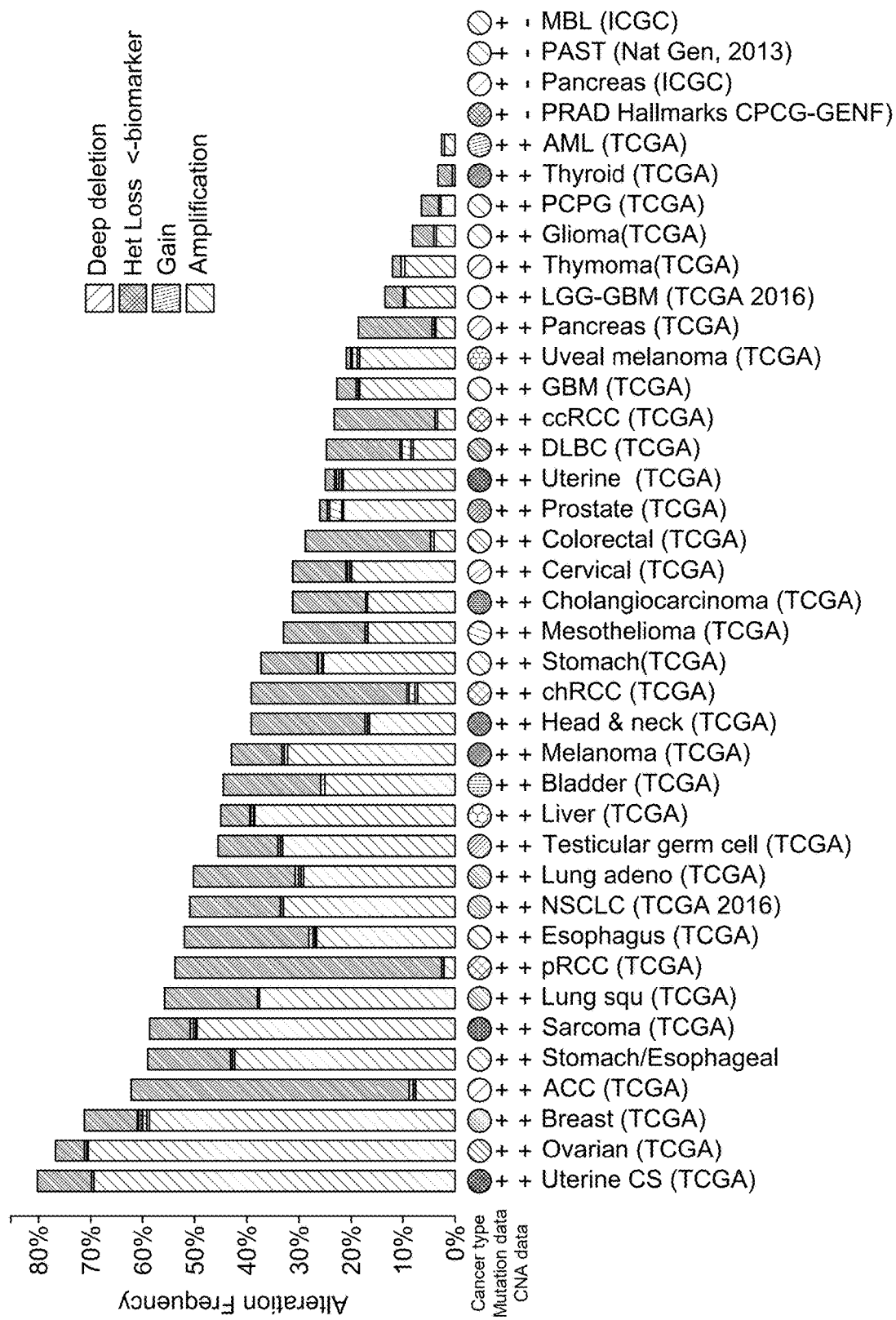
FIG. 4 shows that heterozygous metallothionein copy number loss was a frequent event in human cancer, and was mostly an arm-level occurrence.

Detailed examination of 16q loss and disulfiram efficacy in the PRISM cell line population revealed that heterozygous metallothionein copy number loss was a frequent event in a wider range of human cancers, and was mostly an arm-level occurrence (FIG. 4). Cancers for which the biomarker (including heterozygous loss of the biomarker) was most prevalent included uterine, ovarian, brain, stomach/esophageal, sarcoma, lung and other cancers.

Figure 5A:
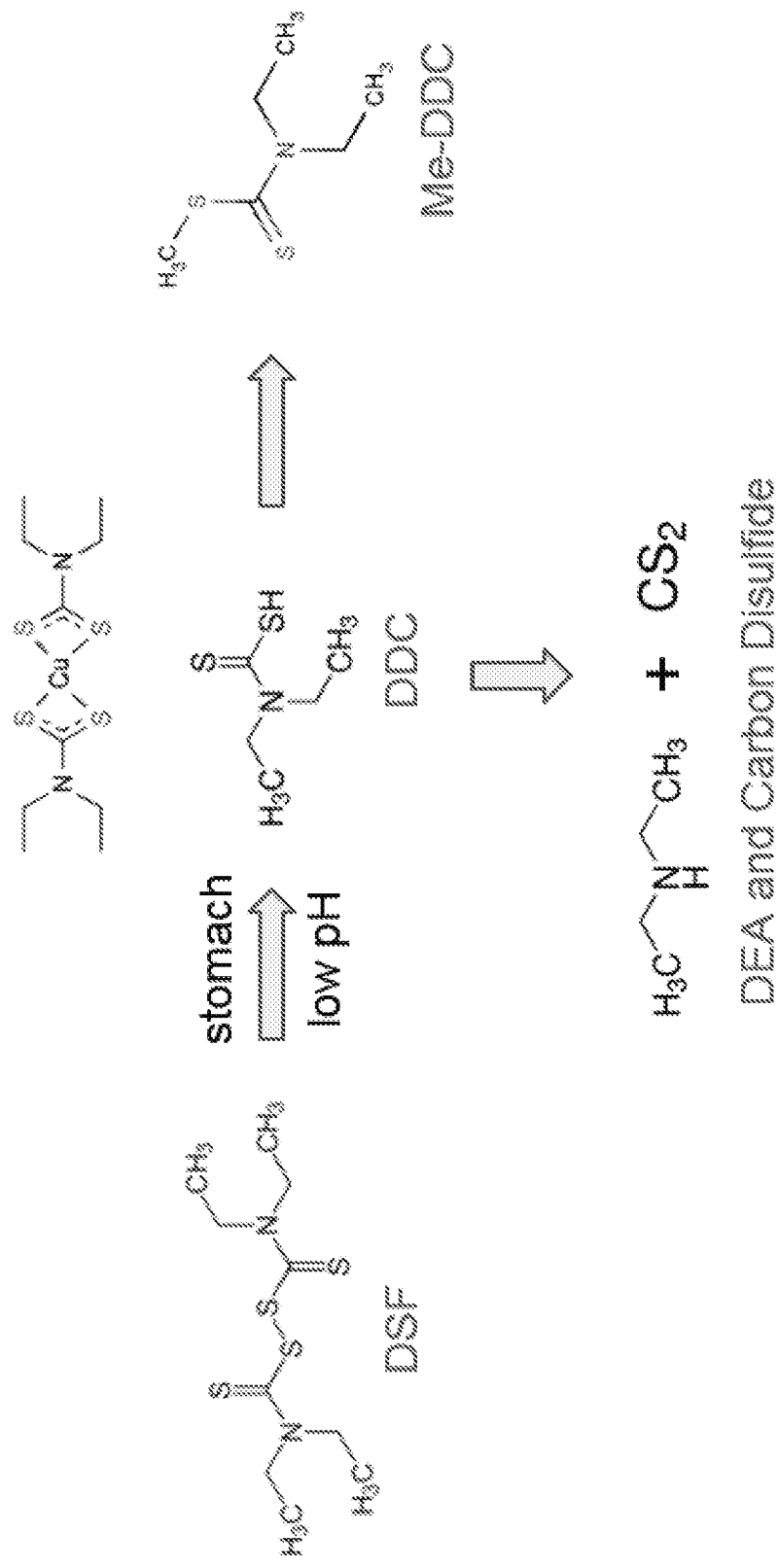
FIGS. 5A and 5B show that certain disulfiram metabolites including DDC and Cu-DDC, retained the cytotoxicity initially observed for disulfiram (DSF).
Figure 5B:
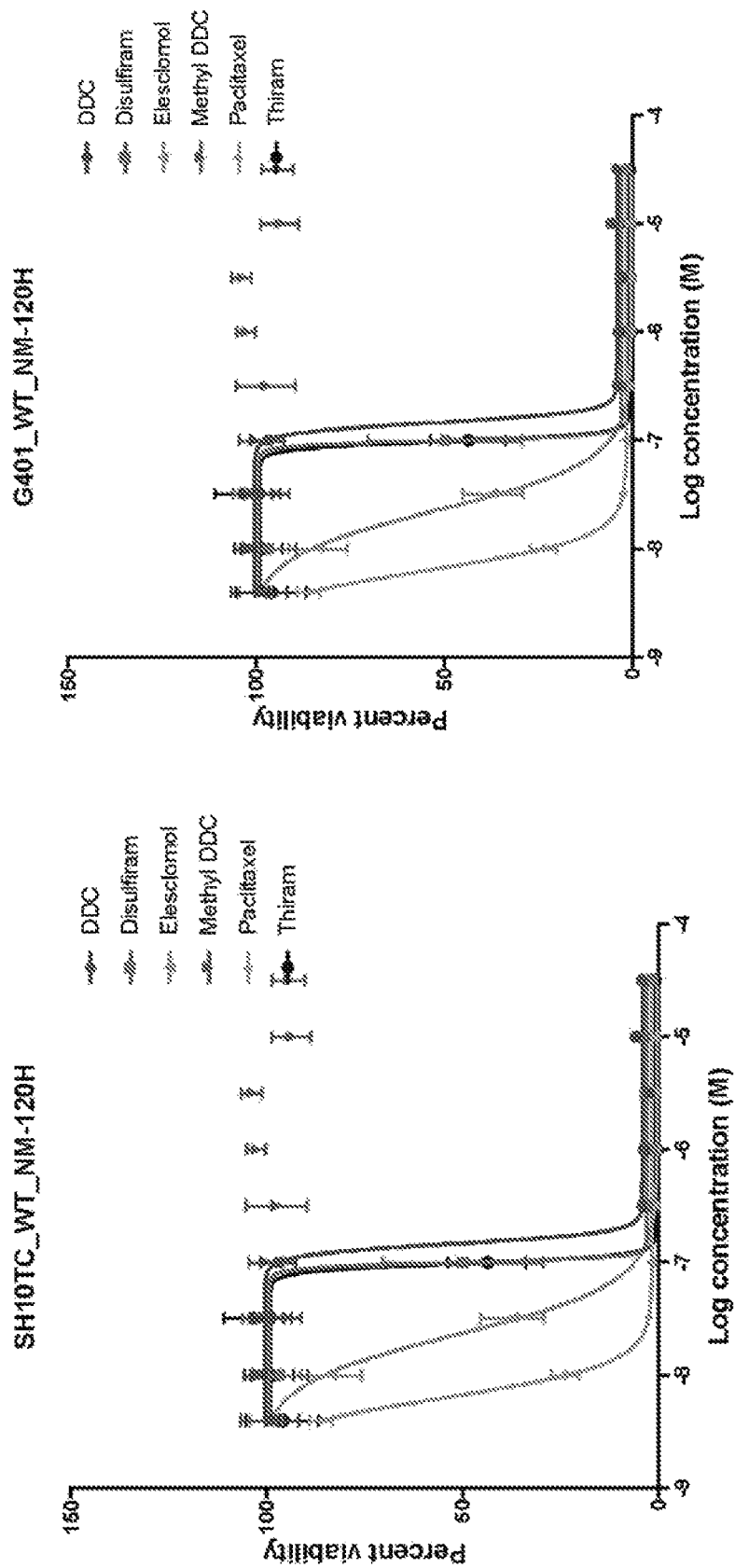

In addition to disulfiram, elesclomol and thiram, biomarker-predicted cytotoxic activity was also identified for certain disulfiram metabolites, including DDC and Cu-DDC, which were observed to retain the cytotoxicity initially observed for disulfiram (DSF)(FIG. 5A). In contrast, methyl DDC was not observed to be cytotoxic to biomarker-presenting cell lines. Cytotoxicity IC50 values of dose-response curves were identified for a series of agents, including paclitaxel, elesclomol, disulfiram/thiram, DDC and methyl-DDC (Me-DDC)—as shown in FIG. 5B, paclitaxel, elesclomol, disulfiram/thiram and DDC, respectively, were all active agents (and exhibited IC50 values progressing from lowest to highest IC50 in the order of the preceding list), whereas methyl DDC was observed as inactive in both conditions tested (SH10TC and G401 cells).

Figure 6A:
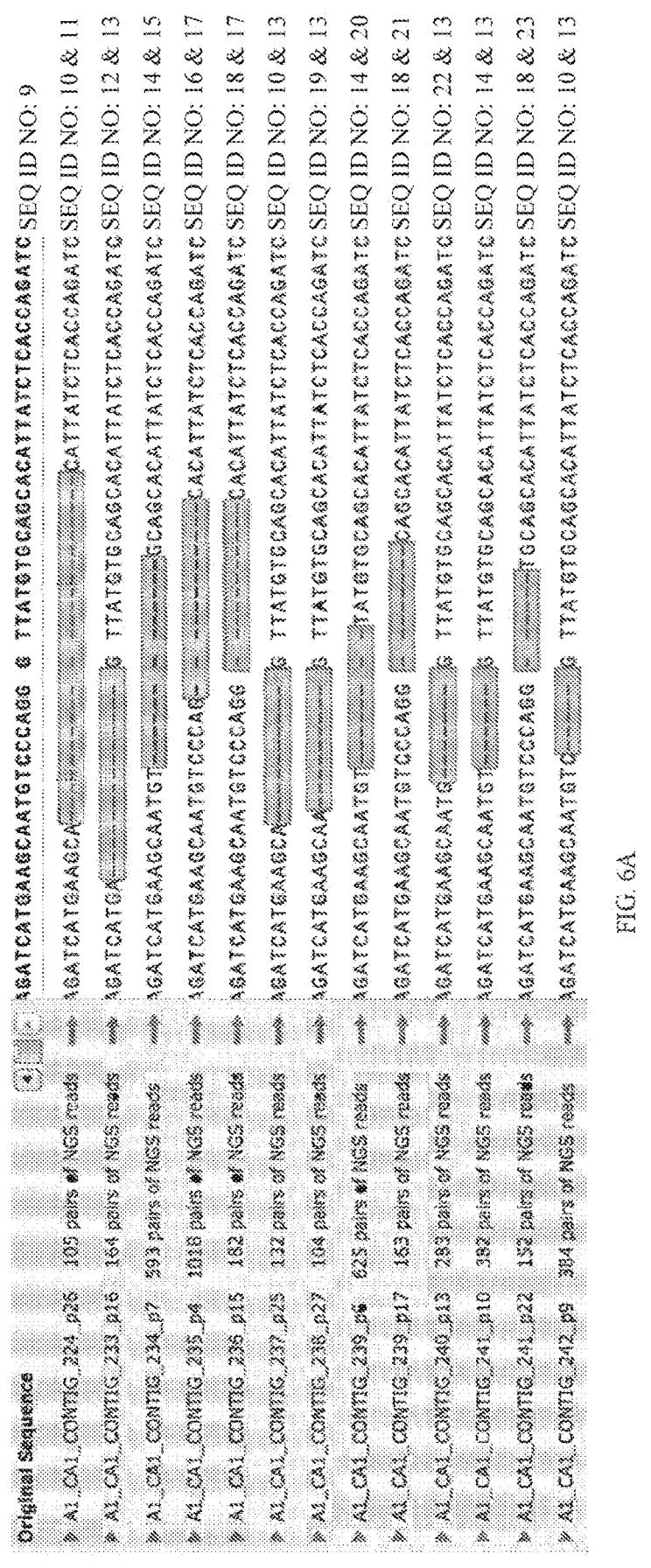
Figure 6B:
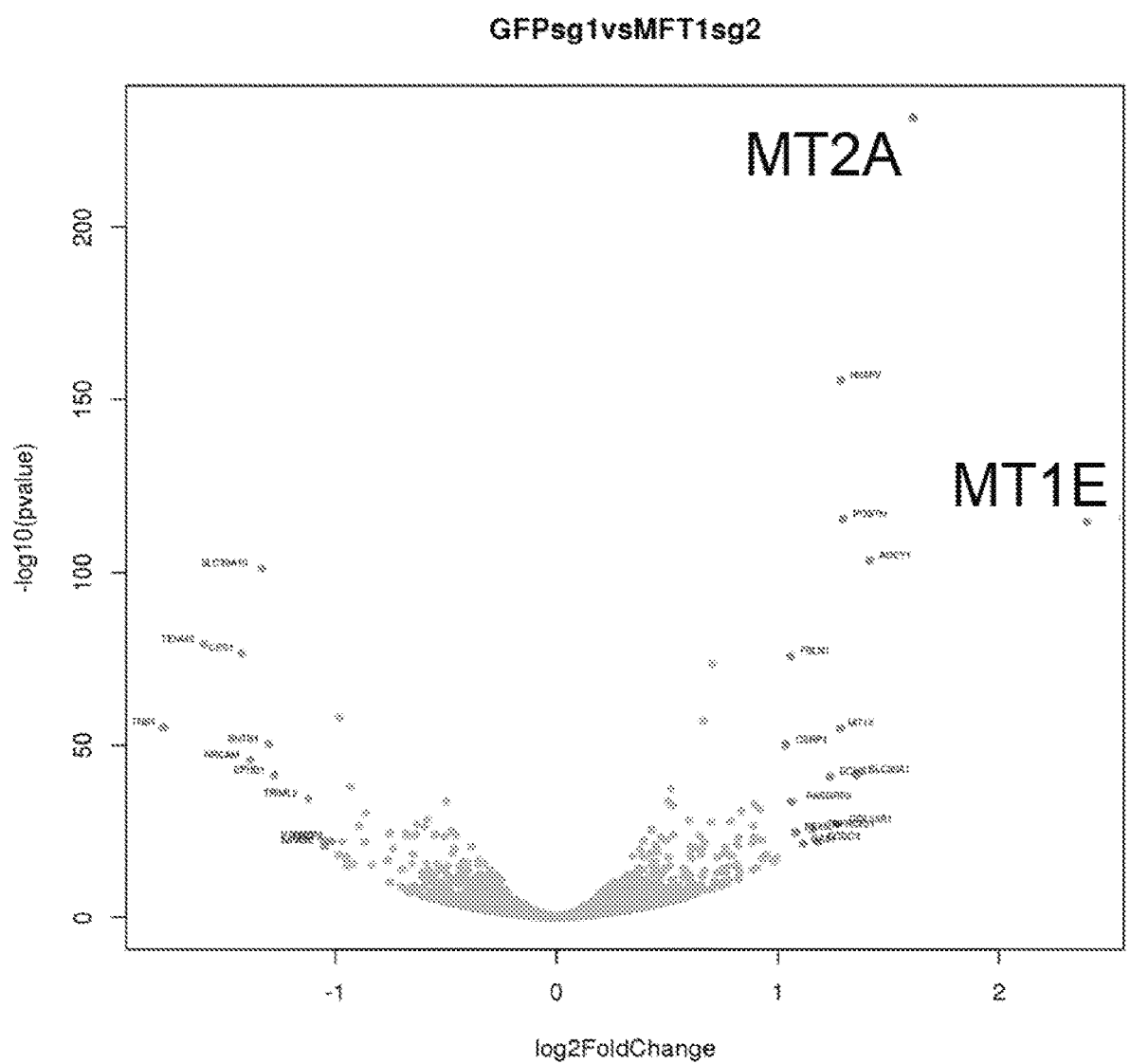

The importance of the chromosome 16q metallothionein gene cluster to the cytotoxic effects observed for disulfiram and elesclomol was then confirmed via CRISPR-Cas9-mediated knockdown of the metallothionein regulatory gene MTF1 (metal regulatory transcription factor 1) in a SF295 cell line (the SF295 cell line was characterized as disulfiram resistant and exhibited gain of chromosome 16q). CRISPR-Cas9-mediated knockdown of the metallothionein regulatory gene MTF1 was initially confirmed to have markedly downregulated both MT2A and MT1E levels (FIGS. 6A and 6B). Various exemplary genomic insertions/deletions (in/dels) were observed in CRISPR-Cas9 MTF1 knockout-treated cells (FIG. 6A). For the MTF1 guide "MTF1 sg1", genomic in/del frequency was observed to be approximately 65%, while for the MTF1 guide "MTF1 sg2", genomic in/del frequency was observed to be approximately 77% (FIG. 6A). As shown in the scatter plot of FIG. 6B, MTF-1 gene knockout downregulated MT1E and MT2A.

Figure 7:
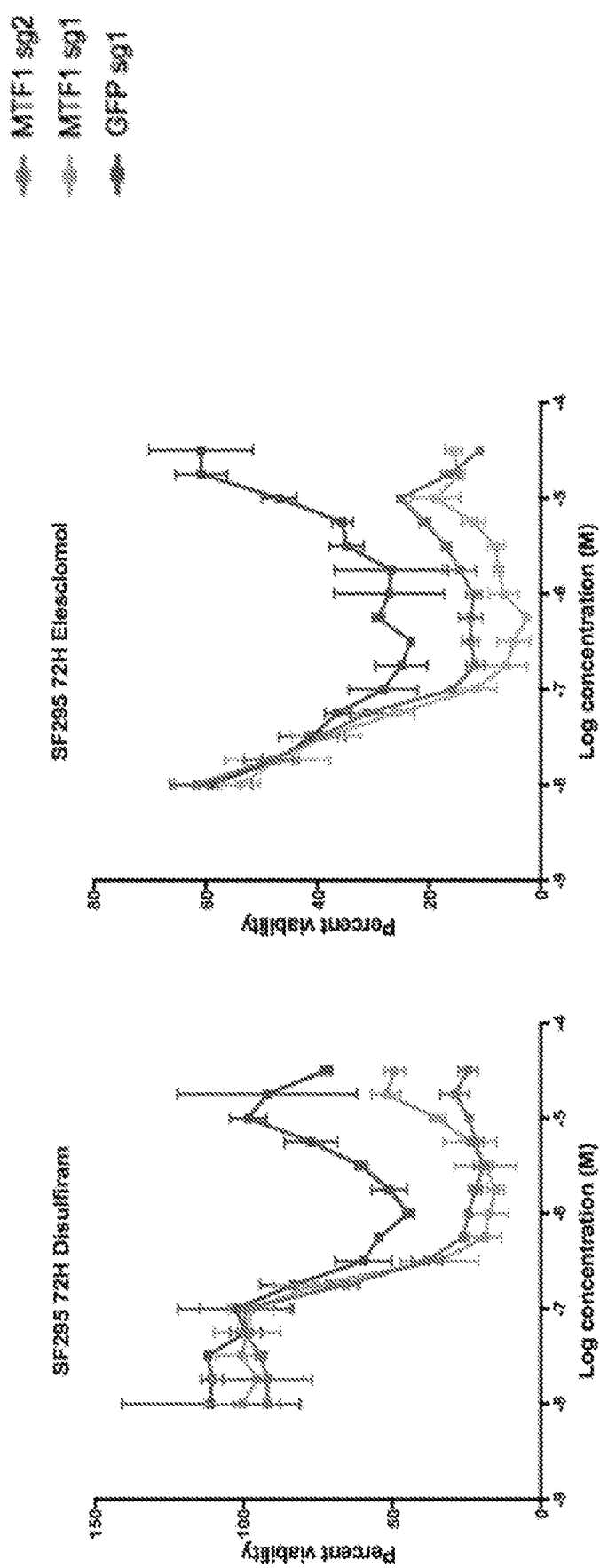
FIG. 7 shows that MTF1 knockout (via CRISPR-Cas9, using the two MTF1-directed guides, "MTF1 sg1" and "MTF1 sg2", described above in FIGS. 6A and 6B) sensitized SF295 cells to both disulfiram and elesclomol, as compared to a control GFP-targeting CRISPR-Cas9 guide sequence ("GFP sg1").

Confirming the importance of the chromosome 16q metallothionein gene cluster, MTF1 knockout (via CRISPR-Cas9, using the two MTF1-directed guides, "MTF1 sg1" and "MTF1 sg2", described above) sensitized SF295 cells to both disulfiram and elesclomol, as compared to a control CRISPR-Cas9 guide sequence (GFP sg1; FIG. 7).

In conclusion, disulfiram, DDC, elesclomol and thiram were observed to possess cytotoxic activities, with specificity for cancer cell lines that exhibited arm-level loss of 16q and/or focal copy loss of 16q13. Genome-wide CRISPR screens then confirmed that loss of the chromosome 16q metallothionein gene cluster was a robust and causal biomarker for the observed disulfiram and elesclomol cytotoxic activities (and presumably also for the DDC and thiram cytotoxicities). Disulfiram, DDC, elesclomol, thiram and/or other metabolites or derivatives of disulfiram, DDC, elesclomol or thiram have therefore been identified herein as candidate drugs for treatment of cancers that exhibit arm-level loss of 16q, focal copy loss of 16q13, and/or low expression of a metallothionein gene(s) and/or protein(s).

Example 3: Therapeutic Testing of Disulfiram, DDC, Elesclomol, Thiram, and Derivatives/Analogs Thereof The cytotoxic activity of disulfiram, DDC, elesclomol, thiram, and/or derivatives of any of the aforementioned compounds is tested in in vivo xenograft models (optionally mouse xenograft models), with the downstream mechanism for disulfiram (or other agent and/or derivative)-induced cell death thereby further investigated. Additional derivatives of disulfiram, as well as derivatives of elesclomol and/or thiram, are also synthesized and tested for cell killing activity.

REFERENCES

1. Barretina, J. et al. The Cancer Cell Line Encyclopedia enables predictive modelling of anticancer drug sensitivity. *Nature* 483, 603-607 (2012).
2. Yu, C. et al. High-throughput identification of genotype-specific cancer vulnerabilities in mixtures of barcoded tumor cell lines. *Nat. Biotechnol.* 34, 419-423 (2016).
3. Subramanian, A. et al. A Next Generation Connectivity Map: L1000 Platform and the First 1,000,000 Profiles. *Cell* 171, 1437-1452.e17 (2017).
4. Johnson, W. E., Li, C. & Rabinovic, A. Adjusting batch effects in microarray expression data using empirical Bayes methods. *Biostatistics* 8, 118-127 (2007).
5. Smirnov, P. et al. PharmacoGx: an R package for analysis of large pharmacogenomic datasets. *Bioinformatics* 32, 1244-1246 (2016).
6. Tsherniak, A. et al. Defining a Cancer Dependency Map. *Cell* 170, 564-576.e16 (2017).
7. Doench, J. G. et al. Optimized sgRNA design to maximize activity and minimize off-target effects of CRISPR-Cas9. *Nat. Biotechnot* 34, 184-191 (2016).

All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

One skilled in the art would readily appreciate that the present disclosure is well adapted to carry out the objects and obtain the ends and advantages mentioned, as well as those inherent therein. The methods and compositions described herein as presently representative of preferred embodiments are exemplary and are not intended as limitations on the scope of the disclosure. Changes therein and other uses will occur to those skilled in the art, which are encompassed within the spirit of the disclosure, are defined by the scope of the claims.

In addition, where features or aspects of the disclosure are described in terms of Markush groups or other grouping of alternatives, those skilled in the art will recognize that the disclosure is also thereby described in terms of any individual member or subgroup of members of the Markush group or other group.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Embodiments of this disclosure are described herein, including the best mode known to the inventors for carrying out the disclosed invention. Variations of those embodiments may become apparent to those of ordinary skill in the art upon reading the foregoing description.

The disclosure illustratively described herein suitably can be practiced in the absence of any element or elements, limitation or limitations that are not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present disclosure provides preferred embodiments, optional features, modification and variation of the concepts herein disclosed may be resorted to by those skilled in the art, and that such modifications and variations are considered to be within the scope of this disclosure as defined by the description and the appended claims.

It will be readily apparent to one skilled in the art that varying substitutions and modifications can be made to the invention disclosed herein without departing from the scope and spirit of the invention. Thus, such additional embodiments are within the scope of the present disclosure and the following claims. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Those skilled in the art will recognize, or be able to ascertain using no more than routine experimentation, many equivalents to the specific embodiments of the disclosure described herein. Such equivalents are intended to be encompassed by the following claims.

We claim:

1. A pharmaceutical composition for arresting the development of or relieving a cancer in a subject having arm-level loss of 16q, focal copy loss of 16q13 and/or low expression of a metallothionein gene and/or protein, as compared to a control, wherein the cancer is selected from the group consisting of a uterine cancer, an ovarian cancer, a gastroesophageal cancer and a lung cancer, the pharmaceutical composition comprising a therapeutically effective amount of disulfiram, diethyldithiocarbamate (DDC), Cu-DDC, elesclomol, or thiram and a pharmaceutically acceptable carrier.

2. The pharmaceutical composition of claim 1, wherein:
the lung cancer is a NSCLC; and/or
the subject is human.

3. A method for selecting a treatment for arresting the development of or relieving a cancer in a subject, the method comprising:
(a) obtaining a sample from a subject having a cancer, wherein the cancer is selected from the group consisting of a uterine cancer, an ovarian cancer, a gastroesophageal cancer and a lung cancer;
(b) identifying one or more of the following: (i) arm-level loss of 16q, (ii) focal copy loss of 16q13, (iii) low expression of a metallothionein gene and/or protein in the sample, as compared to a control; and
(c) selecting disulfiram, diethyldithiocarbamate (DDC), Cu-DDC, elesclomol, or thiram as a treatment for administration to the subject when one or more of (i)-(iii) is identified in the sample,
thereby selecting a treatment for the subject.

4. The method of claim 1, wherein the metallothionein gene and/or protein is a MT1 or MT2 isoform.

5. The method of claim 3, wherein the metallothionein gene and/or protein is MT1E or MT2A.

6. The method of claim 3, wherein low expression of MT1E or MT2A mRNA, as compared to a control, is identified.

7. The method of claim 3, wherein methylation of the metallothionein gene is identified.

8. The method of claim 3, wherein step (b) comprises identifying reduced MT1E or MT2A mRNA expression in the sample, as compared to a control.

9. The method of claim 3, further comprising: (d) administering the selected treatment to the subject.

10. The method of claim 3, wherein the treatment further comprises vinorelbine, a platinum agent, Letrozole, Anastrozole, Exemestane, Doxorubicin, Liposomal doxorubicin, Cyclophosphamide, Capecitabine, Docetaxel, Paclitaxel, Nab-paclitaxel, Trastuzumab, Ado-trastuzumab emtansine, Pertuzumab, Neratinib, Gemcitabine, Tamoxifen, Methotrexate, 5-Fluorouracil, Palbociclib, Abemaciclib, Fulvestrant, Olaparib, Eribulin, Pemetrexed, bevacizumab, nivolumab, pembrolizumab, ipilimumab, Oxaliplatin and/or ramucirumab.

11. The method of claim 3, wherein identifying step (b) comprises use of a kit for identifying low expression of a metallothionein mRNA or protein in a sample, as compared to a control, the kit consisting essentially of an oligonucleotide for detection of a metallothionein mRNA or an anti-metallothionein antibody.

12. The method of claim 11, wherein the kit comprises a labeled anti-metallothionein antibody or a labeled secondary antibody that binds an anti-metallothionein antibody.

13. The method of claim 1, wherein the subject is human.

14. The method of claim 1, wherein the cancer possesses, as compared to a control, one or more of the following: low MT1E mRNA expression levels, low MT1E protein expression levels, low MT2A mRNA expression levels and/or low MT2A protein expression levels.

15. The method of claim 3, wherein the lung cancer is non-small cell lung cancer (NSCLC).

16. A method for arresting the development of or relieving a cancer in a subject, the method comprising:
   (a) obtaining a sample from a subject having a cancer, wherein the cancer is selected from the group consisting of a uterine cancer, an ovarian cancer, a gastroesophageal cancer and a lung cancer;
   (b) identifying in the sample one or more of the following: (i) arm-level loss of 16q, (ii) focal copy loss of 16q13; and
   (c) administering disulfiram, diethyldithiocarbamate (DDC), Cu-DDC, elesclomol, or thiram to the subject when one or more of (i)-(ii) is identified in the sample, thereby arresting the development of or relieving a cancer in the subject.

\* \* \* \* \*

SEQUENCE LISTING

<160> NUMBER OF SEQ ID NOS: 23

<210> SEQ ID NO 1
<211> LENGTH: 175
<212> TYPE: DNA
<213> ORGANISM: Homo sapiens

<400> SEQUENCE: 1

```
catcggagaa gtgcagctgc tgtgcctgat gtgggaacag ctcttctccc agatgtaaat      60
agaacaacct gcacaacctg gattttttta aaaatacaac actgagccat ttgctgcatt     120
tcttttata ctaaatatgt gactgacaat aaaaacaatt ttgactttaa tctta           175
```

<210> SEQ ID NO 2
<211> LENGTH: 519
<212> TYPE: DNA
<213> ORGANISM: Homo sapiens

<400> SEQUENCE: 2

```
aggaacgcgg gcggtgcgga ctcagcgggc cgggtgcagg cgcggagctg ggcctctgcg      60
cccggcccga cctccgtcta taaatagagc agccagttgc agggctccat tctgctttcc     120
aactgcctga ctgcttgttc gtctcactgg tgtgagctcc agcatcccct ttgctcgaaa     180
tggacccaa  ctgctcttgc gccactggtg gctcctgcac gtgcgccggc tcctgcaagt     240
gcaaagagtg caaatgcacc tcctgcaaga agagctgctg ttcctgctgc ccgtgggct      300
gtgccaagtg tgcccagggc tgcgtctgca aaggggcatc ggagaagtgc agctgctgtg     360
cctgatgtgg gaacagctct ctcccagat  gtaaatagaa caacctgcac aacctggatt     420
ttttaaaaa  tacaacactg agccatttgc tgcatttctt tttatactaa atatgtgact     480
gacaataaaa acaattttga ctttaaaaaa aaaaaaaa                              519
```

<210> SEQ ID NO 3
<211> LENGTH: 127
<212> TYPE: PRT
<213> ORGANISM: Homo sapiens

<400> SEQUENCE: 3

```
Met Asp Pro Asn Cys Ser Cys Ala Thr Gly Gly Ser Cys Thr Cys Ala
1               5                   10                  15

Gly Ser Cys Lys Cys Lys Glu Cys Lys Cys Thr Ser Cys Lys Lys Ser
            20                  25                  30

Glu Cys Gly Ala Ile Ser Arg Asn Leu Gly Leu Trp Leu Arg Leu Gly
        35                  40                  45

Gly Asn Ser Arg Leu Ala Leu Ser Ala Ser Phe Trp Gly Thr Gly Leu
    50                  55                  60

Ser Leu Pro Ser Leu Pro Val Ser Phe Pro Leu Gln Ala Phe Cys Pro
65                  70                  75                  80

Lys Phe Arg Trp Gly Arg Thr Ala Phe Phe Ser Trp Asp Thr Asn Pro
                85                  90                  95

Asn Cys Thr Pro Tyr Gly Phe Arg Thr Glu Leu Cys Gln Thr Lys Lys
            100                 105                 110

Ser Ile Leu Trp Val Trp Val Leu Ser Ser Ser Gln Ala Cys Tyr
```

<210> SEQ ID NO 4
<211> LENGTH: 61
<212> TYPE: PRT
<213> ORGANISM: Homo sapiens

<400> SEQUENCE: 4

Met Asp Pro Asn Cys Ser Cys Ala Thr Gly Gly Ser Cys Thr Cys Ala
1               5                   10                  15

Gly Ser Cys Lys Cys Lys Glu Cys Lys Cys Thr Ser Cys Lys Lys Ser
                20                  25                  30

Cys Cys Ser Cys Cys Pro Val Gly Cys Ala Lys Cys Ala Gln Gly Cys
            35                  40                  45

Val Cys Lys Gly Ala Ser Glu Lys Cys Ser Cys Ala
    50                  55                  60

<210> SEQ ID NO 5
<211> LENGTH: 499
<212> TYPE: DNA
<213> ORGANISM: Homo sapiens

<400> SEQUENCE: 5
actcgtcccg gctctttcta gctataaaca ctgcttgccg cgctgcactc caccacgcct      60
cctccaagtc ccagcgaacc cgcgtgcaac ctgtcccgac tctagccgcc tcttcagctc     120
gccatggatc ccaactgctc ctgcgccgcc ggtgactcct gcacctgcgc cggctcctgc     180
aaatgcaaag agtgcaaatg cacctcctgc aagaaaagct gctgctcctg ctgccctgtg     240
ggctgtgcca agtgtgccca gggctgcatc tgcaagggg cgtcggacaa gtgcagctgc     300
tgcgcctgat gctgggacag ccccgctccc agatgtaaag aacgcgactt ccacaaacct     360 ggattttta tgtacaaccc tgaccgtgac cgtttgctat attccttttt ctatgaaata     420
atgtgaatga taataaaaca gctttgactt gaaaaaaaaa aaaaaaaaa aaaaaaaaa     480 aaaaaaaaaa aaaaaaaaa                                                 499

<210> SEQ ID NO 6
<211> LENGTH: 61
<212> TYPE: PRT
<213> ORGANISM: Homo sapiens

<400> SEQUENCE: 6

Met Asp Pro Asn Cys Ser Cys Ala Ala Gly Asp Ser Cys Thr Cys Ala
1               5                   10                  15

Gly Ser Cys Lys Cys Lys Glu Cys Lys Cys Thr Ser Cys Lys Lys Ser
                20                  25                  30

Cys Cys Ser Cys Cys Pro Val Gly Cys Ala Lys Cys Ala Gln Gly Cys
            35                  40                  45

Ile Cys Lys Gly Ala Ser Asp Lys Cys Ser Cys Ala
    50                  55                  60

<210> SEQ ID NO 7
<211> LENGTH: 7986
<212> TYPE: DNA
<213> ORGANISM: Homo sapiens

<400> SEQUENCE: 7
ggaagtgacg ttaggggaag gtgggggcaa tcatggtgcc gctggggagg ggagaagctg      60
ctgctgccgc cgttgccggg agccgcggag acaagtcatt acgttttcat ttctcacaac     120

```
tgggctgagc acaactgaac catgggggaa cacagtccag acaacaacat catctacttt    180
gaggcagagg aagatgagct gaccccgat gataaaatgc tcaggtttgt ggataaaaac     240
ggactggtgc cttcctcatc tggaactgtt tatgatagga ccactgttct tattgagcag    300
gaccctggca ctttggagga tgaagatgac gacggacagt gcggagaaca cttgccttt    360 ctagtagggg gtgaagaggg cttcacctg atagatcatg aagcaatgtc ccagggttat     420
gtgcagcaca ttatctcacc agatcagatt catttgacaa taaaccctgg ttccacaccc    480
atgccaagaa atattgaagg tgcaaccctc actctgcagt cggaatgtcc ggaaacaaaa    540
cgtaaagaag taaagcggta ccaatgtacc tttgagggct gtccccgcac ctacagcaca    600
gcaggcaacc tgcgaaccca ccagaagact caccgaggag agtacacctt tgtctgtaat    660
caggagggct gtggcaaagc cttccttacc tcttacagcc tcaggatcca cgtgcgagtg    720
cacacgaagg agaagccatt tgagtgtgac gtgcagggct gtgagaaggc attcaacaca    780
ctgtacaggc tgaaagcaca tcagaggctt cacacaggga aaacgtttaa ctgtgaatct    840
gaaggctgca gcaaatactt caccacactc agtgatctga ggaagcacat tcgaactcat    900
acaggggaaa agccatttcg gtgcgatcac gatggctgtg aaaagcatt tgcagcaagc      960 caccacctta aaactcacgt tcgtacacat actggtgaaa gacccttctt ctgccccagt   1020
aatggctgtg agaaaacatt cagcactcaa tacagtctca aaagtcacat gaaaggtcat   1080
gataacaaag gacactcata caatgcactt ccacaacaca atggatcaga ggatacaaat   1140
cactcacttt gtctaagtga cttgagcctt ctgtccacag attctgaatt gcagaaaat    1200 tccagtacga cccagggcca ggacctcagc acaatttcac cagcaatcat ctttgaatca   1260
atgttccaga attcagatga tacggcaatt caggaagatc ctcaacagac agcttccttg   1320
actgaaagtt ttaatggtga tgcagagtca gtcagtgatg ttccgccatc cacaggaaat   1380
tcagcatctt tatctcttcc acttgtactg caacctggcc tctccgagcc accccagcct   1440
ctactacctg cctcagctcc gtctgctcct ccgcctgctc cctccctagg acctggctcc   1500
cagcaagctg catttggcaa cccccctgct ctcttacaac ctccagaagt gcctgttccc   1560
cacagcacac agtttgctgc taatcatcaa gagtttcttc cgcaccccca ggcaccgcag   1620
cccattgtac caggactttc tgttgttgct ggggcttctg catcagcagc ggcagtggca   1680
tcagctgtgg cagcaccagc cccaccacaa agtactactg agcccctgcc agccatggtc   1740
cagactctgc ccctgggtgc caactctgtc ctaactaata tcccacaat aaccatcacc    1800 ccaactccca acacagctat cctgcagtcc agcctagtca tggagaaaca gaacttacaa   1860
tggatattaa atggtgccac cagttctcca caaaaccaag aacaaattca gcaagcatct   1920
aaagttgaga aggtgttttt taccactgca gtaccagtag ccagtagccc agggagctct   1980
gtccagcaga ttggcctcag tgttcctgtg atcatcatca acaagaaga ggcatgtcag    2040 tgtcagtgtg catgccggga ctctgcaaag gagcgggcat ccagcaggag aaagggctgc   2100
tcctccccac cccctccaga gccgagcccc caggctcctg atgggcccag cctgcagctc   2160
ccagcgcaga ctttctcttc agccctgtt cccgggtcat catcctctac cttgccctcc     2220
tcctgtgagc aaagccgaca agcagagact ccttcagacc ctcagacaga aacattaagt   2280
gccatggatg tgtcagagtt tctatccctc cagagcctgg acaccccgtc caatctgatt   2340
cccattgaag cactactgca gggggaggag gagatgggcc tcaccagcag cttctccaag   2400
tgaagggccc atgtgtgctc acctctggga aaagcgggtg agcaggaggc atgaggtaca   2460
```

| | |
|---|---|
| atgcctgcca tcatgggtca gaaatttgaa ggatgaagaa atctactgtt tgaaatcctc | 2520 |
| acctttcaga cgtatttttct ttattcacat cccaggagca tccattttaa ggaactattc | 2580 |
| tttggaaaaa aacaaaaaac aaaaaaaaca acaaaaaaag ctaagttata agtgaactgt | 2640 |
| ttggctgcac tgtatgtcac ttttgcttgt tgtcatgtga acttggaaac taaggttact | 2700 |
| cgtgtgcata aaaattctaa atgaaagggt gtggtttcca tcaatctgat gctgcccatc | 2760 |
| gcttgcactg gggtctttgt ggatcgggca ggagttttca gtgtgttggg tgttgctcct | 2820 |
| tcctatgtgt cttttgaatc tgaggctgac atttgcttgg aaggccagac ccttgctcca | 2880 |
| tcagagaggg cagtggcaaa ggccagtgag gcagctgtga gttggacagg gttcaggtga | 2940 |
| gatggtgttg tcatttgtgc ttagtgttgg tggtgctcag ggtggataac acgggtcgtt | 3000 |
| ctgcagcccg cttcagcaca aataggcagc ttaaggcctg gctcacaggc tgtgggggttg | 3060 |
| atctggctct gcagaggccc taggcagctt gttgactgct gtctgttgat gacgtgtgtg | 3120 |
| caaagcaggc tctagcaaca tgatcactgt ccttgccttc ctggttcttt ctctcggttg | 3180 |
| gttgccaggg cttgcagatc gcagtgaatt ttccttgggg aacatcgctg tttttgtccta | 3240 |
| gagtgaactt gtggcttatg ccagtgctg tttggtggtc tgccttcttt ttaatggtat | 3300 |
| tttcttcctc agagcagaag ggctgcattt tgcttatcag aagaaggtgc agatttaagg | 3360 |
| gaattcatat gaggtggcat gtaattggca ggccaggtgt cctggttcca ggttccagcc | 3420 |
| aggctttggg ttgcccccctc catctctgcc ccctctgga ttttgcatac agcctcatac | 3480 |
| agtgcaaaca aggatgtgac ttgctcagct tagtcatgtg atttatttaa aaaaaaaaaa | 3540 |
| aaaagaaaca caaaacgatg atcttctact cagggtatag caaaacaaaa aaattcccctt | 3600 |
| tccaccaaaa agcctgaaat gttgcaataa gttatctcat ttggaatgtt tcattaagtt | 3660 |
| gtgttatagg aaaaaattgt gtgtgtgtgt tatagaatta tatccatatg tctgcctttg | 3720 |
| gctccaagtc attgcctctt aaaataaaag atacaatcca tactagcatg aaaagtttcc | 3780 |
| ctcaacaggc tatattaaca tagtcatgag tgctgaccaa actcaccgag ctcagaggcc | 3840 |
| aggcatggcc tgaggtgcag aataggcctc tgcctcccaa gagcccttc cttgccctga | 3900 |
| gcaaggagtg tgttccaca aacaaggctg ctcttctaag ccaacagtgt caggcaggaa | 3960 |
| gcagccataa ttttgccttg catttttcatt ccctaatgta aagggatctg cattggtcac | 4020 |
| tctcctgttc tctgagccat tgctcagggc cagccaagat attattgaga acagataatt | 4080 |
| taccttggag ccagaggccc tccctgcctt tagcaaggat gttcagggac agacaaagag | 4140 |
| ggcagtggtg tgaatgttg ttactgccat gaggagaaat ggcagtaaga aatcttaact | 4200 |
| acaagcagcc aatttctcat tccaggaccc tagccagaat aattgacttc ttttttttt | 4260 |
| tgagacagag ttttgctttt gttgcccctgg ctggagtgca gtggcgcaat cttggctcac | 4320 |
| cgcaacctcc acttcccagg ttcaagcaat tctgcctcag cctcccgagt agctgggatt | 4380 |
| acaggcatgc gccaccacgc ctggctaatt ttgtattttt agtagagacg gggtttctcc | 4440 |
| atgttggtca ggctggtctc gaactcccaa cgtcaggtga tcctcccgcc tcagtctccc | 4500 |
| aaagtgctgg gattacaggt gtgagccacc atgcctggtc tagggaattg acttcttttt | 4560 |
| gaccttctgc actcccttcc ccaaaaggat tgtggcttct gttgaccatt gacctcagca | 4620 |
| gaagttgata aggcaggagg tttccagtcc tcctggaaaa ccaactgctg agcatgagtt | 4680 |
| gtccttggct gtctctgggc ctcgcaccca tgggaagttt tgaggtaggg cccttgctgt | 4740 |
| ttacaacttc tgagagagta gtgatgggac cccaaagtaa gcttgtatca gagggcagta | 4800 |
| atgaccttcc catatcccca tcctgtggtc acctgggatt tgggttccct ggggcggaag | 4860 |

```
tgggaaatag gagcccaggg aaggacatct gaagcaccca cagtttaaat agcgactctt    4920
cttggttagc cagggctgtg ctcatgttgg gccctaccca ggtcagtggc cttttcactc    4980
tcaaagatcg ggggtgacga agcagcatct taaacagtgt ttaggctgac agattttttcc   5040 agttgaagaa gctgaagtat ctgccttttg agggtgactc tagattacaa gagagactat    5100
cagatccaat cagcttttga aaaatcagga atgtgcttaa aatgccagtg agtggttgtg    5160
aagatcaggt ttatttccca ggataggcag tctttctttc cctccttttc cagttctctt    5220
ttcctacctg tccttccata agcctggtct ctagtgccga ggaccttgga aagagaggg    5280 cccctagcta agctggagcc agaaagaacc ttcatggtga gtgtggtttc ccaaacttgg    5340
gaaatgaacc tagggtgagg ttagggagga tttgtagaat tctagcaggt aaaaatcaag    5400 ccttttttccc ctcccatagt aaacttaacc attttcaccc tgtacgttat cttctagctc   5460
ctactaacat ctccaattag acaaccgctt caaagggtgc ttagcaccag ggattggggt    5520
tcatggactt aggaggtggt aaggaaactg gctggcacca ccaaactgcc ttagtgaact    5580
tggcccttcc caggcaggta ggttgggcat tgagggaagg tggcccagtc tttgctggca    5640
gggtctggcc agtctcatgg gggcaccacc agtttggtga cagaagtggt gtcatttatt    5700
gaattccacc tccgtttaga aggagatcat ggtacaaagc ccaggagggg ccttaagatg    5760
tgaagatctc tctgagtaaa aggcaagggg cttctcttct tcacctctgg gatagttggt    5820
agatcggaga gttttatttt cagggtcaag gctgtggact gatggggata ttggagggtg    5880
ggtgggtttt cctgagagac tttgtataat gctgaatgtg tccagaggga caagtttgca    5940
gaacctcata ttggtatatt aaagaaataa taaaataaaa aagcactttta ggttatttta    6000 tctttaaccc gattgctgca atttcttttg tgtgtatata tacatatata tactttccac     6060
aaagttttat ttttttgctca gaataaaaag ttaaattgag gtgtgaaaag aaaagcactt    6120
accttggtgc aatatgtgta gcttgatggt cgttgtccca tgtggccctg gcctggcagc    6180 gttttttccgc tcaatcagcc ctgtgctgtg agactgtcca tagggaaaca ctattatgca    6240
ttctcagcaa ccgctcaatc tatgcaagcc ttccctgtgt gccccagggc gcccctcag    6300 gctctctgaa gaactgctgt gggtcctgtt ttctgctgac tgttgaggcc ctttttcatc    6360
acttcttggt ctctcgccat cttttccctc ttcaccatta caaaatgatg cctgaaagga    6420
aggaacagat tgttcctagg tagaaacctg gcaccttcta gacttttata tttgtaatca    6480
catccattgt ccttaaagac ttttccagag tgattgaaac cattgatttg tggaactgca    6540
acaatatttc tcaagagttt acaattgtct tacaccacca atcagaaata tgtttgggga    6600
ggcatgggtg gcagggggca acatgagcca tttccatact gctccccata ctacctgtgt    6660
tggttcctta agcaaaaagg cctccagcct tcattaaatc ctataaacaa acattacatc    6720
ccatgaatca ttatcaactt tcttccttta ctccacctcc cccatttttat cttcaattct    6780 caggctatag aatagacaag ttttagaata tacttcagcc aaagcagaag gattttcata    6840
gatccaatat gcaaatagtt ctgctgtgac atagatcaga aattgtctgt tccttaatat    6900
ttgggggtgg aggcaacaaa actgaagcat atttctgatt ggttagccat tttggcctgt    6960
ttcctcttgc atgttttttta gggagagagg gaaacagtcc tgtatttctt ctgatgccct    7020
ttggggaagc cgacgaccac tgggcatttc tcactgttac tcctgttcaa gagagggctt    7080
ctcagtctgc actgaaaaat gcaaattaaa ctggatctttt atgtcaatgt gtacatagta    7140
caagcttttt tactggaatt gaggtttaaa accacacact gcccttttgg tggtgtgcct    7200
```

```
gttgggccaa aaatttgggtg ataatgtagt gtcactttct cagctcaatg cagtttctac    7260
ttttctttat gggaaaattt ttcataaaac cttttttgcac caaaacccag gggtgttttt    7320
tgcaatatcc ttgttatcct cgtagtgtgc caagtcagag gctttctctt gccctttcc     7380 tgctgtgttc tcaggcctcc caagggctat ttgactcaac agtctacatc cttcgttgtg    7440
ttttggagaa tgtgggggtg ggggtcagag ttcaaggtgt ctgttcccctt ttcctgtgaa    7500 ctctttctag tccctatttg gggagggtgg ctggaaacag attttttgctg aattttctggc   7560 tcagatcttc tagccaggaa aggcaagagc ccccaagagc ccttttttttt gacatacact    7620 aatcattggc cggggtcttg gtgacaactt ttaaaatccc aaatagtttt atttggatta    7680
tgtaaaagta agtgtgaaac atgggaacaa cggacttcca ctgagcgatg tgaaaacgtt    7740
acaggttcag tacttccaaa ggaagaaacc tccaaaccca aaaagaata aatatgaatt    7800 tgtattttg aagaatgtga ataatggtg tttgcttaat tgctcatttt gtataaactt     7860
aatattgtac tttaaaatat ctgctaaaaa gtgaaaattt aacttttggg aattgaaaaa    7920
gcaatattaa atactaatga aatcctaatt aaatgcttat ttaaatctgg taaaaaaaaa    7980
aaaaaa                                                                7986
```

<210> SEQ ID NO 8
<211> LENGTH: 753
<212> TYPE: PRT
<213> ORGANISM: Homo sapiens

<400> SEQUENCE: 8

```
Met Gly Glu His Ser Pro Asp Asn Asn Ile Ile Tyr Phe Glu Ala Glu
1               5                   10                  15

Glu Asp Glu Leu Thr Pro Asp Asp Lys Met Leu Arg Phe Val Asp Lys
            20                  25                  30

Asn Gly Leu Val Pro Ser Ser Gly Thr Val Tyr Asp Arg Thr Thr
        35                  40                  45

Val Leu Ile Glu Gln Asp Pro Gly Thr Leu Glu Asp Glu Asp Asp
    50                  55                  60

Gly Gln Cys Gly Glu His Leu Pro Phe Leu Val Gly Gly Glu Gly
65                  70                  75                  80

Phe His Leu Ile Asp His Glu Ala Met Ser Gln Gly Tyr Val Gln His
                85                  90                  95

Ile Ile Ser Pro Asp Gln Ile His Leu Thr Ile Asn Pro Gly Ser Thr
            100                 105                 110

Pro Met Pro Arg Asn Ile Glu Gly Ala Thr Leu Thr Leu Gln Ser Glu
        115                 120                 125

Cys Pro Glu Thr Lys Arg Lys Glu Val Lys Arg Tyr Gln Cys Thr Phe
    130                 135                 140

Glu Gly Cys Pro Arg Thr Tyr Ser Thr Ala Gly Asn Leu Arg Thr His
145                 150                 155                 160

Gln Lys Thr His Arg Gly Glu Tyr Thr Phe Val Cys Asn Gln Glu Gly
                165                 170                 175

Cys Gly Lys Ala Phe Leu Thr Ser Tyr Ser Leu Arg Ile His Val Arg
            180                 185                 190

Val His Thr Lys Glu Lys Pro Phe Glu Cys Asp Val Gln Gly Cys Glu
        195                 200                 205

Lys Ala Phe Asn Thr Leu Tyr Arg Leu Lys Ala His Gln Arg Leu His
    210                 215                 220

Thr Gly Lys Thr Phe Asn Cys Glu Ser Glu Gly Cys Ser Lys Tyr Phe
```

```
            225                 230                 235                 240
        Thr Thr Leu Ser Asp Leu Arg Lys His Ile Arg Thr His Thr Gly Glu
                        245                 250                 255
        Lys Pro Phe Arg Cys Asp His Asp Gly Cys Gly Lys Ala Phe Ala Ala
                        260                 265                 270
        Ser His His Leu Lys Thr His Val Arg Thr His Thr Gly Glu Arg Pro
                        275                 280                 285
        Phe Phe Cys Pro Ser Asn Gly Cys Glu Lys Thr Phe Ser Thr Gln Tyr
                        290                 295                 300
        Ser Leu Lys Ser His Met Lys Gly His Asp Asn Lys Gly His Ser Tyr
        305                 310                 315                 320
        Asn Ala Leu Pro Gln His Asn Gly Ser Glu Asp Thr Asn His Ser Leu
                        325                 330                 335
        Cys Leu Ser Asp Leu Ser Leu Leu Ser Thr Asp Ser Glu Leu Arg Glu
                        340                 345                 350
        Asn Ser Ser Thr Thr Gln Gly Gln Asp Leu Ser Thr Ile Ser Pro Ala
                        355                 360                 365
        Ile Ile Phe Glu Ser Met Phe Gln Asn Ser Asp Asp Thr Ala Ile Gln
        370                 375                 380
        Glu Asp Pro Gln Gln Thr Ala Ser Leu Thr Glu Ser Phe Asn Gly Asp
        385                 390                 395                 400
        Ala Glu Ser Val Ser Asp Val Pro Pro Ser Thr Gly Asn Ser Ala Ser
                        405                 410                 415
        Leu Ser Leu Pro Leu Val Leu Gln Pro Gly Leu Ser Glu Pro Pro Gln
                        420                 425                 430
        Pro Leu Leu Pro Ala Ser Ala Pro Ser Ala Pro Pro Ala Pro Ser
                        435                 440                 445
        Leu Gly Pro Gly Ser Gln Gln Ala Ala Phe Gly Asn Pro Pro Ala Leu
                        450                 455                 460
        Leu Gln Pro Pro Glu Val Pro Val Pro His Ser Thr Gln Phe Ala Ala
        465                 470                 475                 480
        Asn His Gln Glu Phe Leu Pro His Pro Gln Ala Pro Gln Pro Ile Val
                        485                 490                 495
        Pro Gly Leu Ser Val Val Ala Gly Ala Ser Ala Ser Ala Ala Ala Val
                        500                 505                 510
        Ala Ser Ala Val Ala Ala Pro Ala Pro Gln Ser Thr Thr Glu Pro
                        515                 520                 525
        Leu Pro Ala Met Val Gln Thr Leu Pro Leu Gly Ala Asn Ser Val Leu
                        530                 535                 540
        Thr Asn Asn Pro Thr Ile Thr Ile Thr Pro Thr Pro Asn Thr Ala Ile
        545                 550                 555                 560
        Leu Gln Ser Ser Leu Val Met Gly Glu Gln Asn Leu Gln Trp Ile Leu
                        565                 570                 575
        Asn Gly Ala Thr Ser Ser Pro Gln Asn Gln Glu Gln Ile Gln Gln Ala
                        580                 585                 590
        Ser Lys Val Glu Lys Val Phe Phe Thr Thr Ala Val Pro Val Ala Ser
                        595                 600                 605
        Ser Pro Gly Ser Ser Val Gln Gln Ile Gly Leu Ser Val Pro Val Ile
                        610                 615                 620
        Ile Ile Lys Gln Glu Glu Ala Cys Gln Cys Gln Cys Ala Cys Arg Asp
        625                 630                 635                 640
        Ser Ala Lys Glu Arg Ala Ser Ser Arg Arg Lys Gly Cys Ser Ser Pro
                        645                 650                 655
```

-continued

Pro Pro Pro Glu Pro Ser Pro Gln Ala Pro Asp Gly Pro Ser Leu Gln
                660                 665                 670

Leu Pro Ala Gln Thr Phe Ser Ser Ala Pro Val Pro Gly Ser Ser Ser
            675                 680                 685

Ser Thr Leu Pro Ser Ser Cys Glu Gln Ser Arg Gln Ala Glu Thr Pro
690                 695                 700

Ser Asp Pro Gln Thr Glu Thr Leu Ser Ala Met Asp Val Ser Glu Phe
705                 710                 715                 720

Leu Ser Leu Gln Ser Leu Asp Thr Pro Ser Asn Leu Ile Pro Ile Glu
                725                 730                 735

Ala Leu Leu Gln Gly Glu Glu Glu Met Gly Leu Thr Ser Ser Phe Ser
            740                 745                 750

Lys

<210> SEQ ID NO 9
<211> LENGTH: 53
<212> TYPE: DNA
<213> ORGANISM: Artificial Sequence
<220> FEATURE:
<223> OTHER INFORMATION: synthetic

<400> SEQUENCE: 9
agatcatgaa gcaatgtccc agggttatgt gcagcacatt atctcaccag atc        53

<210> SEQ ID NO 10
<211> LENGTH: 13
<212> TYPE: DNA
<213> ORGANISM: Artificial Sequence
<220> FEATURE:
<223> OTHER INFORMATION: synthetic

<400> SEQUENCE: 10
agatcatgaa gca                                                    13

<210> SEQ ID NO 11
<211> LENGTH: 17
<212> TYPE: DNA
<213> ORGANISM: Artificial Sequence
<220> FEATURE:
<223> OTHER INFORMATION: synthetic

<400> SEQUENCE: 11
cattatctca ccagatc                                                17

<210> SEQ ID NO 12
<211> LENGTH: 9
<212> TYPE: DNA
<213> ORGANISM: Artificial Sequence
<220> FEATURE:
<223> OTHER INFORMATION: synthetic

<400> SEQUENCE: 12 agatcatga                                                          9

<210> SEQ ID NO 13
<211> LENGTH: 30
<212> TYPE: DNA
<213> ORGANISM: Artificial Sequence
<220> FEATURE:
<223> OTHER INFORMATION: synthetic

<400> SEQUENCE: 13
gttatgtgca gcacattatc tcaccagatc             30

<210> SEQ ID NO 14
<211> LENGTH: 17
<212> TYPE: DNA
<213> ORGANISM: Artificial Sequence
<220> FEATURE:
<223> OTHER INFORMATION: synthetic

<400> SEQUENCE: 14
agatcatgaa gcaatgt             17

<210> SEQ ID NO 15
<211> LENGTH: 23
<212> TYPE: DNA
<213> ORGANISM: Artificial Sequence
<220> FEATURE:
<223> OTHER INFORMATION: synthetic

<400> SEQUENCE: 15
gcagcacatt atctcaccag atc             23

<210> SEQ ID NO 16
<211> LENGTH: 22
<212> TYPE: DNA
<213> ORGANISM: Artificial Sequence
<220> FEATURE:
<223> OTHER INFORMATION: synthetic

<400> SEQUENCE: 16
agatcatgaa gcaatgtccc ag             22

<210> SEQ ID NO 17
<211> LENGTH: 19
<212> TYPE: DNA
<213> ORGANISM: Artificial Sequence
<220> FEATURE:
<223> OTHER INFORMATION: synthetic

<400> SEQUENCE: 17
cacattatct caccagatc             19

<210> SEQ ID NO 18
<211> LENGTH: 23
<212> TYPE: DNA
<213> ORGANISM: Artificial Sequence
<220> FEATURE:
<223> OTHER INFORMATION: synthetic

<400> SEQUENCE: 18
agatcatgaa gcaatgtccc agg             23

<210> SEQ ID NO 19
<211> LENGTH: 14
<212> TYPE: DNA
<213> ORGANISM: Artificial Sequence
<220> FEATURE:
<223> OTHER INFORMATION: synthetic

<400> SEQUENCE: 19
agatcatgaa gcaa             14

<210> SEQ ID NO 20
<211> LENGTH: 28
<212> TYPE: DNA
<213> ORGANISM: Artificial Sequence

```
<220> FEATURE:
<223> OTHER INFORMATION: synthetic

<400> SEQUENCE: 20
tatgtgcagc acattatctc accagatc                                          28

<210> SEQ ID NO 21
<211> LENGTH: 22
<212> TYPE: DNA
<213> ORGANISM: Artificial Sequence
<220> FEATURE:
<223> OTHER INFORMATION: synthetic

<400> SEQUENCE: 21
cagcacatta tctcaccaga tc                                                22

<210> SEQ ID NO 22
<211> LENGTH: 16
<212> TYPE: DNA
<213> ORGANISM: Artificial Sequence
<220> FEATURE:
<223> OTHER INFORMATION: synthetic

<400> SEQUENCE: 22
agatcatgaa gcaatg                                                       16

<210> SEQ ID NO 23
<211> LENGTH: 24
<212> TYPE: DNA
<213> ORGANISM: Artificial Sequence
<220> FEATURE:
<223> OTHER INFORMATION: synthetic

<400> SEQUENCE: 23
tgcagcacat tatctcacca gatc                                              24
```